(12) United States Patent
Hoofard et al.

(10) Patent No.: US 11,892,853 B2
(45) Date of Patent: Feb. 6, 2024

(54) VEHICLE GUIDANCE SYSTEMS AND ASSOCIATED METHODS OF USE AT LOGISTICS YARDS AND OTHER LOCATIONS

(71) Applicant: ASSA ABLOY Entrance Systems AB, Landskrona (SE)

(72) Inventors: Richard K. Hoofard, Dallas, TX (US); Daryl Day, Frisco, TX (US); L. Blake Whitley, Arlington, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 191 days.

(21) Appl. No.: 17/575,529

(22) Filed: Jan. 13, 2022

(65) Prior Publication Data

US 2022/0214694 A1 Jul. 7, 2022

Related U.S. Application Data

(62) Division of application No. 16/109,603, filed on Aug. 22, 2018, now Pat. No. 11,256,264.

(Continued)

(51) Int. Cl.
  *G05D 1/02* (2020.01)
  *B60D 1/24* (2006.01)
  (Continued)

(52) U.S. Cl.
  CPC .......... *G05D 1/0225* (2013.01); *B60D 1/245* (2013.01); *B60D 1/246* (2013.01); *B60D 1/62* (2013.01);
  (Continued)

(58) Field of Classification Search
  None
  See application file for complete search history.

(56) References Cited

U.S. PATENT DOCUMENTS

| 1,775,909 A | 9/1930 | Mikkelsen |
| 2,362,981 A | 11/1944 | Philemon |

(Continued)

FOREIGN PATENT DOCUMENTS

| CN | 101716959 A | 6/2010 |
| FR | 2797246 A1 | 2/2001 |

(Continued)

OTHER PUBLICATIONS

Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.

(Continued)

*Primary Examiner* — Redhwan K Mawari
(74) *Attorney, Agent, or Firm* — Perkins Coie LLP

(57) ABSTRACT

Systems and methods are disclosed for controlling operations of autonomous vehicles and systems in, for example, logistics yards at distribution, manufacturing, processing and/or other centers for the transfer of goods, materials, and/or other cargo. In some embodiments, an autonomous yard tractor or other vehicle can include one or more systems for locating an over-the-road trailer parked in a yard of a distribution center, engaging the trailer, and moving the trailer to a loading dock for loading/unloading operations in accordance with a workflow procedure provided by a central control system. In other embodiments, an autonomous yard tractor can locate the trailer at the loading dock after the loading/unloading operations, engage the trailer, and move the trailer to a parking location in the yard. In some embodiments, the autonomous yard tractor can include a sensor system configured to detect the position of the trailer relative to, for example, the tractor, and/or the dock station can include a sensor system configured to detect the position (Continued)

of the trailer relative to, for example, the dock station during a docking procedure.

22 Claims, 28 Drawing Sheets

Related U.S. Application Data

(60) Provisional application No. 62/552,284, filed on Aug. 30, 2017.

(51) Int. Cl.
*G05D 1/00* (2006.01)
*B60W 30/00* (2006.01)
*B60T 7/22* (2006.01)
*G06Q 10/0833* (2023.01)
*B60D 1/62* (2006.01)
*G01S 17/06* (2006.01)

(52) U.S. Cl.
CPC .............. *B60T 7/22* (2013.01); *B60W 30/00* (2013.01); *G05D 1/0088* (2013.01); *G05D 1/028* (2013.01); *G06Q 10/0833* (2013.01); *B60T 2201/10* (2013.01); *G01S 17/06* (2013.01); *G05D 2201/0213* (2013.01); *G05D 2201/0216* (2013.01)

(56) References Cited

U.S. PATENT DOCUMENTS

| | | |
|---|---|---|
| 3,635,277 A | 1/1972 | Bahnsen |
| 3,894,571 A | 7/1975 | Hinchliff |
| 4,625,456 A | 12/1986 | Lafontaine |
| 4,936,731 A | 6/1990 | Noble |
| 5,056,847 A | 10/1991 | Stillwell et al. |
| 5,196,965 A | 3/1993 | Lang et al. |
| 5,277,240 A | 1/1994 | Epema et al. |
| 5,915,446 A | 6/1999 | De |
| 6,179,036 B1 | 1/2001 | Harvey |
| 6,276,744 B1 | 8/2001 | Huber et al. |
| 6,523,823 B1 | 2/2003 | Bakoledis |
| 7,119,673 B2 | 10/2006 | Eager et al. |
| 8,364,334 B2 | 1/2013 | Au et al. |
| 8,421,611 B1 | 4/2013 | Coshow et al. |
| 8,959,838 B1 | 2/2015 | Marinelli |
| 8,978,562 B2 | 3/2015 | Nagamine et al. |
| 9,211,889 B1 | 12/2015 | Hoetzer et al. |
| 9,274,522 B2 | 3/2016 | Boos et al. |
| 9,283,935 B2 | 3/2016 | Fujioka |
| 9,623,859 B2 | 4/2017 | Lavoie et al. |
| 9,656,691 B2 | 5/2017 | Heimberger et al. |
| 10,081,504 B2 | 9/2018 | Walford et al. |
| 11,142,413 B2 | 10/2021 | Hoofard et al. |
| 11,256,264 B2 | 2/2022 | Hoofard et al. |
| 11,262,747 B2 | 3/2022 | Hoofard et al. |
| 2004/0146384 A1 | 7/2004 | Whelan |
| 2004/0182619 A1 | 9/2004 | Mcgregor et al. |
| 2006/0119132 A1 | 6/2006 | Rivers et al. |
| 2006/0145853 A1 | 7/2006 | Richards et al. |
| 2006/0158752 A1 | 7/2006 | Perkes |
| 2006/0181391 A1 | 8/2006 | Mcneill et al. |
| 2006/0289128 A1 | 12/2006 | Ressel et al. |
| 2007/0258798 A1 | 11/2007 | Foster et al. |
| 2009/0013497 A1 | 1/2009 | Squyres et al. |
| 2010/0073197 A1 | 3/2010 | Eagleton et al. |
| 2010/0289623 A1 | 11/2010 | Roesner |
| 2012/0125545 A1 | 5/2012 | Ehrlich |
| 2014/0222971 A1 | 8/2014 | Cooper et al. |
| 2015/0294166 A1 | 10/2015 | Kuehnle et al. |
| 2016/0031482 A1 | 2/2016 | Lavoie |
| 2016/0041258 A1 | 2/2016 | Cashler et al. |
| 2016/0075526 A1 | 3/2016 | Avalos |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2016/0369619 A1 | 12/2016 | Parmeshwar et al. |
| 2017/0043967 A1 | 2/2017 | Walford et al. |
| 2017/0073005 A1 | 3/2017 | Jawad et al. |
| 2017/0106794 A1 | 4/2017 | Constantine |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0320685 A1 | 11/2017 | Hoofard et al. |
| 2018/0278897 A1 | 9/2018 | Seaman et al. |
| 2018/0346029 A1 | 12/2018 | Kabos et al. |
| 2019/0039425 A1 | 2/2019 | Dodd et al. |
| 2019/0056736 A1 | 2/2019 | Wood et al. |
| 2019/0064835 A1 | 2/2019 | Hoofard et al. |
| 2019/0187716 A1 | 6/2019 | Cantrell et al. |
| 2019/0301224 A1 | 10/2019 | Barton |
| 2019/0302764 A1 | 10/2019 | Smith et al. |
| 2020/0018110 A1 | 1/2020 | Lindley et al. |
| 2020/0125074 A1 | 4/2020 | Ramos et al. |
| 2020/0133259 A1 | 4/2020 | Van Wiemeersch et al. |
| 2020/0334631 A1 | 10/2020 | Conlon |

FOREIGN PATENT DOCUMENTS

| | | |
|---|---|---|
| WO | 2017100716 A1 | 6/2017 |
| WO | 2019209773 A1 | 10/2019 |

OTHER PUBLICATIONS

Desantis et al., Path-Tracking for Tractor-Trailers with Hitching of Both the On-Axle and the Off-Axle Kind, Proceedings of the 2002 IEEE International Symposium on Intelligent Control, 2002.

Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.

McGovern et al., An Articulated Truck on a Spreadsheet, Level 3, Issue 1, Nov. 2003, 23 pages.

Oreh et al., A New Method for Directional Control of a Tractor Semi-Trailer, Australian Journal of Basic and Applied Sciences, 6(12): 369-409, 2012.

Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac.jp, [retrieved on Nov. 27, 2018], Chapter 9.

Ullrich, Gunter , et al., "Automated Guided Vehicle Systems: A Primer with Practical Applications", in: Automated Guided Vehicle Systems: A Primer with Practical Applications, Dec. 24, 2014 (Dec. 24, 2014), Springer, XP055619722, ISBN: 978-3-662-44813-7.

VEHICLE GUIDANCE SYSTEMS AND ASSOCIATED METHODS OF USE AT LOGISTICS YARDS AND OTHER LOCATIONS

CROSS-REFERENCE TO RELATED APPLICATION(S) INCORPORATED HEREIN BY REFERENCE

The present application claims priority to and the benefit of U.S. Non-Provisional patent application Ser. No. 16/109,603, filed Aug. 22, 2018, and titled VEHICLE GUIDANCE SYSTEMS AND ASSOCIATED METHODS OF USE AT LOGISTICS YARDS AND OTHER LOCATIONS, which claims priority to and the benefit of U.S. Provisional Patent Application No. 62/552,284, filed Aug. 30, 2017, and titled LOGISTICS YARD GUIDANCE SYSTEMS AND ASSOCIATED METHODS OF MANUFACTURE AND USE, which are incorporated herein by reference in their entirety.

TECHNICAL FIELD

The present disclosure is generally related to movement of transport vehicles at distribution centers and, more particularly, to systems and methods for controlling over-the-road tractors, terminal tractors, and other vehicles in logistics yards and the like.

BACKGROUND OF THE INVENTION

Commercial enterprises typically utilize distribution, processing, and manufacturing centers for a variety of purposes. Distribution centers, for example, are often used to receive, process, and/or re-ship packages, parcels, and other goods and materials. Manufacturing centers typically require the delivery of consumable materials and the shipment of finished products. As such, distribution centers are often located in close proximity to manufacturing facilities.

Regardless of the particular use, distribution centers typically include at least one loading dock station on a warehouse or other industrial building configured to receive a trailer for deliveries and shipments. Another common feature of distribution centers is that each docking station typically requires movement of incoming and outgoing trailers and other transport vehicles into the docking station. This movement is typically accomplished by either the over-the-road (OTR) tractor that brought the trailer into the distribution center, or by a dedicated facility or terminal tractor.

Even moderate-size distribution centers typically include numerous loading dock stations that see a great deal of inbound and outbound traffic and require coordinated use. Such distribution centers often utilize traffic management systems to increase productivity and reduce the potential for accidents. Additionally, the parking spaces for trailers and the spacing of docking stations on the building are typically configured to provide the maximum number of spaces and docking stations, resulting in parking spaces and docking stations with the minimum width and length necessary to position a trailer. These factors can make it challenging for transport drivers to negotiate vehicles in distribution centers.

Many distribution centers have operational protocols that mandate that safe vehicle speeds be maintained; that set, repetitious vehicle paths be followed; and that overall workflow procedures be followed for the movement of trailers in the yard of the distribution center. However, there is an ever-increasing pressure to maximize the efficiency of distribution, processing, and manufacturing centers. As a result, some tractor operators may inadvertently fail to follow operational protocols or be inclined to "shortcut" operational protocols in an effort to expedite the receipt and shipment of goods and materials. For example, during peak operation of a distribution center, the departure of one trailer may be immediately followed by the arrival of another trailer. As such, a driver may be inclined to exceed speed limits and/or attempt to shortcut the proper path to an assigned destination in the yard in an effort to save time. Deviation from operational protocols, however, can increase the potential for an accident or other time-consuming incident.

Conventional yards at distribution centers (which can also be referred to as "logistics yards") use manned transport vehicles. Although autonomous vehicle technologies are under development, the majority of these are for transport vehicles operating on public motorways. For example, U.S. Pat. No. 9,623,859, titled TRAILER CURVATURE CONTROL AND MODE MANAGEMENT WITH POWERTRAIN AND BRAKE SUPPORT, is incorporated herein by reference in its entirety. This patent is directed to vehicle backing with a trailer, but focuses on the relative movement between the backing vehicle and the trailer. It does not address the spatial relationship between the vehicle/trailer combination and the surrounding environment or ground map, nor does it address the problem of avoiding obstacles. Other patents and patent applications incorporated herein by reference in their entireties include the following: U.S. patent application Ser. No. 15/305,296, titled SYSTEMS AND METHODS FOR AUTOMATICALLY CONTROLLING LOADING DOCK EQUIPMENT; U.S. patent application Ser. No. 15/145,605, titled CONTROL SYSTEMS FOR OPERATION OF LOADING DOCK EQUIPMENT, AND ASSOCIATED METHODS OF MANUFACTURE AND USE; U.S. Pat. No. 9,656,691, titled METHOD FOR PERFORMING AN AT LEAST SEMI-AUTONOMOUS PARKING PROCESS; U.S. Pat. No. 9,623,859, titled TRAILER CURVATURE CONTROL AND MODE MANAGEMENT WITH POWERTRAIN AND BRAKE SUPPORT; U.S. Pat. No. 8,364,334, titled SYSTEM AND METHOD FOR NAVIGATING AN AUTO VEHICLE USING LASER DETECTION AND RANGING; U.S. Pat. No. 9,283,935, titled RAIL GUIDED VEHICLE SYSTEM; U.S. Pat. No. 8,978,562, titled RAIL GUIDED VEHICLE SYSTEM; U.S. patent application Ser. No. 15/408,242 (U.S. Pub. No. 2017/0205824), titled METHOD AND DEVICE FOR MONITORING AN AUTONOMOUS DRIVING OPERATION OF A MOTOR VEHICLE WITHIN A PARKING FACILITY; U.S. patent application Ser. No. 15/450,210 (U.S. Pub. No. 2017/0174209), titled TRAILER CURVATURE CONTROL AND MODE MANAGEMENT WITH POWERTRAIN AND BRAKE SUPPORT; U.S. patent application Ser. No. 15/115,830 (U.S. Pub. No. 2017/0168501), titled METHOD FOR SETTING TRAVEL PATH OF AUTONOMOUS VEHICLE; U.S. patent application Ser. No. 14/851,767 (U.S. Pub. No. 2017/0073005), titled GUIDANCE SYSTEM FOR A VEHICLE REVERSING A TRAILER; U.S. patent application Ser. No. 14/736,391 (U.S. Pub. No. 2016/0362135), titled TRAILER LENGTH ESTIMATION METHOD USING TRAILER YAW RATE SIGNAL; U.S. patent application Ser. No. 14/442,509 (U.S. Pub. No. 2016/0288833), titled METHOD FOR PERFORMING AN AT LEAST SEMI-AUTONOMOUS PARKING PROCESS IN A GARAGE; U.S. patent application Ser. No. 14/575,008 (U.S. Pub. No. 2016/0178382), titled MARKER AIDED AUTONOMOUS VEHICLE LOCALIZATION, and U.S. patent application Ser. No. 14/447,006

(U.S. Pub. No. 2016/0031482), titled TRAILER BACKUP ASSIST SYSTEM WITH ACTIVE TRAILER BRAKING FOR CURVATURE CONTROL. Each of the patents and applications listed above, and any other patents, applications, publications, and/or other references identified in the present application, are incorporated herein by reference in their entirety.

In a typical distribution center, an incoming cargo trailer may be moved between various locations in the yard between the time it arrives and the time it leaves. By way of example, these locations can include:
 OTR transport vehicle with cargo trailer checks in at guard gate
 OTR transport vehicle drops off cargo trailer at parking location
 Terminal tractor relocates cargo trailer to loading dock station for loading/unloading
 Terminal tractor relocates cargo trailer to parking location after loading/unloading
 OTR transport vehicle picks up cargo trailer at parking space for departure
 OTR transport vehicle with cargo trailer checks out at guard gate In this example, the cargo trailer is touched four times while in the confines of the logistics yard with three parking actions that include movement into and out of a parking location. As noted above, vehicle parking spaces in distribution centers are typically very compact, and it can require a great deal of driver skill to maneuver large transport vehicles efficiently within the space provided, particularly when backing into either a parking space or a loading dock station. It would therefore be advantageous to have systems and methods for controlling the operation of distribution center tractors in a manner that promotes adherence to operational protocols and reduces the potential for accidents and other undesirable incidents. It would also be advantageous for such systems and methods to increase the operational efficiency of the distribution center.

SUMMARY

The following summary is intended to introduce aspects of some embodiments of the present technology, but not to limit the scope of the embodiments or claims in any way. One skilled in the relevant art can obtain a full appreciation of aspects of the present technology from the Detailed Description which follows, read together with the Figures and subsequent claims.

Aspects of embodiments of the present technology are directed to a guidance system (e.g., a logistics yard guidance system) that can be used to guide autonomous (unmanned) and/or manned vehicles to their assigned places in a distribution center vehicle yard, and/or to provide guidance to vehicles (e.g., OTR vehicles, terminal vehicles, and/or other vehicles) backing into a dock position or parking location by following a path configured to avoid obstacles in the yard. Such obstacles can include, for example, other vehicles, building structures, and typical yard features such as light poles, bollards, etc. In some embodiments, such systems can facilitate maneuvering around and between other trailers in the tight quarters of a typical yard where vehicle damage might otherwise occur, particularly among OTR drivers operating in the yard.

Other aspects of embodiments of the present technology are directed to a guidance system that includes at least one control system for communicating workflow procedure instructions to tractors in a distribution center yard and for monitoring performance of the instructions, and at least one facility-mounted sensor for detecting trailer movement in the yard. The control system can include wireless means for communication with the tractors in the yard. In some embodiments, the control system may be located in the facility, on a tractor, and/or remotely from the facility and the tractor.

Additional aspects of embodiments of the present technology are directed to systems for providing positive guidance during a vehicle (e.g., a tractor) backing process, and systems and methods for determining a trailer location with respect to, for example, a tractor, the logistics yard, a loading dock station, etc.

Further aspects of embodiments of the present technology are directed to a yard guidance system that includes at least one tractor sensor system and at least one trailer sensor target. The tractor sensor system is configured to operably communicate with the trailer sensor target to determine the two dimensional (2D) positional relationship and attitude of the trailer with respect to the tractor, and the 2D positional relationship and attitude of the tractor and/or the trailer with respect to the yard.

Other aspects of embodiments of the present technology are directed to a logistics yard guidance system that includes at least one guidance means for guiding tractors and at least one tractor capable of interacting with the guidance means. The tractor can also include means for communicating with at least one control system operating to a workflow procedure.

DETAILED DESCRIPTION

Figure 1:
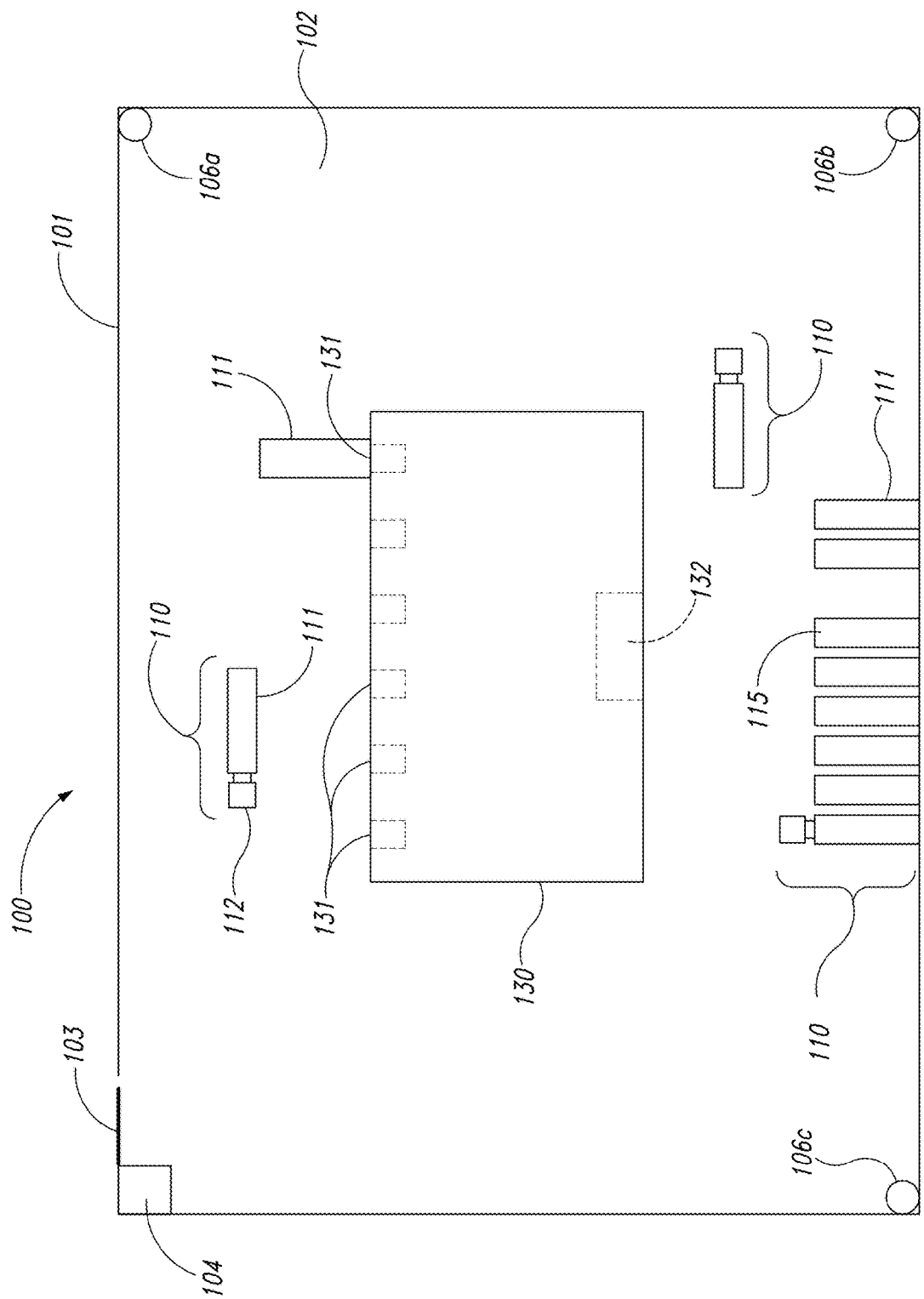
FIG. 1 is a partially schematic plan view of a distribution center configured in accordance with embodiments of the present technology.

The following disclosure describes various embodiments of systems and methods for controlling autonomous (unmanned) and/or manned vehicles in a yard of a distribution center or other facility. Such vehicles can include, for example, over-the-road (OTR) tractors, terminal tractors, and other vehicles. In some embodiments, the systems and methods disclosed herein are configured to generate guidance signals for controlling movement of various types of tractors (e.g., autonomous tractors) at a distribution center, including movement of associated trailers into and out of loading dock stations. For ease of reference, the term "distribution center" as used herein will be understood to include distribution centers, processing centers, manufacturing centers, and/or other facilities and locations in which transport vehicles deliver and pick up goods, materials, and other cargo. Additionally, the terms "logistics yard," "yard," "distribution center yard" and the like will be understood to include the yards of such facilities on which transport vehicles move and conduct operations.

In some embodiments, the present technology includes a control system configured to interact with one or more sensors mounted to at least one tractor operating in a logistics yard, and/or interact with one or more sensors mounted to a facility building (e.g., a loading dock). The control system can be further configured to generate and send a set of guidance commands to the tractor based at least in part on input from the sensor(s) mounted on the tractor and/or the building. The hardware and software that provides this functionality may also be used to advantageously establish and require adherence to vehicle operational protocols intended to improve safety and efficiency of the facility operations.

Certain details are set forth in the following description and in FIGS. 1-20D to provide a thorough understanding of various embodiments of the present technology. In other instances, well-known structures, systems, operations, materials, etc. often associated with distribution centers, logistics yards, transport vehicles (including OTR tractors and trailers as well as dedicated terminal tractors), loading docks, loading dock equipment, computer systems, wireless communication systems, navigational systems, etc. have not been set forth in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can add other details, dimensions, angles and features without departing from the spirit or scope of the present invention. In addition, those of ordinary skill in the art will appreciate that further embodiments of the invention can be practiced without several of the details described below.

In general, identical reference numbers in the Figures identify identical, or at least generally similar, elements. To facilitate the discussion of any particular element, the most significant digit or digits of any reference number generally refers to the Figure in which that element is first introduced. For example, element 110 is first introduced and discussed with reference to FIG. 1.

Distribution Center

FIG. 1 is a plan view of a distribution center 100 configured in accordance with embodiments of the present technology. By way of example, the center 100 may be a distribution center, a processing center, a manufacturing center, or any other facility that includes loading dock stations with an adjacent area for the transfer of goods, materials, etc. The center 100 may be referred to herein as the "distribution center 100" for ease of reference. In some embodiments, the distribution center 100 can include a boundary or enclosure 101 (e.g., a wall or fence) that surrounds the distribution center 100 and a corresponding logistics yard 102 to provide security. The enclosure 101 can include a vehicle entrance/exit gate 103 with a guard booth 104.

A plurality of tractor/trailer combinations 110 may be present in the logistics yard 102 at any given time. Each tractor/trailer combination 110 includes a tractor 112 that is operably coupled to and separable from a cargo trailer 111 (e.g., an OTR trailer). These vehicles are commonly referred to as "semi-trucks" and "semi-trailers," respectively, and are described in further detail below with reference to FIGS. 2A-2C. It should be understood, however, that the term "tractor/trailer combination" and the like, as used herein, can generally refer to other types of carrier vehicles, such as integral units, which are generally known as straight trucks. Accordingly, the present technology is not limited to use with only tractor/trailer combinations, and may be used in virtually any distribution-type center with virtually any type of vehicle including tractor/trailer combinations, straight trucks, vans, and the like. In addition to the tractor/trailer combinations 110, the yard 102 can also contain a plurality of individual tractors 112 and individual trailers 111 at any given time. The trailers 111, for example, may be parked in corresponding parking locations 115 prior to loading or unloading.

The center 100 includes a building 130 (e.g., a warehouse, manufacturing facility, or other facility for shipping/receiving goods, materials, etc.). In the illustrated embodiment, the building 130 includes a plurality of loading dock stations 131 (which may also be referred to herein as "docking stations," "dock stations," "loading docks," and the like). Each dock station 131 is configured to facilitate loading and unloading of goods and materials from, for example, an OTR trailer. As described in further detail below, the building 130 can include a central processing center 132 to coordinate operations in the logistics yard 102 and at the dock stations 131. The central processing center 132 can also interact with and/or control a facility enterprise resource planning (ERP) system, an associated material handling system, and/or other operational systems associated with the distribution center 100. In the illustrated embodiment, the central processing center 132 is depicted as being located or integrated within the building 130. In other embodiments, however, the central processing center 132 is not limited by location and may be located remotely from the building 130 and/or in virtually any other location.

As described in greater detail below, in some embodiments the central processing center 132 includes automated processing systems configured to communicate instructions to, for example, the tractor/trailer combination 110, receive feedback from the tractor/trailer combination 110, and automatically respond to the feedback. Furthermore, the central processing center 132, whether through automated processing systems or operator direction, may be utilized to generate/compile reports, alerts, and notices regarding operations in the logistics yard 102, the loading docks 131, the ERP system, and any associated material handling systems or software packages.

In some embodiments, the center 100 can include a local positioning system to locate the positions of vehicles in the yard relative to, for example, a ground map of the center 100. For example, in some embodiments the center 100 can include a plurality of beacons 106 (identified individually as a first beacon 106a, a second beacon 106b and a third beacon 106c) positioned in known locations around the logistics yard 102 (e.g., in different corners of the yard 102). In some embodiments, the beacons can include Wi-Fi transmitters to enable Wi-Fi positioning of the tractor 112 and/or the trailer 111 in the logistics yard 102. For example, the beacons 106 can include wireless access points each having a unique identifier (e.g., a media access control address or "MAC"). As described in greater detail below, the tractor 112 can include a wireless receiver and can determine its location using conventional triangulation techniques based on, for example, the radio signal strength (RSS) of the wireless signals received from the respective beacons 106. In these embodiments, at least three beacons 106 may be required. However, additional beacons can be used to enhance the accuracy of the positioning. In other embodiments, the beacons 106 can include Bluetooth systems that wirelessly transmit Bluetooth signals containing unique identification information to the tractor receiver, which can then determine the tractor's position in the yard 102 using conventional triangulation techniques. It should be understood that in many embodiments of the present technology, the local positioning systems described above can be used in conjunction with a conventional GPS system for guidance of the tractor 112.

As those of ordinary skill in the art will understand, Bluetooth and Wi-Fi are just two of the types of technology that the center 100 can utilize to locate and control the position of the tractor 112 in the yard 102. In other embodiments, other types of suitable positioning systems known in the art can be used in place of or in combination with Wi-Fi, Bluetooth, and/or other systems. Such systems can include, for example, radio frequency identification (RFID) positioning systems, light-based positioning systems (e.g., infrared ray, infrared LED, visible LED, etc.), sonic positioning systems (e.g., ultrasonic wave, etc.), wireless local area network systems (WLAN), dead reckoning systems, Zigbee systems, LoRaWAN positioning systems using low-power radio signals for wireless data transmission over long distances, vision analysis systems, etc. Although RSS is one method that can be used to measure distances between the receiver on the tractor 112 and the individual beacons 106a-c for determining 2D position, in other embodiments, TOA (time of arrival), TDOA (time difference of arrival), and AoA (angle of arrival) are other known methods for measuring the distances and/or angles between these devices for 2D positioning.

Although in some embodiments the beacons 106a-c can transmit wireless signals with unique identifiers to the tractor 112, in other embodiments, the tractor 112 can transmit a unique identifier to multiple receivers located in, for example, the positions of the beacons 106a-c, and the beacon system (or other processing device) can use RSS or other distance measuring techniques and triangulation to determine the position of the tractor 112. This position information can then be transmitted to the central processing center 132 and/or the tractor 112 to generate guidance commands for autonomous movement of the tractor 112 in the yard 102.

By way of example only, in some embodiments the tractor 112 can move the trailer 111 from a first location in the yard 102 to a second location as follows. First, the tractor 112 can determine its current position on a digital map (also referred to as an electronic map) of the yard 102 using, for example, wireless triangulation as described above. Next, the tractor 112 can wirelessly transmit this information to the central processing center 132. Once the central processing center 132 receives the tractor's initial position, the central processing center 132 can transmit the coordinates of a destination, and the coordinates of a path to the destination, to the tractor 112. As described in greater detail below, the tractor 112 can include autonomous guidance and control systems that enable it to proceed to the destination via the path provided by the central processing center 132. Additionally, as described in further detail below, the tractor 112 can include collision avoidance hardware and software (e.g., light imaging detection and ranging (LiDAR)) systems for collision avoidance while en route to the new location.

Tractor/Trailer

Figure 2A:
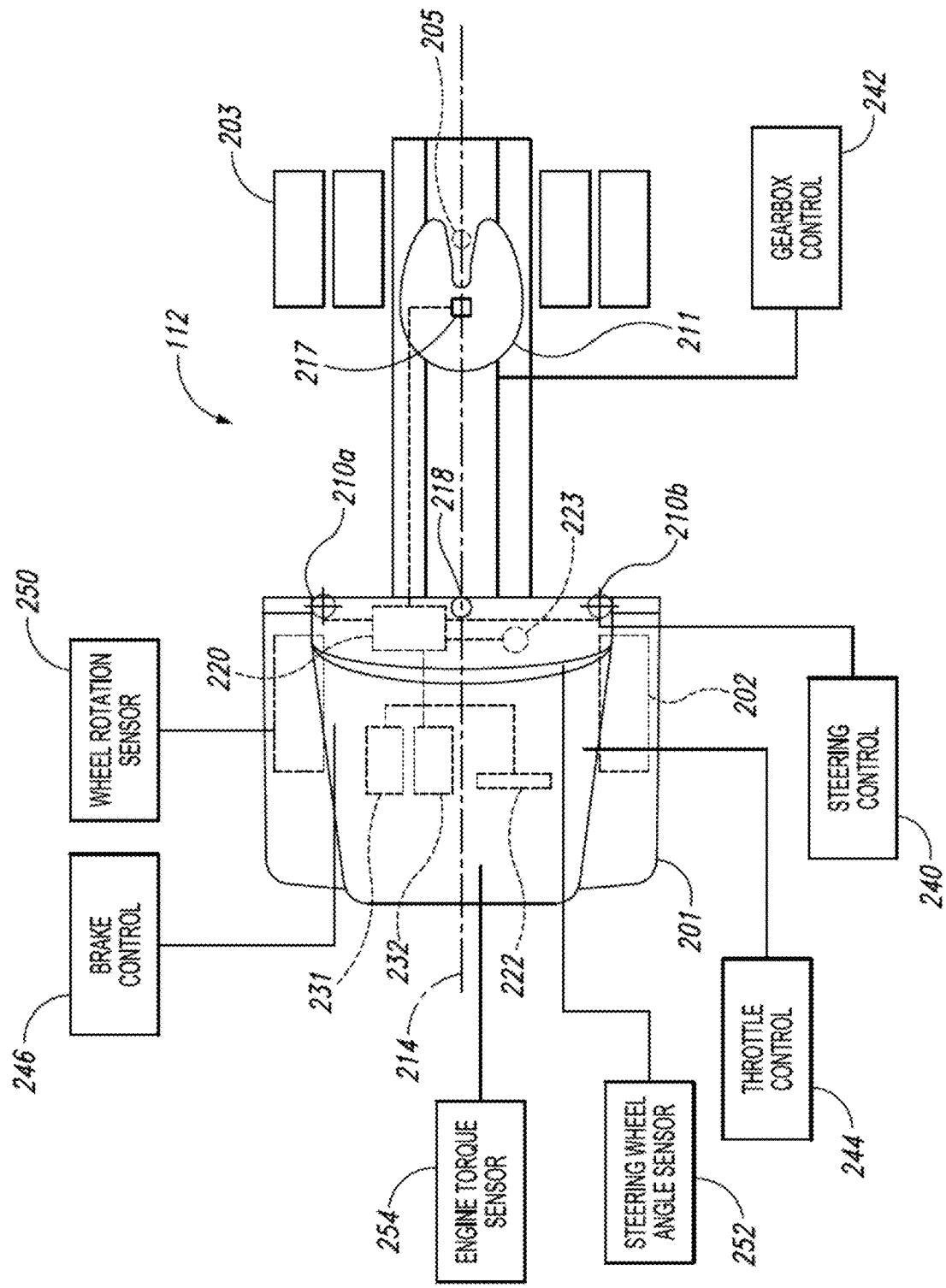
FIG. 2A is a partially schematic plan view of an autonomous tractor configured in accordance with embodiments of the present technology.
Figure 2B:
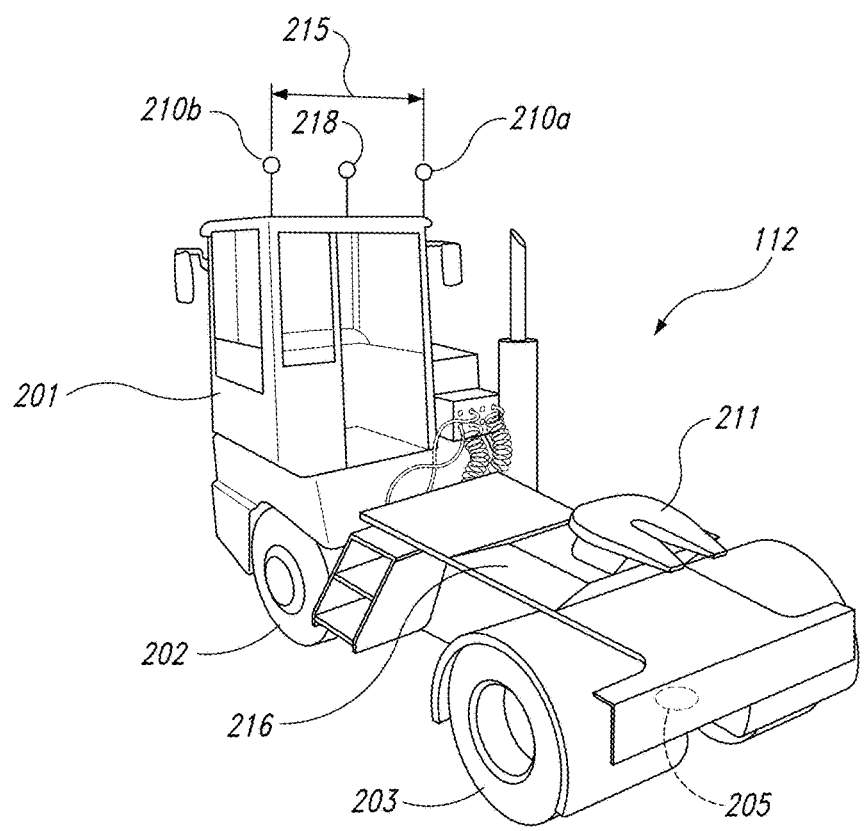
FIG. 2B is a partially schematic isometric view of the tractor of FIG. 2A.

FIGS. 2A and 2B are a partially schematic top view and a rear isometric view, respectively, of the tractor 112 of the tractor/trailer combination 110 (FIG. 1) configured in accordance with embodiments of the present technology. Referring to FIGS. 2A and 2B together, in some embodiments the tractor 112 includes a cab 201, a set of steering tires 202, at least one set of drive tires 203, a fifth wheel 211, and, if the tractor 112 is a terminal tractor, a boom 216 for raising and lowering the fifth wheel 211. Additionally, in some embodiments the fifth wheel 211 can include an angular position sensor 217 (e.g., a potentiometer or Hall effect device) that is configured to determine the angular orientation of a trailer kingpin received by the fifth wheel 211 in relation to a tractor centerline 214. In addition to these features, the tractor 112 also includes the capability for autonomous control. For example, the tractor 112 includes a controller 220, a navigation system 231, a collision avoidance system 232, a communication system 223, tractor drive systems (e.g., a steering control 240, a gearbox control 242, a throttle control 244, a brake control 246, etc.), and tractor sensor systems (e.g., a wheel rotation sensor 250, a steering wheel angle sensor 252, an engine torque sensor 254, etc.). The navigation system 231 can include, for example, a global positioning system (GPS) having a GPS receiver, a laser ranging system, a radio directional system, a dead reckoning system, and/or other suitable types of 2D location systems known in the art that provide positional information related to the tractor 112 (e.g., the 2D X-Y positional coordinates of the tractor 112 in relation to an established ground map of the yard 102 or other frame of reference, etc.). In some embodiments, the navigation system 231 can determine the 2D position as well as the angular orientation (0-360 degrees) of the tractor 112 (and/or the trailer 111) relative to a ground map or other frame of reference. In some embodiments, the navigation system 231 can operate in concert with facility sensors and/or other active facility systems, such as the beacons 106a-c described above with reference to FIG. 1, and in other embodiments the navigation system 231 can operate independent of the facility systems. As described in more detail below, in some embodiments the tractor controller 220 can include one or more processors that generate tractor steering, throttle, and braking commands to achieve a commanded path of travel using information received from the central processing center 132, the navigation system 231, the tractor drive systems, the tractor sensor systems, and/or a workflow procedure.

In some embodiments, the tractor communication system 223 can include a wireless transceiver (e.g., a Wi-Fi transceiver, a Bluetooth transceiver, a Near-Field Communication (NFC) device, a wireless modem or cellular radio utilizing GSM, CDMA, 3G, and/or 4G technologies, and/or other suitable wireless technologies known in the art, each of which may include an associated antenna or antennas) suitable for wireless communication with, for example, the central processing center 132, hand-held devices (e.g., smartphones, tablets, etc.), and/or other processing/communication devices. In some embodiments, the collision avoidance system 232 can include a LiDAR system utilizing one or more lasers for three-dimensional (3D) scanning of, for example, the environment in front and/or around the tractor 112 for obstacles. Additionally or alternatively, in other embodiments the collision avoidance system 232 can include time-of-flight camera technology, a radar system for all-weather scanning and detection of objects, camera systems for image recognition and classification, ultrasonic sensors for object detection, etc. Such systems are well known in the art, and as those of ordinary skill in the art will understand, the laser(s), radar antenna(s), and camera(s) associated with the collision avoidance system 232 can be mounted in various suitable locations on the tractor 112 (e.g., the front, rear, and/or sides) to provide a suitable field of view for object detection and avoidance.

With regard to the steering, gearbox, throttle, and brake controls 240, 242, 244, and 246, respectively, such systems for autonomous vehicles are well known in the art, and each of these individual systems can include one or more actuators (e.g., electromechanical actuators, hydraulic actuators, pneumatic actuators, etc.) configured to at least partially operate the corresponding vehicle system (e.g., steering wheel, transmission, throttle, and brakes) in response to control signals provided by the tractor controller 220. Similarly, with regard to the wheel rotation sensor 250, the steering wheel angle sensor 252, and the engine torque sensor 254, such sensors are also well known in the art and suitable wheel rotation sensors, for example, can include magnetic sensors (e.g., Hall effect sensors), micro-switches, etc. Steering wheel angle sensors can include, for example, analog sensors, digital sensors that use LED light and optic sensors, etc. Engine torque sensors can include, for example, strain gauges, rotary transformers, surface acoustic wave (SAW) devices, wireless telemetry, etc.

In some embodiments, the tractor 112 can also include a sensor system 205 mounted to a lower portion of the tractor 112 proximate the rear drive tires 203. As described in greater detail below with reference to FIG. 8, the sensor system 205 can be configured to detect positional locating devices embedded or otherwise positioned on or in the yard surface. In some embodiments, the tractor 112 can further include a display system 222 in the cab 201. The display system 222 can include any suitable display screen known in the art for displaying graphical, textual, and/or other forms of images and information including, for example, a liquid crystal display (LCD), a light-emitting diode display (LED), a cathode ray tube display (CRT), an organic light-emitting diode display (OLED), etc. Such display screens may be used to provide guidance instructions to drivers in those embodiments in which the cab 201 is manned. In addition to the equipment described above, the tractor 112 can also include other equipment and systems that are typically found on conventional tractors and are well known in the art. Such systems can include, for example, conventional safety systems (e.g., flashing lights, horns, beepers, etc.).

Figure 2C:
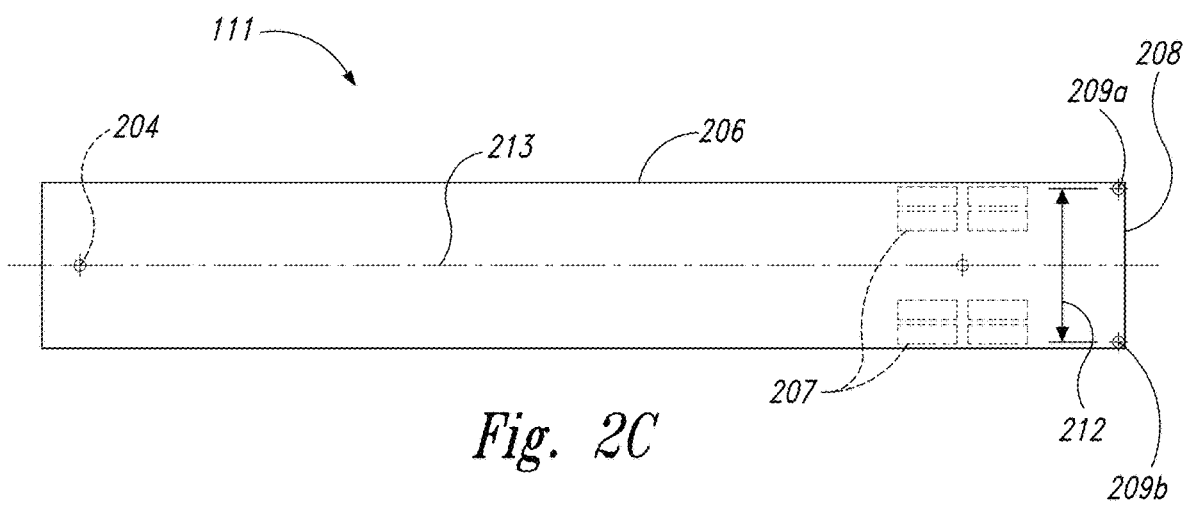
FIG. 2C is a partially schematic plan view of a trailer configured in accordance with embodiments of the present technology.

FIG. 2C is a partially schematic top view of the trailer 111 configured in accordance with embodiments of the present technology. In some embodiments, the trailer 111 includes a kingpin 204 for engagement by the tractor fifth wheel 211, a van body (e.g., a container) or flatbed area 206 for carrying cargo, rear tandem tires 207, and a trailing edge 208 (which can also be referred to as a rear wall portion). Although in some embodiments the tractor 112 can include the fifth wheel 211 for engaging the kingpin 204 of the trailer 111, embodiments of the present technology are not limited to these particular types of engagement devices for structurally coupling the tractor 112 to the trailer 111. Accordingly, in other embodiments, autonomous tractors and other movement vehicles configured in accordance with the present technology can include other types of engagement devices (e.g., other types of hitches, couplings, etc.), for engaging cargo trailers and other transport vehicles, and similarly, cargo trailers and other transport vehicles configured in accordance with the present technology can include other types of corresponding devices for engagement by tractors and other movement vehicles.

Referring to FIGS. 2A-2C together, the tractor 112 can include at least one positional sensor 210 configured to interact with (e.g., detect the location of) at least one trailer sensor target 209. For example, in the illustrated embodiment the tractor 112 includes two positional sensors 210 (identified individually as a first tractor sensor 210a and a second tractor sensor 210b) operably connected to the tractor controller 220 via, e.g., a wired or wireless connection, and the trailer 111 includes two sensor targets 209 (identified individually as a first trailer sensor target 209a and a second trailer sensor target 209b). In the illustrated embodiment, the tractor sensors 210a, b are mounted toward an aft end of the cab 201 and are spaced apart by a known distance 215 about the tractor centerline 214. The tractor sensors 210a, b are mounted above the cab 201 so that they have a horizontal, or an at least approximately horizontal, line of sight to the trailer sensor targets 209a, b. In the illustrated embodiment, the sensor targets 209a, b are mounted at or near the trailing edge 208 of the trailer 111 at or near the same elevation as the tractor sensors 210a, b, and are equally spaced apart by a known distance 212 about a trailer centerline 213. In other embodiments, one or more of the tractor sensors 210a, b can be located in other positions on the tractor 112, and one or more of the trailer targets 209a, b can be located in other positions on the trailer 111. For example, in other embodiments the sensor targets 209a, b can be located along the trailer centerline 213. In some embodiments, the first tractor sensor 210a is identifiably separate from the second tractor sensor 210b (for example, each sensor 210a, b can be associated with a unique electronic/digital code, number and/or signal that can be transmitted to the tractor controller 220, the central processing center 132, and/or other devices to identify the individual sensors). Similarly, in operation the first sensor target 209a can be identifiably separate from second sensor target 209b. For example, in some embodiments each of the trailer sensor targets 209a, b may be associated with a unique digital code, and/or they may have detectably different shapes, identification signals, orientations, materials, and/or components that enable them to be distinguished by the tractor sensors 210a, b. Additionally, in some embodiments, information identifying the individual trailer sensor targets 209a, b, the associated trailers 111 to which they are mounted, and the contents of those trailers 111 can be stored in a database or other memory accessible to the central processing center 132. As described in greater detail below, this information can be used by the central processing center 132 to identify a particular trailer 111 based on the identification of the trailer sensor targets 209a, b mounted to the trailer.

In some embodiments, the trailer sensor targets 209a, b are configured to be readily detected and identified by the tractor sensors 210a, b. For example, in some embodiments the sensors 210a, b can include radar sensors/antennas, and the targets 209a, b can be made from suitable materials (e.g., radar-reflective materials, such as metals) having favorable shapes (e.g., favorable radar cross-sections (RCS)) configured to reflect radar waves and be easily detectable by the sensors 210a, b. In some embodiments, each of the sensors 210a and 210b can be configured to detect the position (e.g., the angle and/or distance from the sensor to the target) of both of the sensor targets 209a and 209b. In other embodiments, the first sensor 210a can be configured to detect the position of only the first target 209a (or the second target 209b), and the second sensor 210b can be configured to detect the position of only the second target 209b (or the first target 209a).

For example, in some embodiments the tractor 112 can include a millimeter wave (mmWave) radar-transmitting antenna 218 positioned on the tractor centerline 214 between the sensors 210a, b, and each of the sensors 210a, b can include a radar-receiving antenna configured to receive the radar signals reflected by the trailer targets 209a, b. As described in greater detail below, the tractor controller 220 (or other processing device) can utilize well-known frequency-modulated continuous wave (FMCW) radar technology to determine the angle of arrival AoA of the reflected radar signals received by the tractor sensors 210a, b. The AoA of these signals defines the angular positions of the trailer sensor targets 209a, b relative to the tractor sensors 210a, b. Once these angles are known, along with the known distance 215 between the sensors 210a, b and the known distance 212 between the trailer targets 209a, b, the angle of the trailer centerline 213 relative to the tractor centerline 214, as well as, for example, the position of the trailing edge 208 of the trailer 111 relative to the sensors 210a, b, can be readily determined using basic geometry. Suitable radar sensors for use in embodiments of the present technology described above can be obtained from, for example, Texas Instruments Incorporated, 12500 TI Boulevard, Dallas, TX 75243.

In other embodiments, each of the tractor sensors 210a, b can include an RFID reader, and each of the trailer sensor targets 209a, b can include an RFID transponder/tag that includes a unique identifier (e.g., a Globally Unique Identifier ("GUID")). In this embodiment, the unique identifiers for the two trailer sensor targets 209a, b, and the identification of the trailer 111 to which they are mounted can be stored in a database or other memory accessible to the central processing center 132. In this way, the central processing center 132 knows which targets are located on which trailer. When approaching a trailer 111, the tractor sensors 210a, b (RFID readers) can read the trailer sensor targets 209a, b (RFID transponder/tags) to confirm the identity of the trailer 111. Additionally, the sensors 210a, b can determine the distances to the targets 209a, b using RSS, time-of-flight, or other suitable RFID distance measuring method known in the art. Once these distances are known, along with the known distance 215 between the sensors 210a, b and the known distance 212 between the trailer targets 209a, b, the angle of the trailer centerline 213 relative to the tractor centerline 214, as well as the position of the trailing edge 208 of the trailer 111 relative to the sensors 210a, b, can be readily determined.

The target position detection systems described above are but two examples of suitable position detection systems that can be used with embodiments of the present technology. As those of ordinary skill in the art will appreciate, there are a number of other well-known systems available for sensing/ detecting the position, distance, angle, and/or identity of targets and other objects, and any of these systems can be used with the present technology disclosed herein. Moreover, in some embodiments, the tractor sensors 210a, b can be configured to determine the distance between themselves and one or both of the trailer sensor targets 209a, b directly without first determining the angles to the targets. For example, in some embodiments the tractor sensors 210a, b can include laser measurement sensors, such as LTF long range time-of-flight laser distance sensors with an IO link from Banner Engineering Corp., 9714 Tenth Avenue North, Minneapolis, MN 55441. Once the distances to the targets 209a, b are known, this information can be used with the known distance 215 between the sensors 210a, b and the known distance 212 between the trailer targets 209a, b, to readily determine the angle of the trailer centerline 213 relative to the tractor centerline 214, as well as, for example, the position of the trailing edge 208 of the trailer 111 relative to the sensors 210a, b using basic geometry. In other embodiments, the tractor sensors 210a, b can include scanning LiDAR sensors, such as a sweep scanning laser range finder from Scanse LLC, of 1933 Davis St #209, San Leandro, CA 94577. The sensors 210a, b can be essentially any type of sensor suitable for use in detecting the presence (or absence) of the targets 209a, b in a field of view. For example, suitable sensor technologies could also include, but are not limited to, RFID, optical sensors (e.g., optical triangulation position sensors), infrared sensors, microwave sensors, photo sensors, ultrasonic sensors, sonar sensors, inductive loop sensors, thermal sensors, magnetic sensors, camera analytics sensors, dome coherent fiber optic directional sensors, etc. In some embodiments, sensing systems configured in accordance with the present technology can include a combination of different systems, such as, for example, systems with both distance and angle measuring capabilities. Accordingly, embodiments of the present technology are not limited to use with any particular position and/or identification sensing technology, and can be used with any suitable position and/or identification sensing technology known in the art.

Moreover, although in the embodiments described above the sensors 210a, b are mounted on the tractor 112 and the targets 209a, b are mounted on the trailer 111, it will be understood that the present technology is not limited to this arrangement. Accordingly, in other embodiments one or more sensors can be mounted to the trailer 111, and one or more corresponding targets can be mounted to the tractor 112. In such embodiments, the sensors and targets can generally operate in the manner described above to determine the relative positioning of the tractor 112 and the trailer 111 without departing from the present technology. In some embodiments, the targets 209a, b can be temporarily mounted to the trailer 111 by, for example, a loading dock operator and/or other personnel after the trailer 111 arrives at the distribution center 100. In such embodiments, the identity of the particular targets 209a, b and the associated trailer 111 to which they are mounted could be manually or otherwise recorded in a yard management database for later access by, for example, the central processing center 132. The targets 209a, b could remain on the trailer 111 as long as is needed for trailer operations within the yard 102, and then could be removed prior to trailer departure from the yard 102. In other embodiments, the targets 209a, b can be permanently mounted to the trailer 111, and can remain on the trailer 111 during over-the-road operations outside of the center 100. For example, in some embodiments it is contemplated that the targets 209a, b could be mounted, positioned or otherwise incorporated onto the trailer 111 at the time of trailer manufacture.

Loading Dock Station

Figure 3:
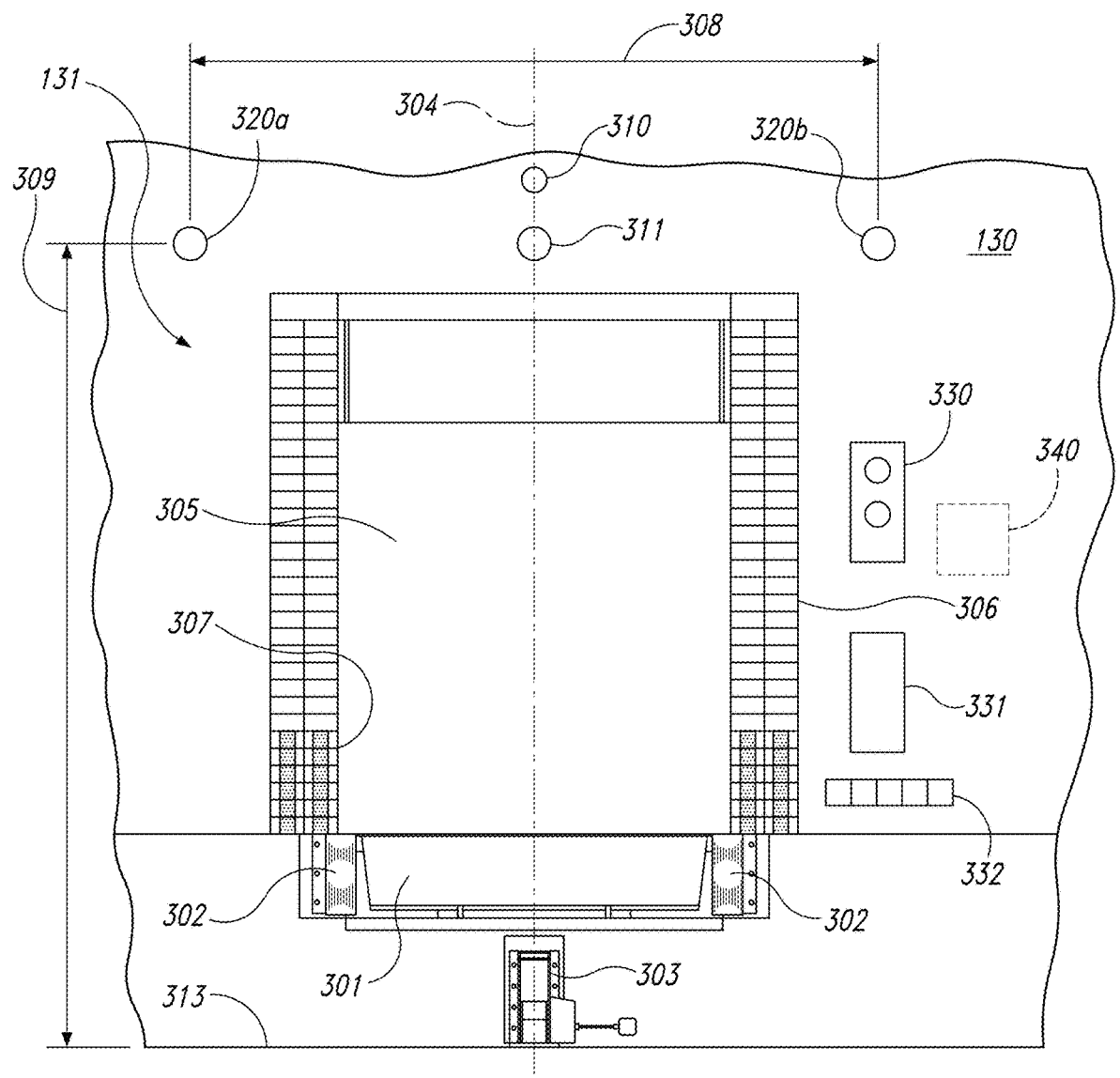
FIG. 3 is a partially schematic elevation view of a loading dock station configured in accordance with embodiments of the present technology.

FIG. 3 is an exterior elevation view of the dock station 131 configured in accordance with embodiments of the present technology. In some embodiments, the dock station 131 includes a dock leveler 301 for material transport between the building 130 and the trailer 111 (FIG. 1) via an opening 307, a set of dock bumpers 302 to interface between the building 130 and the trailer 111 and prevent damage to the building 130, and a vehicle restraint 303 configured to releasably engage the trailer 111 and prevent inadvertent movement of the trailer 111 away from the dock station 131 during loading and unloading. The dock station 131 can further include a dock door 305 (e.g., an overhead door) to cover the opening 307 when not in use, and a dock shelter or seal 306 to help seal the dock opening 307 around the trailer body 206. The dock station 131 can also include a signal light or lights 330 to indicate to a vehicle driver when it is safe to approach and depart the dock station, as well as an instructional placard 331 with related information. In addition, in some embodiments the dock station 131 can further include guide lights 332 to facilitate trailer alignment, as described in greater detail below with reference to FIG. 19. The dock station 131 can also include a control panel 340 located on an inside wall of the building 130 adjacent to the dock opening 307 that, in some embodiments, is configured to enable dock personnel to control operation of the dock equipment described above to, for example, raise the dock door 305, extend/retract the dock leveler 301, engage the trailer restraint 303, etc., in a conventional manner. The structure and function of the dock leveler 301, the dock bumpers 302, the vehicle restraint 303, the door 305, the shelter 306, the lights 330, and the control panel 340 can be of conventional design and function as will be readily understood by those of ordinary skill in the art. In some embodiments, all the dock stations 131 shown in FIG. 1 can have the configuration shown in FIG. 3, or they can have configurations that are at least generally similar in structure and function to the configuration shown in FIG. 3. In other embodiments, one or more of the dock stations 131 may have configurations that differ in some respects to the configuration shown in FIG. 3.

In addition to the components and systems described above, the dock station 131 can also include one or more positional sensors 320 (identified individually as a first dock sensor 320a and a second dock sensor 320b) operably connected to the central processing center 132 (FIG. 1) and configured to communicate therewith via, for example, wired or wireless connections. In some embodiments, the dock sensors 320a, b are uniquely identifiable and spaced apart by a known distance 308 about a dock station centerline 304. The sensors 320a, b are positioned at a waterline height 309 above the yard surface or ground 313 to sufficiently ensure that they have an unobstructed view and/or are within sensing range of the trailer sensor targets 209a, b (FIG. 2C) on the transport vehicle trailer 111 when the trailer 111 backs into the dock station 131. In operation, the sensors 320a, b are configured to detect the positions of the sensor targets 209a, b as the trailer 111 approaches the dock station 131. For example, in some embodiments, each of the sensors 320a, b is configured to detect the azimuth angle (in, e.g., degrees) between a projected vector from it to one (or both) of the sensor targets 209a, b and, e.g., the dock face. In other embodiments, the sensors 320a, b can be configured to directly detect the distances between them and the targets 209a, b. In some embodiments, each of the sensors 320a and 320b can be configured to detect the position (e.g., the distance and/or angle from the sensor to the target) of both of the sensor targets 209a and 209b. In other embodiments, the first sensor 320a can be configured to detect the position of only the first target 209a (or the second target 209b), and the second sensor 320b can be configured to detect the position of only the second target 209b (or the first target 209a).

For example, in some embodiments the dock station 121 can include a mmWave radar-transmitting antenna 311 positioned on the dock centerline 304 between the dock sensors 320a, b, and each of the sensors 320a, b can include a radar-receiving antenna configured to receive the radar signals reflected by the trailer targets 209a, b and determine the angles of arrival AoA of the radar signals. The AoA of these signals defines the angular positions of the sensor targets 209a, b relative to the sensors 320a, b. As described in greater detail below with reference to FIGS. 14A-14C, once these angles are known, along with the known distance 308 between the sensors 320a, b and the known distance 212 between the trailer targets 209a, b, the angle of the trailer centerline 213 relative to the dock centerline 304, as well as, for example, the position of the trailing edge 208 of the trailer 111 relative to the dock centerline 304, can be readily determined using basic geometry. Suitable radar sensors for use in embodiments of the present technology described above can be obtained from, for example, Texas Instruments Incorporated, 12500 TI Boulevard, Dallas, TX 75243.

In other embodiments, each of the dock sensors 320a, b can include an RFID reader, and each of the trailer targets 209a, b can include an RFID transponder/tag that includes a unique identifier (e.g., a GUID). In this embodiment, as the trailer 111 approaches the dock station 131, the tractor sensors 210a, b (RFID readers) can read the trailer targets 209a, b (RFID transponder/tags) to confirm the identity of the trailer 111. Additionally, the dock sensors 320a, b can determine the distances to the targets 209a, b using RSS, time-of-flight, or other suitable RFID distance measuring technology known in the art. Once these distances are known, along with the known distance 308 between the sensors 320a, b and the known distance 212 between the trailer targets 209a, b, the angle of the trailer centerline 213 relative to the dock centerline 304, as well as the position of the trailing edge 208 of the trailer 111 relative to dock centerline 304, can be readily determined using basic geometry.

The target position sensor embodiments described above are but two examples of suitable position detection systems that can be used with the dock station 131 in accordance with embodiments of the present technology. As those of ordinary skill in the art will appreciate, there are other well-known systems available for sensing/detecting the position of targets and other objects, and any of these systems can be used with the present technology disclosed herein. For example, in some embodiments the sensors 320a, b can include laser measurement sensors, such as LTF long range time-of-flight laser distance sensors with an TO link from Banner Engineering Corp., 9714 Tenth Avenue North, Minneapolis, MN 55441. In other embodiments, the sensors 320a, b can include scanning LiDAR sensors, such as a sweep scanning laser range finder from Scanse LLC, of 1933 Davis St #209, San Leandro, CA 94577. The sensors 320a, b can be essentially any type of sensor suitable for use in detecting the presence (or absence) of the targets 209a, b in a field of view. For example, suitable sensor technologies could also include, but are not limited to, RFID, optical sensors (e.g., optical triangulation position sensors), infrared sensors, microwave sensors, photo sensors, ultrasonic sensors, sonar sensors, inductive loop sensors, thermal sensors, magnetic sensors, camera analytics sensors, dome coherent fiber optic directional sensors, etc. Accordingly, embodiments of the present technology are not limited to use with any particular position sensing technology, and can be used with any suitable position sensing technology known in the art.

Moreover, although in the embodiments described above the sensors 320a, b are mounted on the dock station 131 and the targets 209a, b are mounted on the trailer 111, it will be understood that the present technology is not limited to this arrangement. Accordingly, in other embodiments one or more sensors can be mounted to the trailer 111, and one or more corresponding targets can be mounted to the dock station 131. In such embodiments, the sensors and targets can generally operate in the manner described above to determine the relative positioning of the trailer 111 and the dock station 131 without departing form the present technology.

Guidance System

Figure 4A:
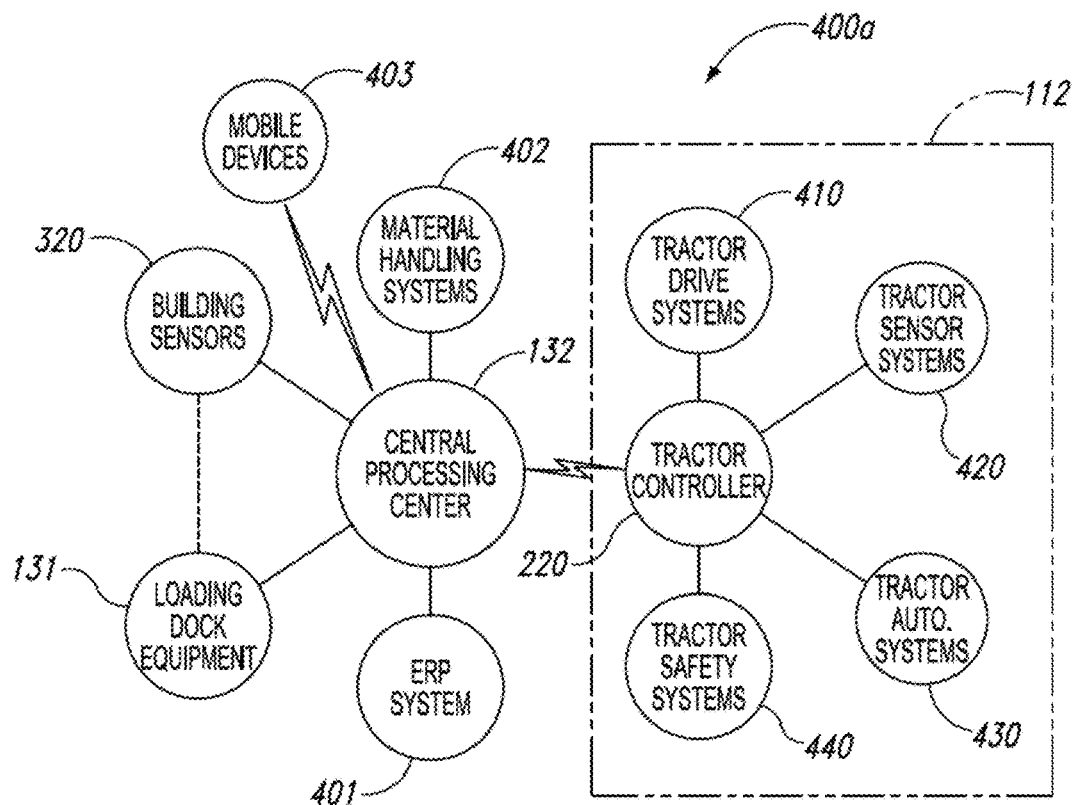
FIG. 4A is a schematic diagram of a guidance system configured in accordance with embodiments of the present technology.

FIG. 4A is a schematic diagram of a guidance system 400a configured in accordance with embodiments of the present technology. In the illustrated embodiment, the central processing center 132 is operably connected (via, e.g., one or more communication links, such as wired links, wireless links, etc.) to multiple systems including, for example: a facility enterprise resource planning (ERP) system 401 and associated material handling systems 402 (such material handling systems can include, for example, yard management systems, facility interior vehicle autonomous management systems, inbound/outboard freight systems, etc.), the dock equipment at the dock stations 131 (e.g., the equipment control panel 340 and/or the vehicle restraint 303, the dock door 305, the dock leveler 301, the signal lights 330, the camera 310, etc.), the dock sensors 320a, b, and/or driver and dock operator mobile/handheld devices 403 (e.g., smartphones). In some embodiments, the dock sensors 320a, b and/or the dock equipment can be operably connected to the central processing center 132 via the individual dock station control panels 340. In other embodiments, the dock sensors 320a, b and/or the dock equipment can be directly connected to the central processing center 132. The central processing center 132 is also operably connectable via, for example, wireless connectivity to the tractor controller 220 via, for example, the tractor communication system 223 (FIG. 2A).

As described above with reference to FIG. 2A, the tractor controller 220 can be operably connected (via, e.g., wired or wireless connections) to various tractor systems and subsystems, including tractor drive systems 410 (including, for example, the steering control 240, the gearbox control 242, the throttle control 244, the brake control 246, etc.), tractor sensor systems 420 (including, for example, the wheel rotation sensor 250, the steering wheel angle sensor 252, the engine torque sensor 254, etc.), tractor autonomous systems 430 (including, for example, the navigation system 231, the communication system 223, a tractor/trailer positional sensor system 210a, b, etc.), and tractor safety systems 440 (including, for example, the collision avoidance system 232, etc.).

Figure 4B:
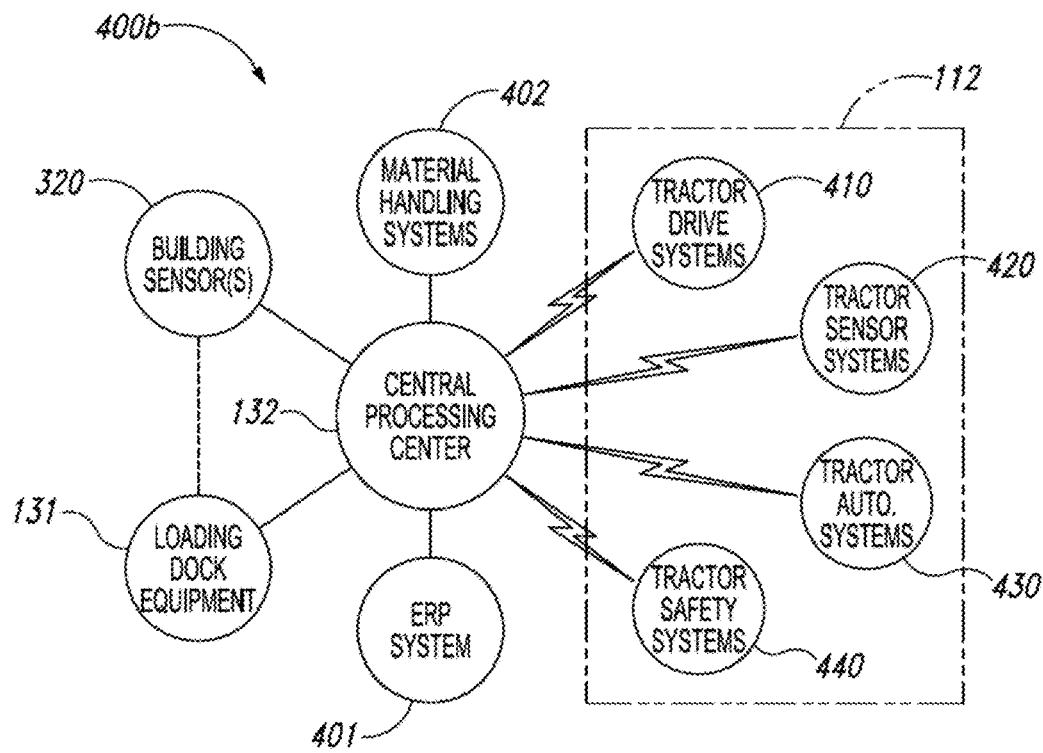
FIG. 4B is a schematic diagram of a guidance system configured in accordance with other embodiments of the present technology.

By way of example, wireless communication between the central processing center 132 and the tractor controller 220, as well as other wireless communication between the central processing center 132, the dock station control panels 340, the display system 222, the trailer 111, the driver and dock operator mobile/handheld devices 403, and/or other systems in the logistics yard 102 and the distribution center 100, can be implemented in accordance with one or more of the following standards known in the art:

- IEEE 802.15.4—Such as ZigBee or Thread (with the possibility of a mesh network)
- IEEE 802.11x—Such as a WLAN (Wireless Local Area Network) (with the possibility of a mesh network), or Wi-Fi Beacons
- Bluetooth SIG—Such as BT5.0, BTLE, Bluetooth Beacons, or Bluetooth Mesh
- Cell Technologies—Such as 2G, 3G, 4G, LTE, 5G, LTE-M, NB-IOT, or LPWAN (Low Power Wide Area Network), e.g., LoRa
- IEEE 802.16—Such as WiMAX FIG. 4B is a schematic diagram of a guidance system 400b configured in accordance with another embodiment of the present technology. In this embodiment, the tractor controller 220 (or at least a substantial portion thereof) can be omitted, and the individual tractors 112 in the logistics yard 102 can be controlled directly by the central processing center 132. More specifically, in this embodiment, the various tractor systems and subsystems, including the tractor drive systems 410, the tractor sensor systems 420, the tractor autonomous systems 430, and the tractor safety systems 440, can communicate directly with the central processing center 132 (via, e.g., wireless connectivity) and receive operating commands directly therefrom.

Central Processing Center

Figure 5A:
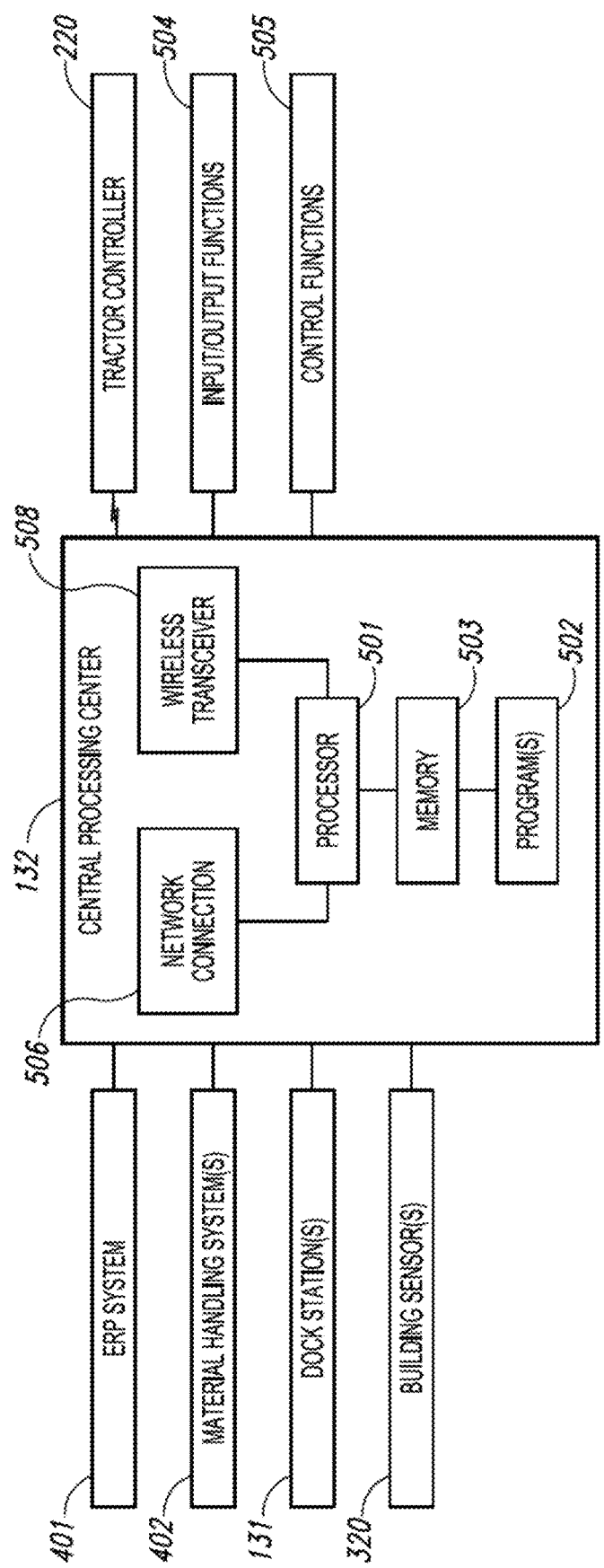
FIG. 5A is a block diagram of a central processing center and associated systems configured in accordance with embodiments of the present technology.

FIG. 5A is a block diagram of the central processing center 132 and associated systems configured in accordance with embodiments of the present technology. In the illustrated embodiment, the central processing center 132 includes a processor 501 configured to process logic and execute the processing center routines, algorithms and/or other computer-executable instructions described herein (identified as programs 502), which can be stored in memory 503 and/or other computer-readable media. The processor 501 can include any logic processing unit, such as one or more microprocessors, central processing units (CPUs), digital signal processors (DSPs), application-specific integrated circuits (ASICs), etc. The processor 501 may be a single processing unit or multiple processing units in a single device or distributed across multiple devices. In some embodiments, the central processing center 132 further includes a network connection 506 (e.g., a wired connection, such as an Ethernet port, cable modem, FireWire cable, Lightning connector, USB port, etc.) suitable for communication with remote processing devices at the distribution center 100 and elsewhere, and a wireless transceiver 508 (e.g., including a Wi-Fi access point, a Bluetooth transceiver, a near-field communication (NFC) device, and/or a wireless modem or cellular radio utilizing GSM, CDMA, 3G, and/or 4G technologies, each of which may include an associated antenna or antennas) suitable for wireless communication with other processing and communication devices via, for example, direct wireless communication or a communication network or link (which could include the Internet, a public or private intranet, a local or extended Wi-Fi network, etc.). For example, in some embodiments, the processor 501 can receive information from and/or provide information to the ERP system 401, the material handling systems 402, the dock stations 131 and associated dock equipment (via, e.g., the control panels 340), the dock sensors 320a, b, input/output functions 504, and control functions 505 via the network connection 506 and/or the wireless transceiver 508. Additionally, the processor 501 can also receive information from, and provide information and/or operating commands to the tractor controller 220 via the wireless transceiver 508. In some embodiments, the wireless transceiver 508 can also facilitate wireless communication with handheld devices (e.g., smartphones), such as the mobile devices 403, in the proximity of the distribution center 100 (FIG. 1) or remote therefrom. As those of ordinary skill in the art will appreciate, in some embodiments the central processing center 132 can also be referred to as a central computer or simply a computer, a central processing device or simply a processing device, and the like without departing from the present disclosure.

Although FIG. 5A illustrates communications through the central processing center 132, in some embodiments of the present technology other paths and types of communication between various components are possible. For instance, the central processing center 132 may be in direct communication with equipment at the dock stations 131. Or, rather than go through the tractor controller 220, the tractor navigation system 231 (FIG. 2A) may be in direct communication with the central processing center 132.

In some embodiments, the processing center 132 is configured to direct the movement of tractor/trailer combinations 110 or individual tractors 112 within the yard 102 following a work flow process (or procedure) as a result of input from the ERP system 401. By way of example, and referring to FIG. 1, a suitable workflow process may include instructions for a given tractor 112 to pick up a specific trailer 111 at a specified parking location 115, and move the trailer 111 to a specific dock station 131 for unloading/loading. The workflow process could further include instructions to pick up a particular trailer 111 at a specific dock station 131, and move the trailer 111 to a parking location 115. In some embodiments, the central processing center 132 can direct the tractor controller 220 to follow a set of computer-executable guidance instructions using a pre-determined path, a path provided by the navigation system 231, or a combination of the two. The guidance instructions can include a sequence of computer-readable coordinates on a digital ground map of the yard 102, and/or other suitable logic for defining the tractor paths and destinations. As described in greater detail below, once at the dock area the tractor controller 220 can be given a set of computer-executable instructions to back into the dock station 131. Once the trailer targets 209a, b are in view of the dock sensors 320a, b, the dock sensors 320a, b can provide trailer target positional information to the central processing center 132, and the processing center 132 can provide additional guidance information to the tractor 112 to enable more directional precision during the parking process at the dock 131.

Figure 5B:
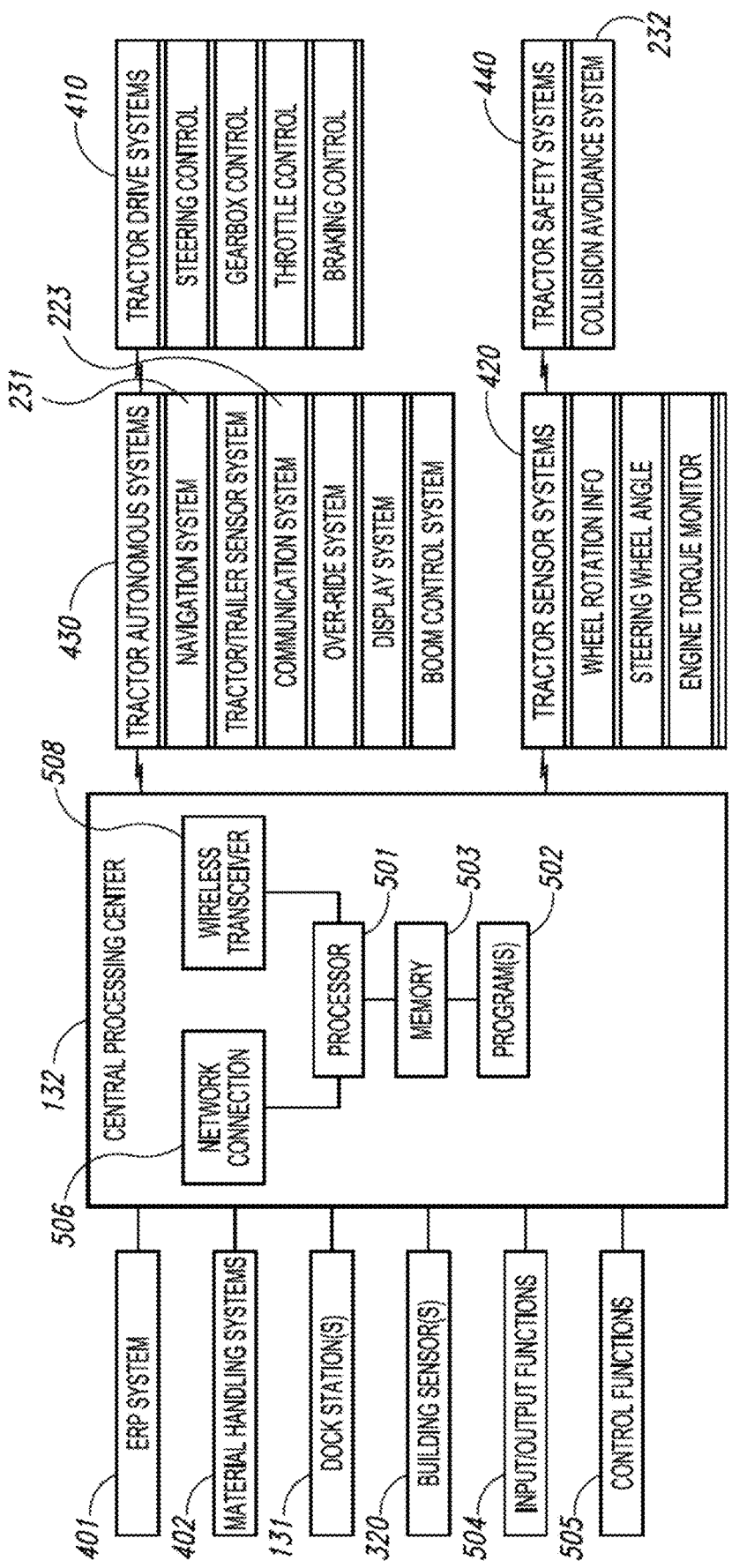
FIG. 5B is a block diagram of a central processing center and associated systems configured in accordance with other embodiments of the present technology.

FIG. 5B is a block diagram of the central processing center 132 and associated systems configured in accordance with another embodiment of the present technology. In this embodiment, the individual tractors 112 in the logistics yard 102 can be controlled directly by the central processing center 132, similar to the embodiment of FIG. 4B described above. More specifically, in this embodiment the various tractor systems and subsystems, including the tractor drive systems 410, the tractor sensor systems 420, the tractor autonomous systems 430, and/or the tractor safety systems 440 (e.g., the collision avoidance system 232) can communicate directly with the central processing center 132 (via, e.g., wireless connectivity) and receive operating commands directly therefrom, rather than receive operating commands via the tractor controller 220.

Tractor Controller

Figure 6:
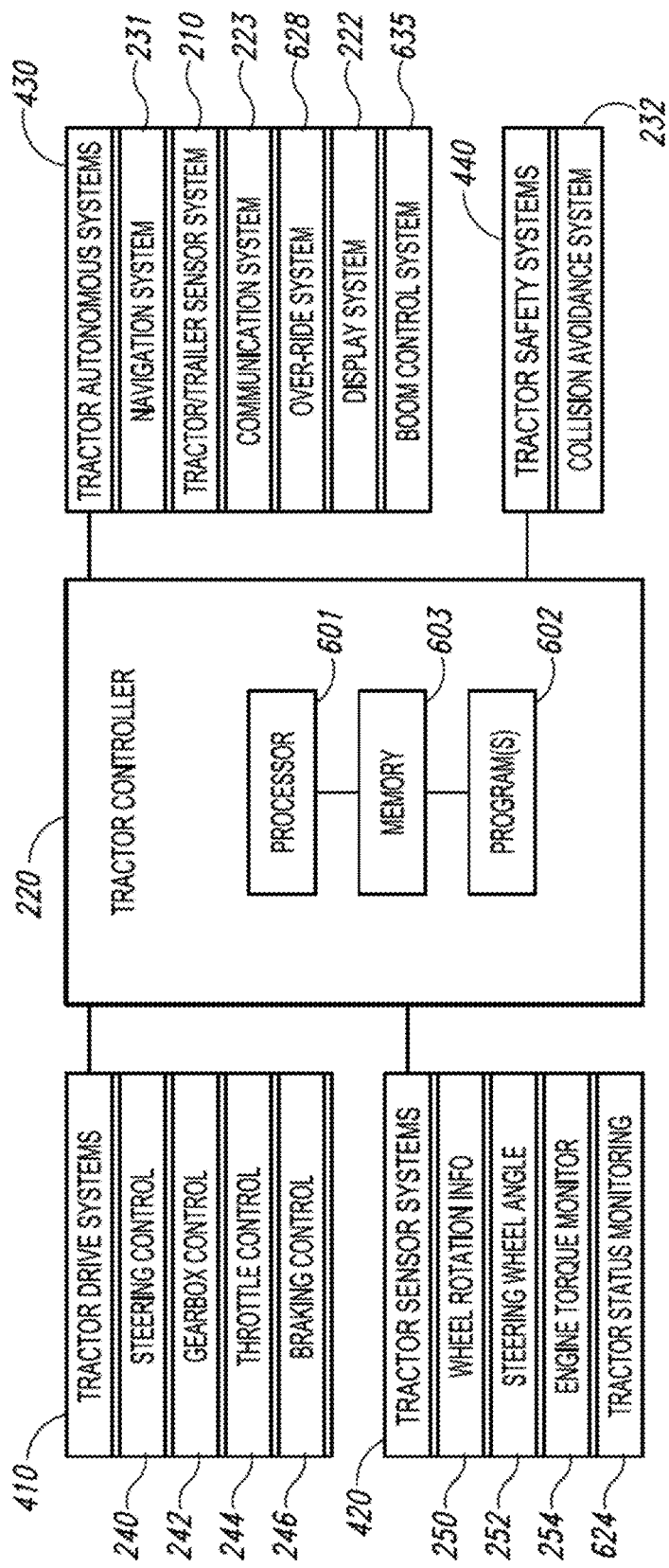
FIG. 6 is a block diagram of an autonomous tractor controller and associated systems configured in accordance with embodiments of the present technology.

FIG. 6 is a block diagram of the tractor controller 220 and associated systems configured in accordance with embodiments of the present technology. In the illustrated embodiment, the tractor controller 220 includes a processor 601 configured to process logic and execute the controller routines, algorithms and/or other computer-executable instructions described herein (identified as programs 602) stored in memory 603 and/or other computer-readable media. The processor 601 may be a single processing unit or multiple processing units, and can include a microprocessor, a CPU, a DSP, an ASIC, or any other suitable logic processing unit known in the art. In some embodiments, the processor 601 is operably connected to, and can receive operational information from and/or provide operational control signals to, the tractor drive systems 410, the tractor sensor systems 420, the tractor autonomous systems 430 (which can include an over-ride system 628 and a boom control system 635), and the tractor safety systems 440. It should be noted that the tractor controller 220 may be a stand-alone dedicated controller, or it may be a shared controller integrated with other control functions, for example, with the sensor system 210, the navigation system 231, the sensor systems 420 (which can include status monitoring sensors 624 for, e.g., monitoring the status of fuel, oil, etc.), and/or other on- or off-board vehicle control systems. Additionally, although the tractor controller 220 of some embodiments is located on the tractor 112, in other embodiments, the tractor controller 220 can be located remotely from the tractor 112.

The tractor controller 220 can generate vehicle steering and throttle commands to achieve a commanded path of travel for the trailer 111 using the information received from the tractor systems, navigational information, and a workflow process. For example, in some embodiments, the tractor controller 220 is configured for:

- Wireless communication between the tractor 112 and the central processing center 132
- Receiving command inputs from the central processing center 132
- Operating in accordance with either a local or central processing center 132 workflow procedure
- Commanding tractor movement based on a stored workflow procedure and interfacing with and commanding the tractor autonomous systems 430
- Outputting system status and location information to the central processing center 132
- Receiving and interpreting location information from the navigation system 231 as required
- Communicating information and interfacing with a human driver (in manned embodiments) via the tractor driver display 222

As noted above, the navigation system 231 can include a global positioning system (GPS), a laser ranging system, a radio directional system or other type of 2D location system known in the art. The navigation system 231 may be independent of the central processing center 132 or may act in concert with facility sensors (e.g., the dock sensors 320a, b) and/or other active systems. In some embodiments, the controller 220 can be configured to determine the 2D position of the tractor 112 and/or the trailer 111 relative to, for example, the yard 102, the building 130, and/or another frame of reference, and to determine the angular orientation (0-360 degrees) of the centerline of the tractor 112 and/or the trailer 111 relative to, e.g., an established ground map of, e.g., the center 100, or other frame of reference or reference datum. For example, in some embodiments the controller 220 can determine the 2D position of the tractor 112 and the angular orientation of the tractor centerline 214 based on information received from the navigation system 231 and/or the beacons 106a-c described above with reference to FIG. 1. In other embodiments, the controller 220 can determine this information by using a plurality of geographical markers, such as visual markers (e.g., painted lines on the yard surface designating selected paths and/or locations) that are recognized via the tractor imaging systems, or by using wireless targets or transmitting devices that are embedded in the roadway in known locations and detected by the tractor sensor systems. This information, combined with positional information from the GPS of the navigation system 231, can provide the location and attitude of the tractor 112 within the yard 102. Once the tractor attitude is known, the trailer attitude can be determined using input from the sensors 210a, b as described in more detail below.

Examples of Use

Figure 7A:
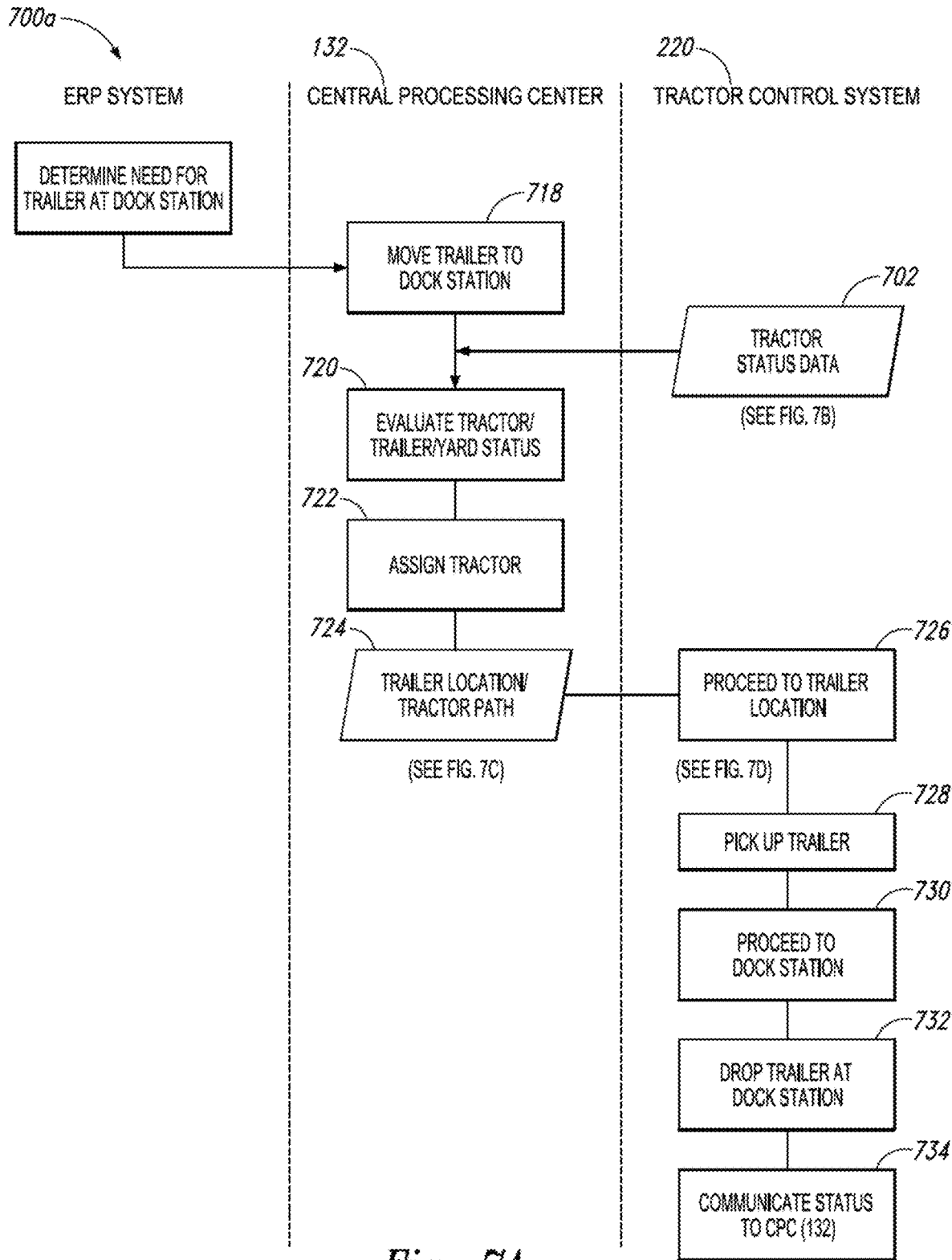
FIGS. 7A-7D are a series of flow diagrams illustrating representative routines that can be executed by a central processing center and/or a tractor controller in accordance with embodiments of the present technology.

FIGS. 7A-7D are a series of flow diagrams illustrating example routines 700a-700d, respectively, that can be executed by the central processing center 132 and/or the tractor controller 220 in accordance with instructions stored on computer-readable media. Referring first to FIG. 7A, the routine 700a begins when a terminal tractor 112 or a similarly equipped OTR tractor is positioned within the logistics yard 102. In block 702, while operational the tractors 112 in the yard 102 wirelessly communicate tractor status data (e.g., their position in the logistics yard 102, their operational status, etc.) to the central processing center 132.

Figure 7B:
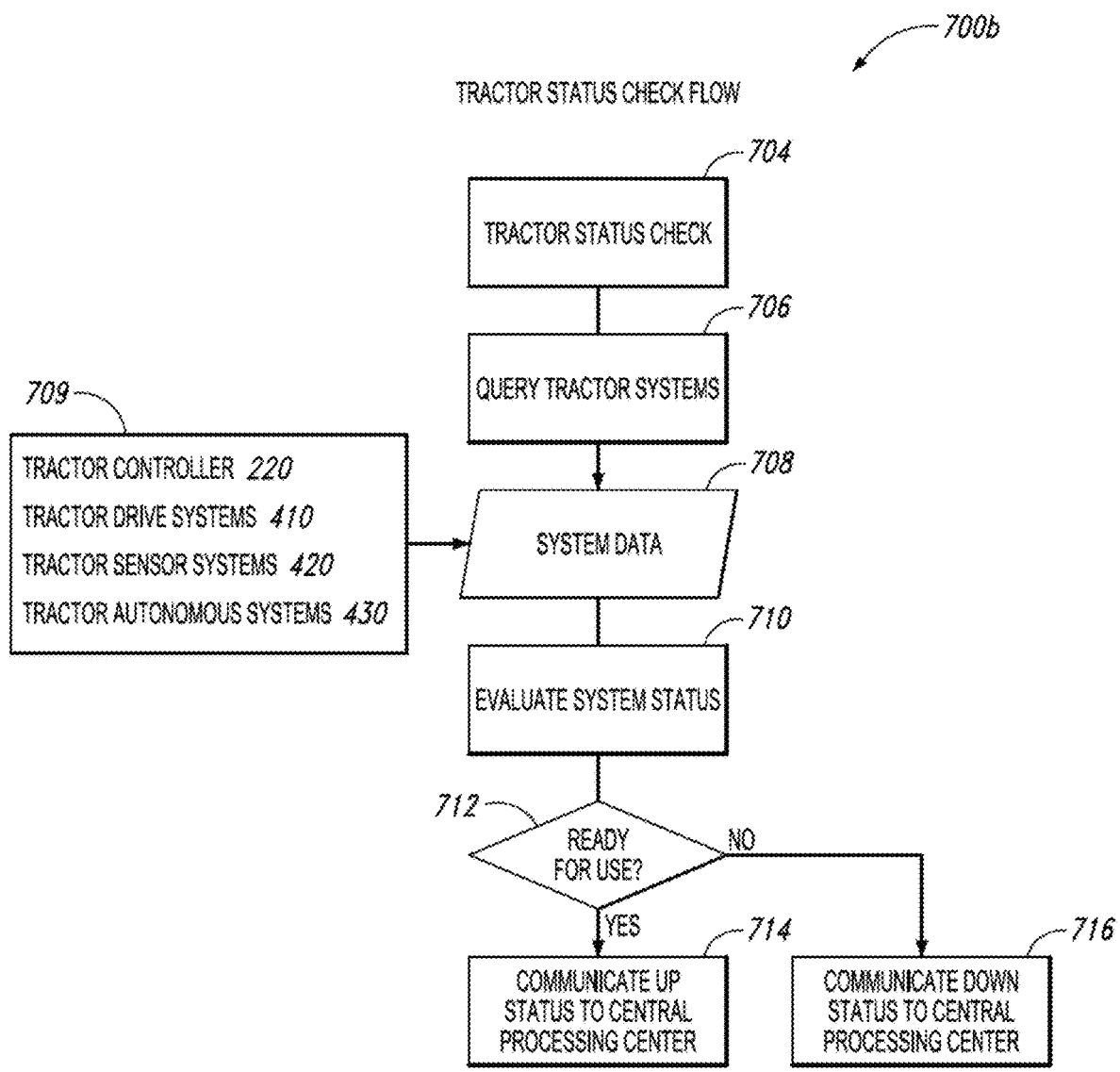

Turning next to FIG. 7B, in some embodiments the tractor status data associated with block 702 (FIG. 7A) can be obtained using the tractor status check routine 700b. In some embodiments, the routine 700b can be executed by the tractor controller 220 (e.g., the processor 601) in accordance with computer-executable instructions (e.g., program(s) 602) stored in memory 603 (FIG. 6). In other embodiments, all or a portion of the routine 700b can be executed by other processing devices, such as the central processing center 132. In block 704, the routine 700b checks the tractor status, which can include deriving positional data based on input from the tractor navigation system 231, from the tractor sensors 210a, b (if, for example, trailer positional data is needed), or a combination of the two. In some embodiments, the positional data should include, at a minimum, the 2D X-Y positional coordinates of the tractor 112 (and, in some embodiments, the trailer 111) in relation to an established ground map of, for example, the distribution center 100, as well as the positional attitude (0-360 degrees) of the tractor centerline 214 (and, in some embodiments, the trailer centerline 213) or the like in relation to the established ground map. In block 706, the routine 700b queries the tractor systems for their operational status. As shown in blocks 708 and 709, in some embodiments this can include querying the following systems and subsystems for their operational status:

a. The Tractor Controller—220
   i. The processor—601
   ii. The program(s)—602
   iii. The memory—603
   iv. Input/Output Functions b. Tractor Drive Systems—410
   i. Steering Control—240
   ii. Gearbox Control—242
   iii. Throttle Control—244
   iv. Braking Control—246 c. Tractor Sensor Systems—420
   i. Wheel Rotation Sensor—250
   ii. Steering Wheel Angle Sensor—252 iii. Engine Torque Sensor—254
iv. Tractor Status Sensor—624
  1. Engine
  2. Fuel/Oil
d. Tractor Autonomous Systems—430
  i. Navigation System—231
  ii. Tractor/Trailer Sensor System—210
  iii. Communication System—223
  iv. Over-ride System—628
  v. Display system—222
  vi. Boom Control System—635
    1. Boom arm actuation
    2. Kingpin entrapment actuation and verification
    3. Service line verification (trailer air and electrical)
e. Tractor Warning/Safety Systems—440
  i. Collision Avoidance System—232
  ii. Lights
  iii. Horn(s)

In some embodiments, the tractor controller 220 can query the tractor systems for their operational status, which can include prompting or otherwise causing the individual systems to perform self-tests and/or respond to other inputs to confirm the range of operability of the systems, checking continuity of system circuits, checking system operating parameters (e.g., hydraulic pressures), etc. In block 710, the routine 700b evaluates the status information received in block 708 to determine if all, or at least a sufficient number, of the tractor systems are operational within a preset acceptable range. In decision block 712, the routine 700b determines if the tractor 112 is ready for use based on the results of block 710. If so, the routine 700b communicates an "up status" for the tractor 112 to the central processing center 132 in block 714. If not, the routine 700b communicates a "down status" to the central processing center 132 in block 716.

Returning to the routine 700a of FIG. 7A, in block 718 the central processing center 132, in response to inputs from the ERP system 401, a central processing center programming package, manual direction, or any combination of these, determines that a particular trailer 111 located in the logistics yard 102 at a specified parking location 115 is required at a specific dock station 131 for loading or unloading operations (FIG. 1). In block 720, the central processing center 132 responds to this determination by evaluating the status of the tractors 112 under its control based on position, availability, and/or other factors. In addition to the tractor's position and availability, the central processing center 132 may also take into consideration the current and future activity level and traffic in the logistics yard 102, the position of the specific tractor 112 relative to the position of the target trailer 111, and/or other common yard management activities and considerations. Based on this evaluation, the central processing center 132 assigns a specific tractor 112 to move the specific trailer 111 to the specific dock 131, as shown in block 722. In block 724, the central processing center 132 sends a wireless communication to the specific tractor 112 with instructions for moving the specific trailer 111 to the specified dock station 131. In addition to the movement task, in some embodiments, the central processing center 132 may also command a path from the current location of the tractor 112 to the parking location of the specific trailer 111, as well as a path from the trailer parking location to the specified dock station 131. In addition, the central processing center 132 may schedule the movements of the entire path or certain portions of the movement path for the specific tractor 112 to facilitate traffic control in the logistics yard 102.

In block 726, the tractor controller 220 responds to the commands from the central processing center 132 and commands the tractor drive systems 410 (FIG. 4A) to move the tractor 112 to the location of the designated trailer 111. In block 728, the tractor controller 220 commands the tractor 112 to engage the trailer kingpin 204 with the tractor fifth wheel 211 and pick up the trailer 211, and in block 730 the controller 220 commands the tractor/trailer combination 110 to proceed to the specified dock station 131. In block 732, the controller 220 commands the tractor 112 to position the trailer 111 at the dock door 305 (FIG. 3) for loading/unloading, and in block 734, the controller 220 communicates the tractor/trailer status to the central processing center 132. Methods and systems for carrying out some embodiments of the tractor movements described above are described in more detail below with reference to, for example, FIG. 7C and FIGS. 8-13C.

Figure 7C:
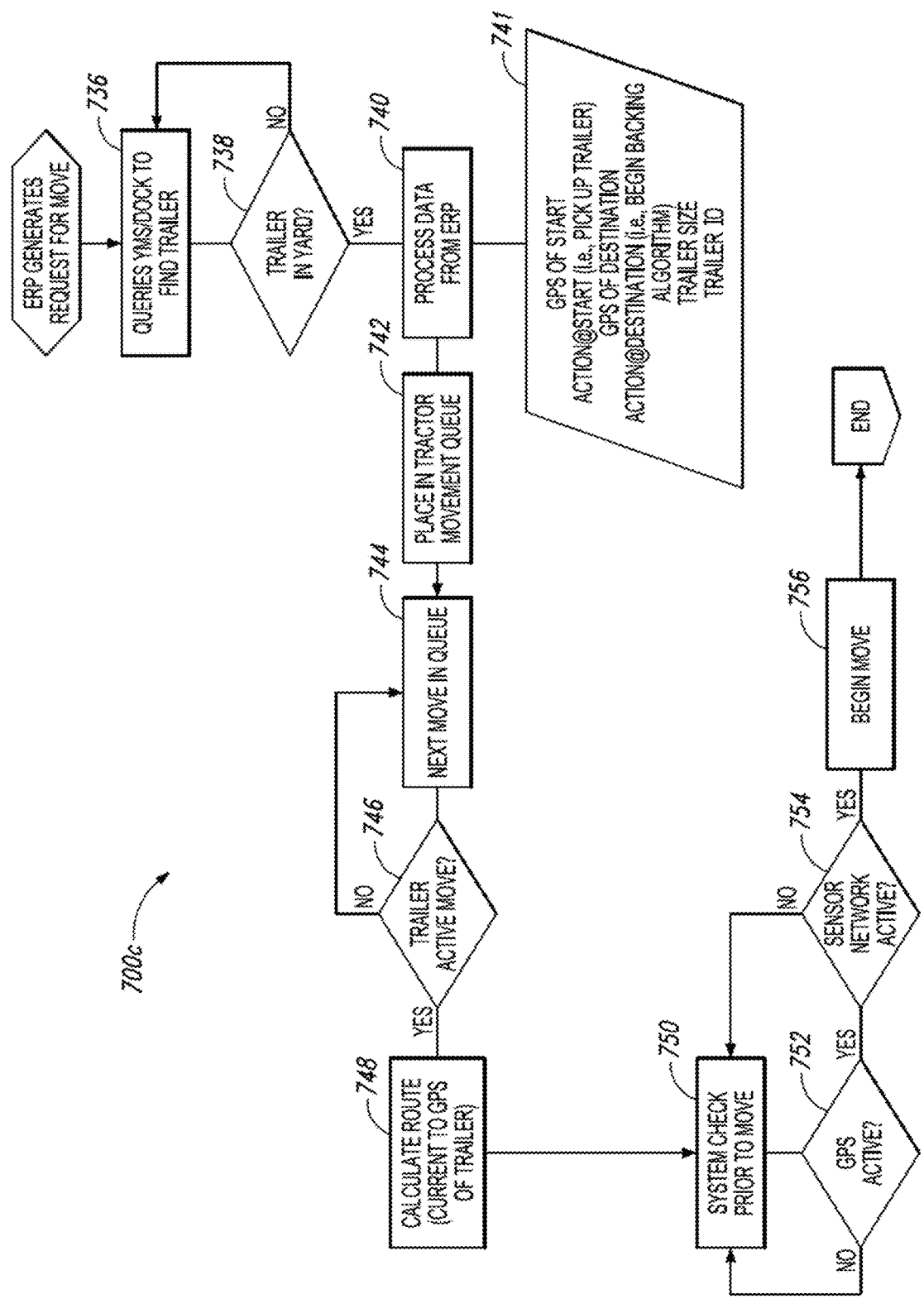

FIG. 7C is a flow diagram of a routine 700c related to initial stages of a trailer movement in accordance with some embodiments of the present technology. The routine 700c starts when the ERP system 401 (FIG. 4A) generates a request for a trailer move. For example, based on the needs of the enterprise, the ERP system 401 can send a request to the central processing center 132 that a particular trailer 111 be moved to a particular dock station 131 for loading/unloading of cargo. In block 736, the central processing center 132 can query a yard or dock management system to determine if the particular trailer 111 is present in the yard 102, and if so, which parking space 115 the trailer 111 is located in. In decision block 738, based on the response to the query, the routine determines if the trailer 111 is the yard. If not, the routine returns to block 736 and repeats. If the trailer 111 is in the yard, the routine proceeds to block 740 to process move data received from the ERP. As shown in block 741, the move data can include, for example, the GPS location of the tractor starting position for picking up the trailer (as described in greater detail below with reference to, e.g., FIG. 8), the tractor action at the start position (e.g., to engage the trailer 111), the GPS location of one or more trailer destinations (e.g., a start position for backing the trailer up to a selected dock station 131 and/or the selected dock station 131, as described in more detail below with reference to, e.g., FIGS. 11A-13C), the action at the trailer destination (e.g., to begin the routine for backing the trailer up to the dock station 131), the trailer size (e.g., the length of the trailer from, for example, the kingpin 204 to the trailing edge 208, the overall length, width and/or height of the trailer body 206, etc.), trailer identification information (e.g., the GUID or other identifiers associated with the trailer targets 209a,b), and/or other information related to the trailer 111, its contents, etc.

In block 742, the routine stores the data for the new trailer move in a tractor movement queue. In block 744, the routine selects the next move in the tractor movement queue, and in decision block 746, the routine determines if the next tractor move is the new trailer move. If not, the routine returns to block 744 and repeats. If the new trailer move is the next tractor move, then the routine proceeds to block 748 and calculates a route for the tractor from its current position to the GPS location of the selected trailer 111. In block 750, the tractor controller 220 performs a system check prior to the move. For example, in decision block 752 the controller can confirm that the tractor navigation system 231 (including, e.g., the GPS) is active. If not, the routine returns to block 750 and repeats the system check. If the navigation system 231 is active, the routine proceeds to decision block 754 to confirm that the tractor sensor systems 420 are active. If not, the routine again returns to block 750 to repeat the system check. The routine can perform similar checks of the other tractor systems, such as the autonomous systems 430, the drive systems 410, etc. If the tractor systems are active, the routine proceeds to block 756 and begins the tractor move to the trailer location. After block 756, the routine ends.

Figure 7D:
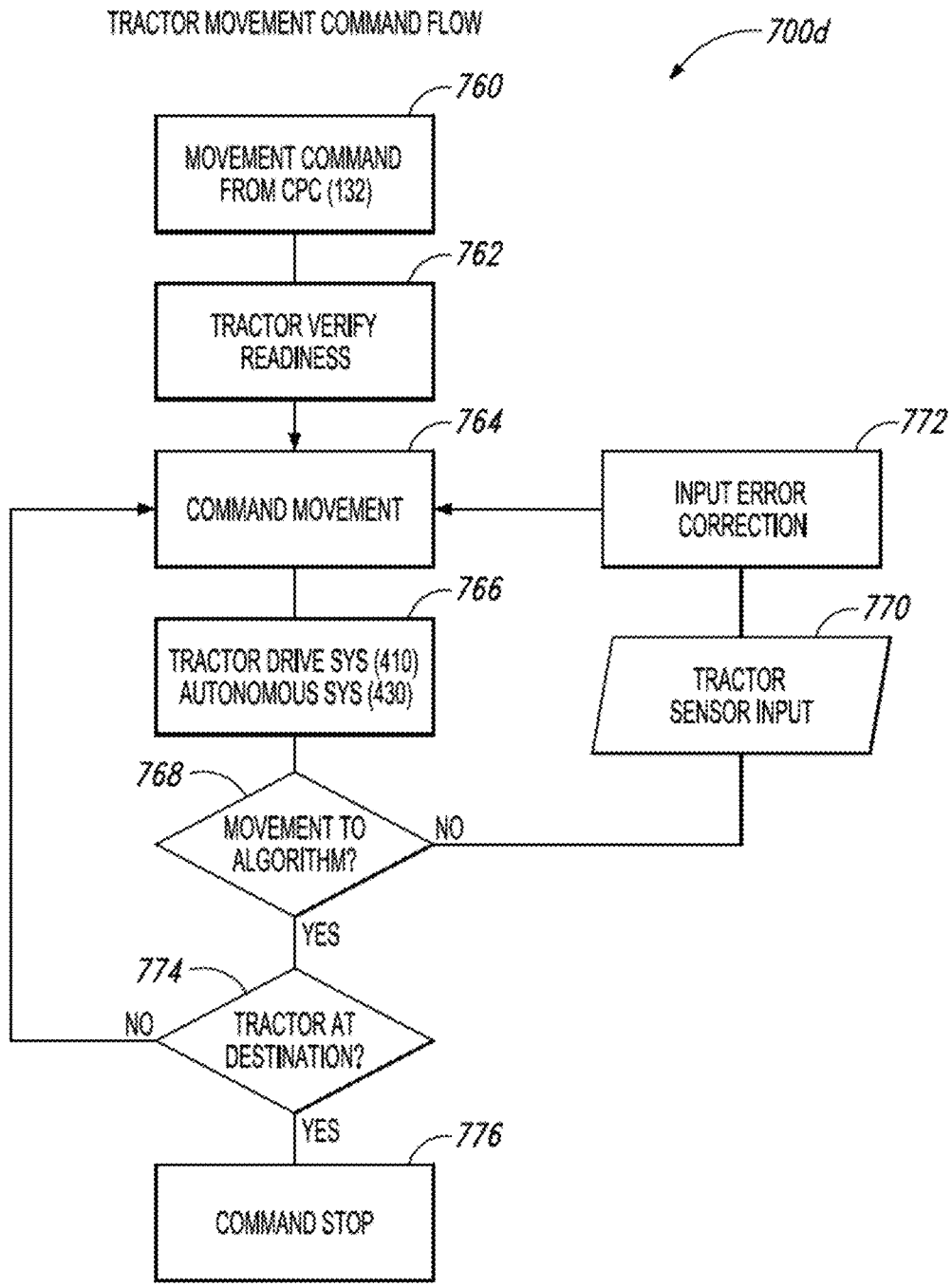

FIG. 7D is a flow diagram of a routine 700d for moving the tractor 112 in response to a movement command from the central processing center 132, in accordance with an embodiment of the present technology. In some embodiments, the routine 700d can be executed by the tractor controller 220 (e.g., the processor 601) in accordance with computer-executable instructions (e.g., program(s) 602) stored in memory 603 (FIG. 6). In block 760, the controller 220 wirelessly receives the movement command communication from the central processing center 132, and in block 762 the controller 220 confirms the operational readiness of the tractor 112 and sends an affirmative response to the central processing center 132. In block 764, either by using a designated path provided by the central processing center 132, or by using a path determined by the programing 602 and the tractor navigation system 231, the controller 220 commands movement of the tractor 112 to the specified trailer parking location 115. In block 766, the tractor drive systems 410 and the tractor autonomous systems 430 respond to the command by initiating movement of the tractor 112 along the commanded path. In decision block 768, the controller 220 determines (using, e.g., data from the navigation system 231) whether the tractor 112 is following the commanded path. If not, then the controller 220 receives tractor sensor input in block 770 and, based on the sensor input, determines an error correction in block 772. The routine then returns to block 764 to implement the movement correction. Conversely, if in decision block 768 the controller 220 determines that the tractor 112 is following the correct path, then in decision block 774, the controller 220 determines whether the tractor 112 is at the destination, for example, the specified trailer parking location 115. If so, the routine 700d proceeds to block 776 and stops. If not, the routine 700d returns to block 764 and repeats until the tractor 112 is at the assigned destination. In some embodiments, the routine 700d described above and/or variations thereof can also be implemented by the controller 220 to move the tractor 112 from the trailer parking location 115 to the specified dock station 131 once the trailer 111 has been engaged, and then from the dock station 131 to a trailer parking location 115.

Figure 8:
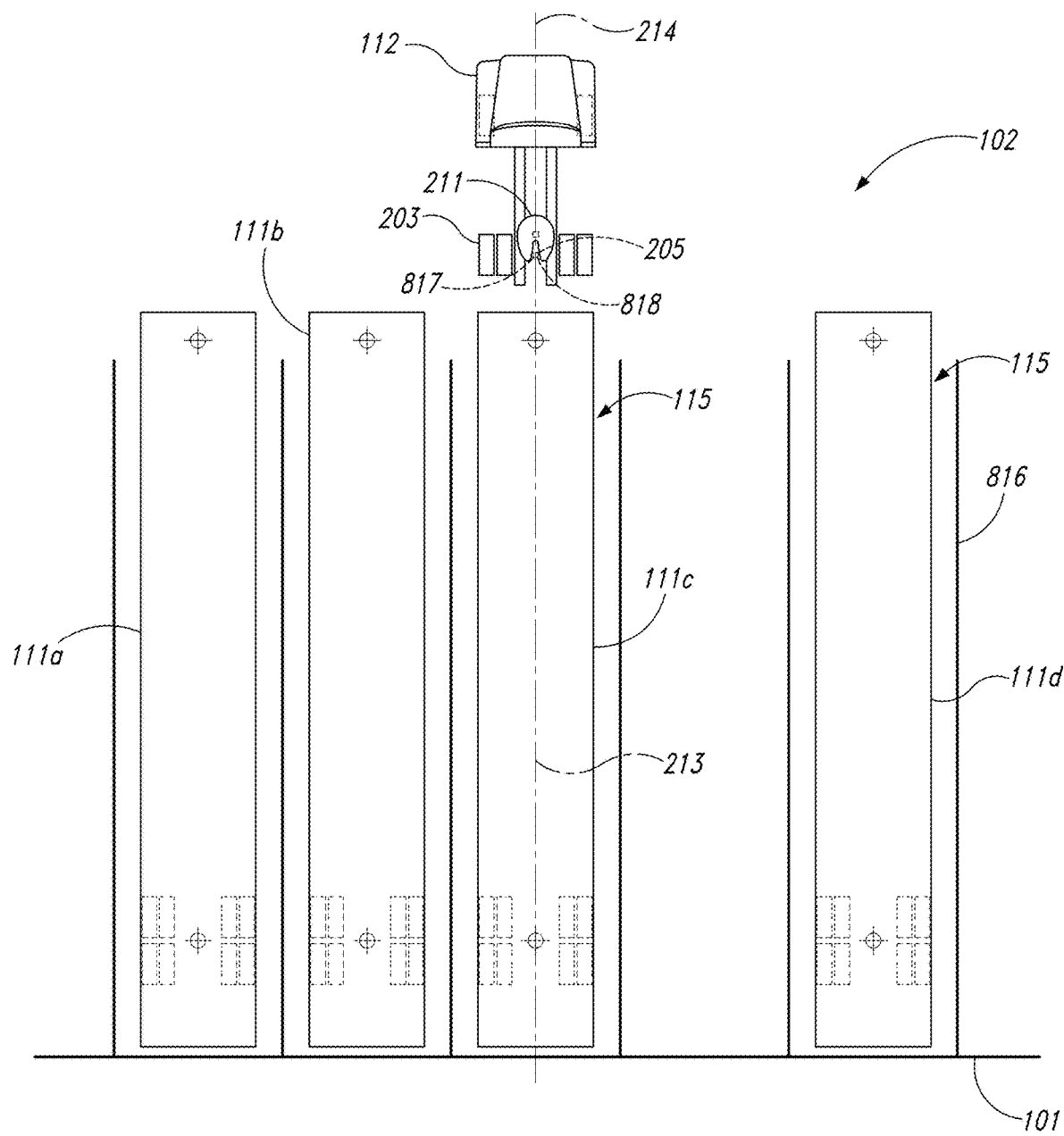
FIG. 8 is a partially schematic plan view of an autonomous tractor and a plurality of trailers at corresponding parking locations configured in accordance with embodiments of the present technology.

FIG. 8 is a partially schematic plan view of a portion of the logistics yard 102 illustrating a plurality of trailers 111 (identified individually as trailers 111a-d) parked in corresponding parking locations 115 in accordance with embodiments of the present technology. Each of the parking locations 115 can be separated from adjacent parking locations 115 by painted stripes 816 or other forms of separators. In some embodiments, each parking location 115 includes a corresponding tractor starting position 817. In some embodiments, each of the tractor starting positions 817 can be positioned in front of the corresponding parking location 115 and aligned with a longitudinal centerline of the parking location 115. Additionally, each starting position 817 can include a physical locating device 818, such as a magnetic, electrical, electro-optical, RFID transponder, wireless transmitter, or similar device that is embedded in, or otherwise attached to or near, the surface of the logistics yard 102. In some embodiments, the locating device 818 can communicate its position to the tractor controller 220. In other embodiments, the tractor 112 can include a sensor system 205 mounted to, e.g., a lower portion of the tractor 112 (FIG. 2A) and configured to detect the location of locating device 818 relative to the tractor 112, and transmit this information to the tractor controller 220. The tractor sensor system 205 may be advantageously placed at the same tractor station line as the rear drive tires 203, or at the station line of the fifth wheel attachment 211. In some embodiments, the sensor system 205 can include a magnetic field sensor, such as an FLC 100 magnetic field sensor from Stefan Mayer Instruments, Wallstr. 7, D-46535 Dinslaken, Germany. In other embodiments, the locating devices 818 can be omitted, and the tractor starting positions 817 can be determined from a pre-existing set of spatial coordinates within the logistics yard 102, from a dynamic position location provided by the tractor navigational system 231, and/or from positional data received from the tractor sensors 210 (FIG. 2A). On backing up to a specific parking location 115, the tractor controller 220 will command the tractor 112 to stop when the controller 220 detects that the tractor 112 (e.g., the tractor centerline 214) is positioned over the corresponding starting position 817. If the tractor centerline 214 is at an angular orientation (0-360 degrees) at the designated starting position 817 that is not aligned, or at least approximately aligned, with the centerline 213 of the specified trailer (e.g., trailer 111c), then an additional set of movements may be required to align the tractor 112 with the centerline of the trailer 111.

Figure 9:
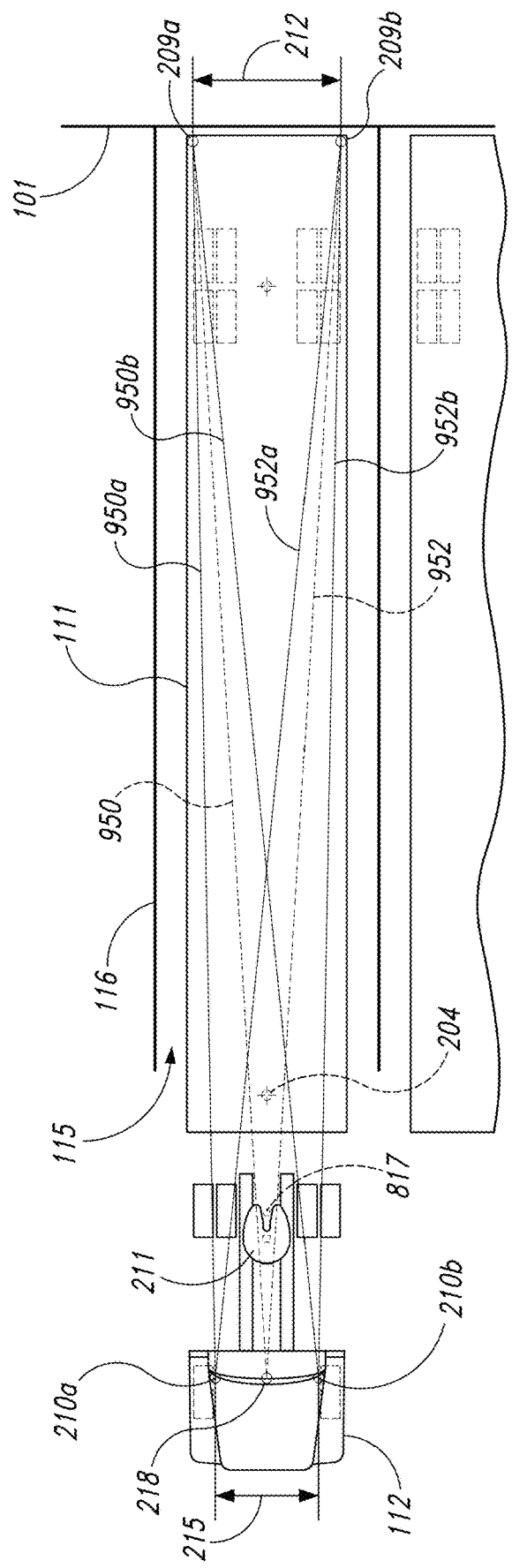
FIG. 9 is a partially schematic plan view of the tractor of FIG. 8 positioned to engage a trailer in accordance with embodiments of the present technology.
Figure 10:
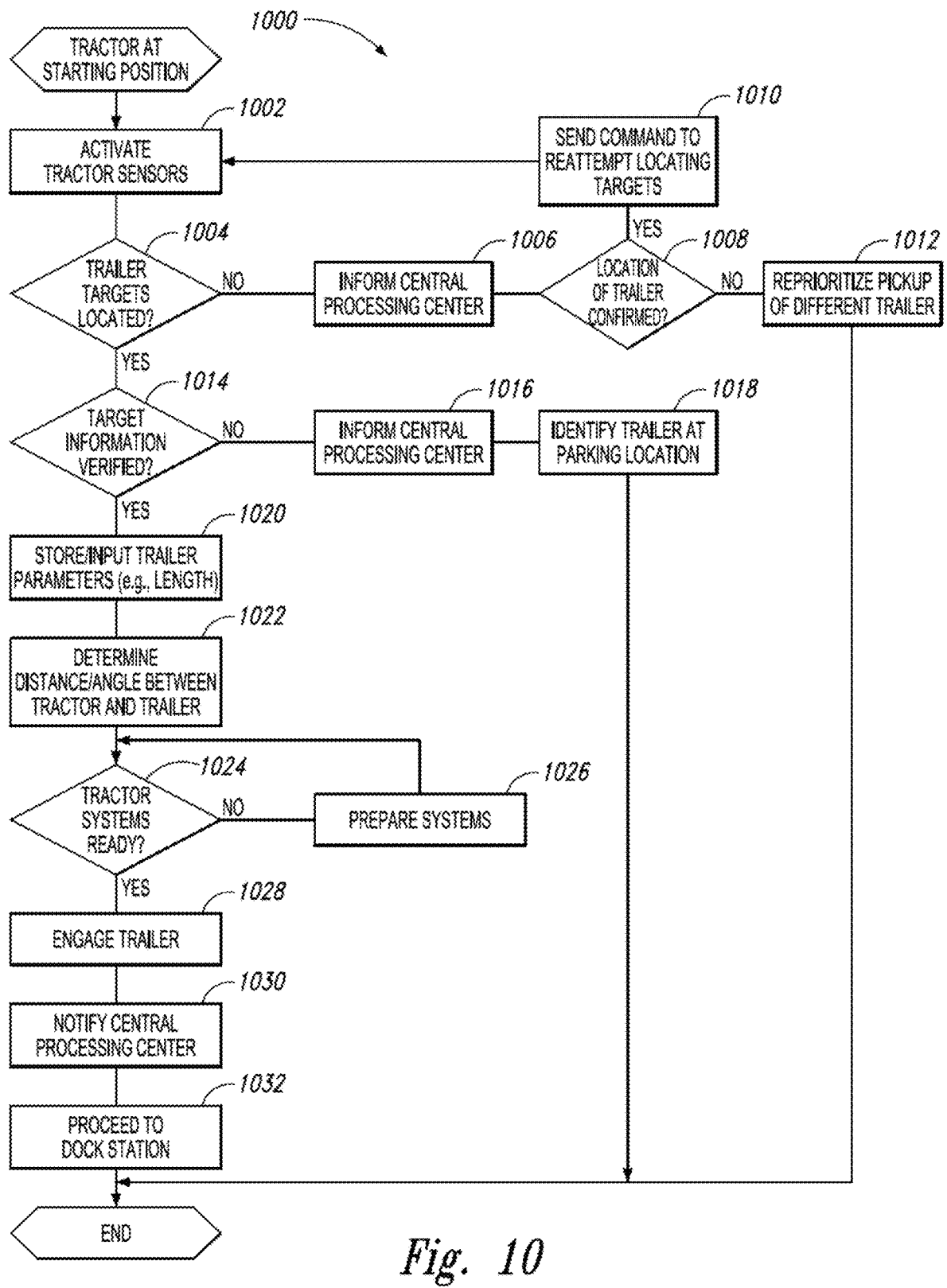
FIG. 10 is a flow diagram of a representative routine for engaging the tractor and trailer of FIG. 9 in accordance with embodiments of the present technology.

FIG. 9 is a partially schematic plan view of the tractor 112 and the trailer 111 from FIG. 8. FIG. 10 is a flow diagram of a representative routine 1000 for engaging the tractor 112 with the trailer 111 in accordance with embodiments of the present technology. In some embodiments, portions of the routine 1000 can be executed by the tractor controller 220 in accordance with computer-readable instructions stored on the memory 503 (FIG. 5A), and other portions of the routine 1000 can be executed by the central processing center 132 in accordance with computer-readable instructions stored on the memory 603. In other embodiments, portions of the routine 1000 can be executed by the individual tractor drive systems 410 (FIG. 4A) in accordance with instructions received from the controller 220, the central processing center 132, and/or other processing devices (e.g., remote handheld devices).

Referring to FIGS. 9 and 10 together, the routine 1000 begins when the tractor 112 is at the starting position 817 and the tractor centerline 214 is aligned, or at least approximately aligned, with the trailer centerline 213 (FIG. 8). In block 1002, the routine activates the tractor sensors 210a, b. As described above with reference to FIG. 2A, in some embodiments the tractor 112 can utilize radar technology to determine the positions and/or identity of the trailer targets 209a, b. In such embodiments, the controller 220 can activate the radar-transmitting antenna 218 (as represented by dashed lines 950 and 952), and the tractor sensors 210a, b (radar-receiving antennas) can receive the radar signals reflected from the sensor targets 209a and 209b (as indicated by lines 950a, b and 952a, b). In other embodiments, the tractor sensors 210a, b can include other types of suitable sensor systems known in the art, as also described above. In decision block 1004, the routine determines if the trailer targets 209a, b have been located and identified by the sensors 210a, b. If the sensor targets 209a, b have not been located, then in block 1006 the routine communicates this information to the central processing center 132. In decision block 1008, the central processing center 132 responds to this information by re-confirming that the specified trailer 111 should be in the designated parking location 115. If the central processing center 132 determines that the specified trailer 111 is in a different parking location 115, then the routine proceeds to block 1012 and the central processing center 132 re-prioritizes pick-up of the trailer 111 at the other parking location using the process described above. Conversely, if the central processing center 132 confirms that the specified trailer 111 should be located in the designated parking location 115, then the routine proceeds to block 1010 and the central processing center 132 commands the tractor controller 220 to re-attempt to locate the trailer sensor targets 209a, b. If, after a pre-determined number of unsuccessful attempts the trailer sensor targets 209a, b cannot be located, the central processing center 132 will either abandon the automated attempt to locate the trailer 111, and/or communicate (e.g., via a wireless communication such as an email, text, voicemail, etc.) the need for manual intervention to a facility manager or other entity.

Returning to decision block 1004, if the trailer sensor targets 209a, b have been located by the sensors 210a, b, the routine proceeds to decision block 1014 and verifies that the target information received by the tractor sensors 210a, b (e.g., target identification information) matches the trailer target information received from the central processing center 132 for the specified trailer 111. If the information received from the sensors 210a, b does not match the information received from the central processing center 132, then in block 1016 the routine communicates this information to the central processing system 132. In block 1018, the central processing center 132 determines, based on the information received from the sensors 210a, b, which trailer is actually located at the designated parking location 115 instead of the specified trailer 111, and updates its database to reflect the correct information. The central processing center 132 can then continue with other tasks until the specified trailer 111 is located.

Returning to decision block 1014, if the trailer target information received from the tractor sensors 210a, b matches the specified trailer 111 target information received from the central processing center 132, then the routine proceeds to block 1020 and stores the length dimension (and/or other parameters) of the trailer 111 as received from the central processing center 132 for use by the tractor controller's trailer algorithm to facilitate movement path parameters. In block 1022, using input from the tractor sensors 210a, b (e.g., the AoA of the reflected signals 950a, b and 952a, b from the trailer sensor targets 209a, b) and/or other suitable methods, the routine 1000 determines the distance between the sensors 210a, b and the targets 209a, b. This information, in combination with the known distance 212 between the targets 209a, b and the known distance 215 between the sensors 210a, b, provides the distance between the tractor 112 (e.g., the fifth wheel 211) and the trailer 111 (e.g., the trailer kingpin 204), and the attitude/angle of the trailer 111 in relation to the tractor 112 at the tractor start position 817.

In decision block 1024, the routine determines if the tractor systems are ready for trailer engagement. For example, the routine can determine if the distance and attitude of the trailer 111 relative to the tractor 112 are within acceptable limits, if the tractor boom 216 is in the receiving position, and/or if the tractor drive systems 410 and the tractor autonomous systems 430 (FIG. 4A) are within acceptable operating limits. If the tractor systems are not ready for engagement, then the routine proceeds to block 1026 and attempts to automatically prepare the systems for engagement (by, for example, moving the tractor 112 into a more favorable position relative to the trailer 111, by lowering the boom 216, etc.), and then the routine returns to decision block 1024 and repeats. If, after a predetermined number of tries, the tractor systems cannot be automatically configured in a ready state for trailer engagement, the tractor controller 220 can send a message to the central processing center 132 which can then send a corresponding message (e.g., a text, email, voicemail, etc.) to, for example, a dock manager for manual intervention. Conversely, if the tractor systems are ready for trailer engagement, the routine proceeds to block 1028.

In block 1028, the tractor controller 220 commands the tractor systems to back up and engage the trailer 111 using the program(s) 602 (FIG. 6) based on positional information from the tractor navigation system 231 and data from the tractor sensors 210a, b as described above, and following the workflow path received from the central processing center 132. Note that the workflow path may have different tractor backing speeds at different distances from the specified trailer 111. In response to receiving a contact signal from the boom system 216 indicating fifth wheel engagement, a signal from the torque sensor system 254 indicating an increase in motor torque, positional information from the tractor navigation system 231 and/or the tractor sensors 210a, b, or some combination thereof indicating that the trailer kingpin 204 has been engaged by the fifth wheel 211, the tractor 112 will cease backing and set the tractor brakes 246. The tractor controller 220 will then engage the tractor boom control system 635 (FIG. 6) to raise the boom 216 and thereby raise the nose of the trailer 111 at an angle determined by the tractor controller 220 to facilitate movement based on trailer length information provided by the central processing center 132 and/or the sensors 210a, b. As a result of boom engagement or as a separately commanded task by the central control system 132, air supply and electrical lines are automatically connected between the tractor 112 and the trailer 111. In other embodiments, the air supply and electrical lines can be manually connected between the tractor 112 and the trailer 111. In block 1030, the tractor 112 re-confirms operational status and sends a communication to the central processing center 132 indicating that the trailer 111 is engaged and the tractor 112 is about to initiate movement to the specified dock station 131. In block 1032, using the tractor navigation system 231 and either a designated path provided by the central processing center 132 or a path determined by the tractor controller program(s) 602, the tractor 112 proceeds with the trailer 111 to the specified dock station 131. After block 1032 the routine ends.

Figure 11:
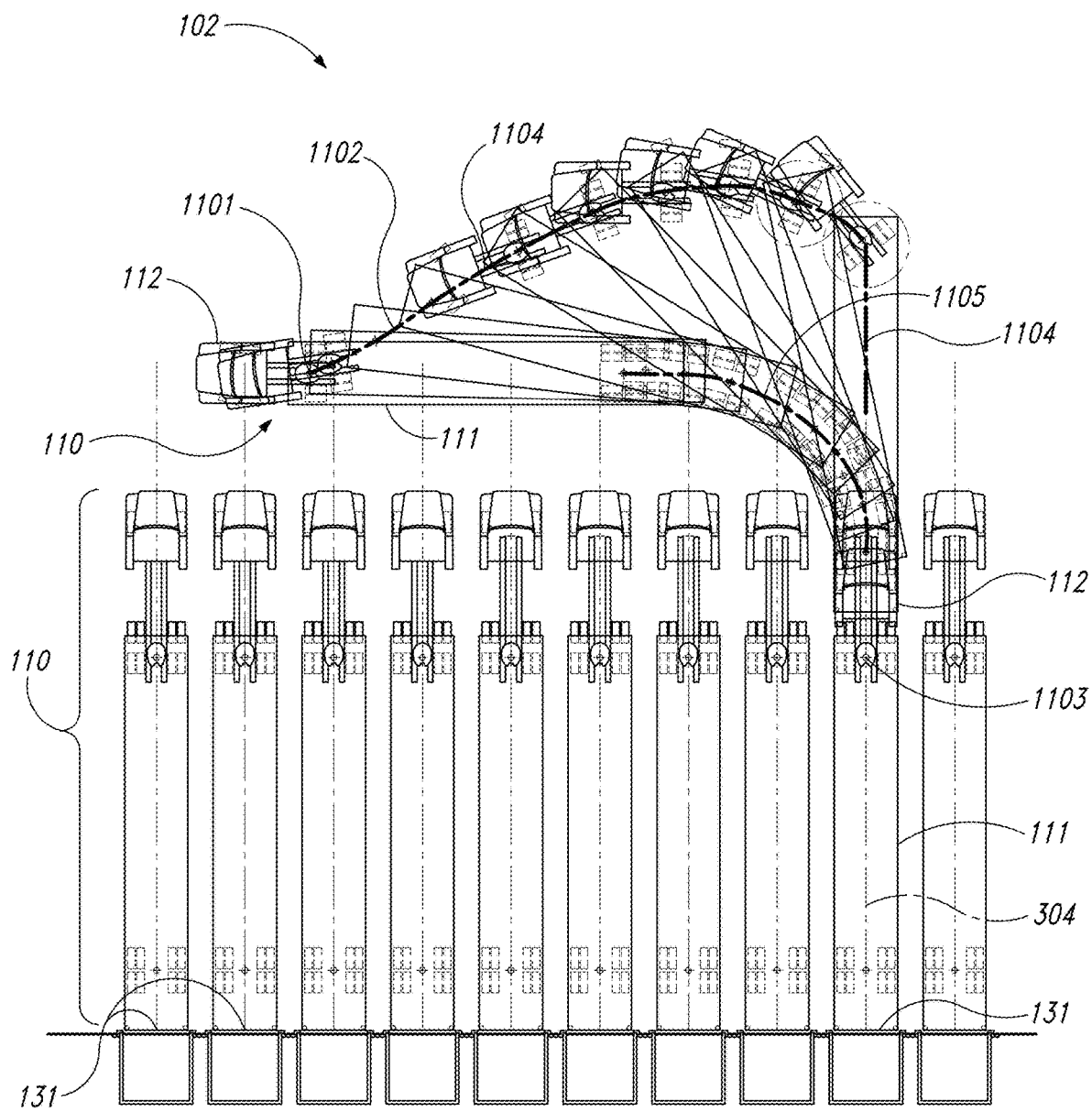
FIG. 11 is a schematic plan view illustrating a path of a tractor/trailer combination backing into a loading dock station in accordance with embodiments of the present technology.

FIG. 11 is a schematic top view illustrating a path of a tractor/trailer combination 110 backing into a dock station 131 in accordance with embodiments of the present technology. In some embodiments, for each dock station 131, there is a related start position 1101 that is designated as the tractor starting position for that dock station. Similar to the tractor starting positions 817 described above, each tractor starting position 1101 can include a physical locating device, such as a magnetic, electrical, electro-optical or RF device, or similar device that is embedded or otherwise attached to the surface of the logistics yard 102 and is detectable by the tractor controller 220 (via, e.g., the sensor system 205). In other embodiments, the tractor starting positions 1101 can be determined from a pre-existing set of spatial coordinates within the logistics yard 102, a dynamic position provided by the tractor navigational system 231, positional data from sensors 210, a GPS location, etc. On approaching a specific start position 1101, the tractor 112 will stop when the controller 220 detects that the tractor 112 (e.g., the tractor centerline 214) is positioned over the corresponding starting position 1101 in a specific angular orientation (0-360 degrees), as instructed by the particular workflow process received from the central processing system 132. For example, in the illustrated embodiment the designated start position 1101 has the tractor/trailer combination 110 positioned at a relative angle of 90 degrees from the centerline 304 of the dock station 131. This can be an advantageous starting position because it utilizes less space in the logistics yard 102 than other parking paths, such as some paths that may start with the tractor/trailer combination 110 perpendicular to the dock station 131.

Once at the start position 1101, the tractor controller 220 checks the angular alignment of the trailer 111 relative to the tractor 112 using, for example, the routine described above with reference to FIGS. 9 and 10. The tractor controller 220 can also check and confirm the length of the trailer 111. Before backing up, the tractor controller 220 can activate tractor safety systems (e.g., flashing lights or other visual signals; horns, beepers or other audible signals, etc.), and send a message (e.g., a wireless communication) to the central processing center 132 indicating that the tractor 112 is initiating the back-up routine. The tractor controller 220 then executes a back-up routine that includes a tractor path 1102 that is designed to guide the trailer 111 along a separate trailer back-up path 1105 toward the centerline 304 of the dock station 131, and then along the centerline 304 until the trailer sensor targets 209a, b (FIG. 2C) come into view of the dock sensors 320a, b (FIG. 3). The tractor controller 220 may incorporate guidance from the tractor navigational system 231 into the back-up routine to optimize or at least increase the accuracy of trailer movement along the trailer back-up path 1105. For example, in some embodiments as the tractor 112 is backing up along the path 1102, the tractor controller 220 uses real-time input from the tractor sensors 210a, b as described above to determine if the trailer is following the prescribed trailer back-up path 1105. If not, the controller 220 sends appropriate commands to the tractor steering control 240 to change the angle of the steering tires 202 (FIG. 2A) as necessary to move the trailer 111 back toward the trailer back-up path 1105. As the tractor 112 approaches an end position 1103, the dock sensors 320a, b can detect the trailer targets 209a, b and provide additional guidance information to the tractor controller 220 to align the trailer 111 with the dock station 131, as described in greater detail below with reference to FIGS. 13A-13C.

Figure 12A:
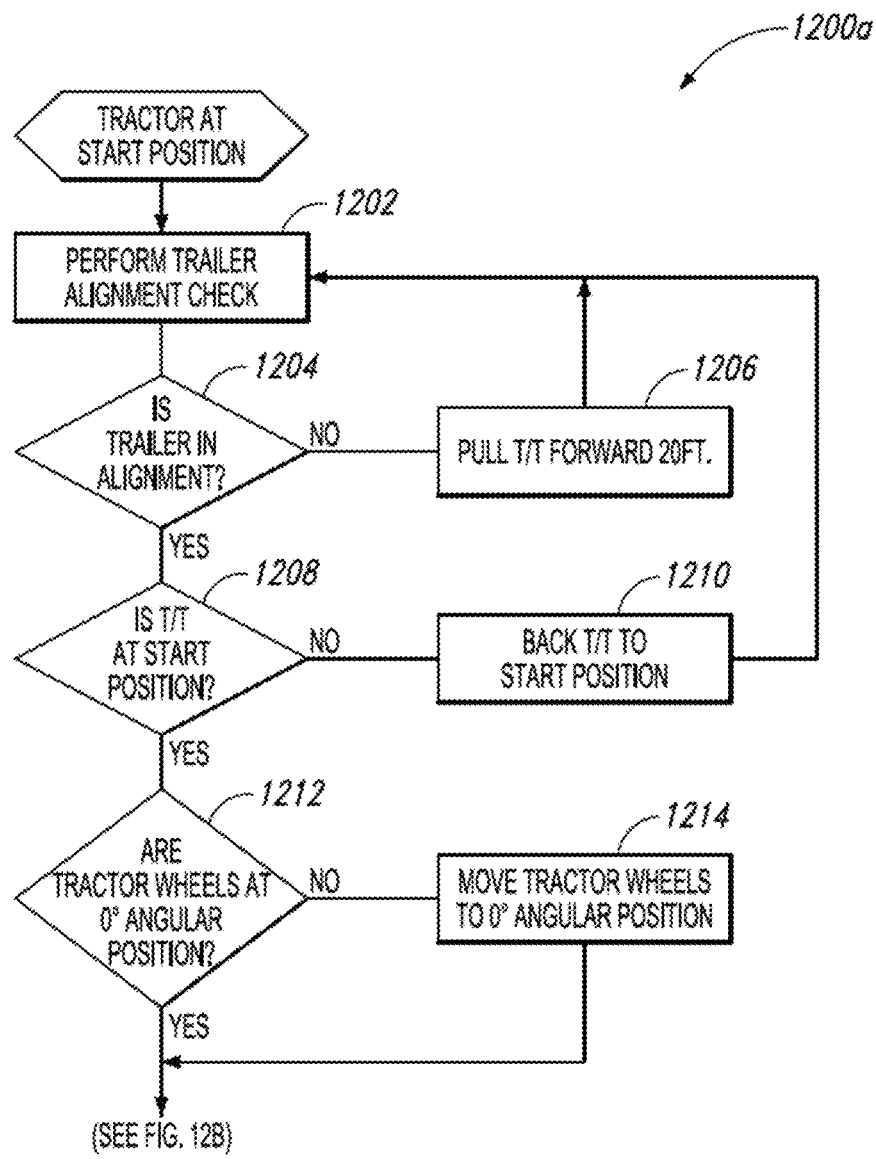
FIGS. 12A-12C are a series of flow diagrams illustrating representative routines that can be executed by the tractor controller and/or other processing device to control the tractor of FIG. 11 as it backs along the path, in accordance with embodiments of the present technology.
Figure 12B:
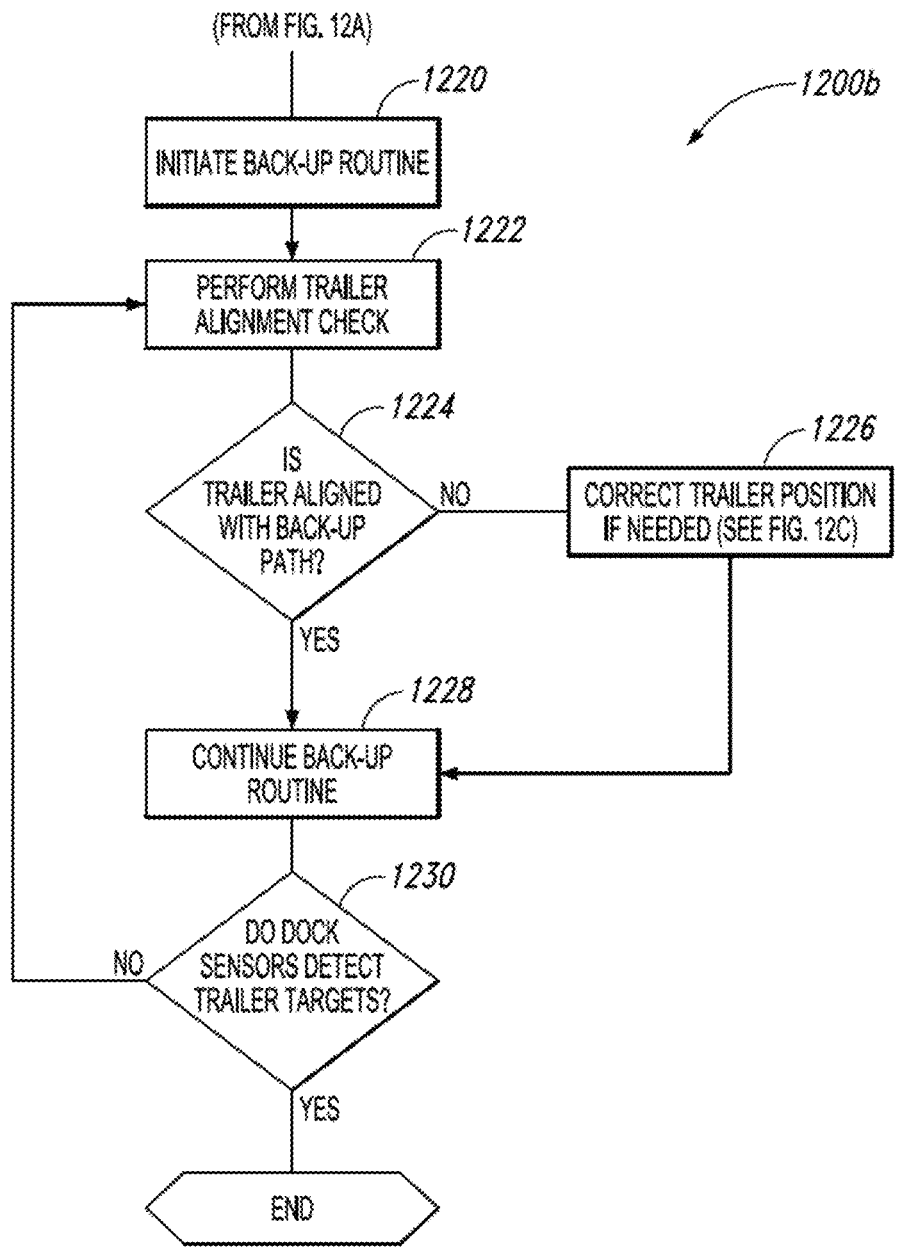
Figure 12C:
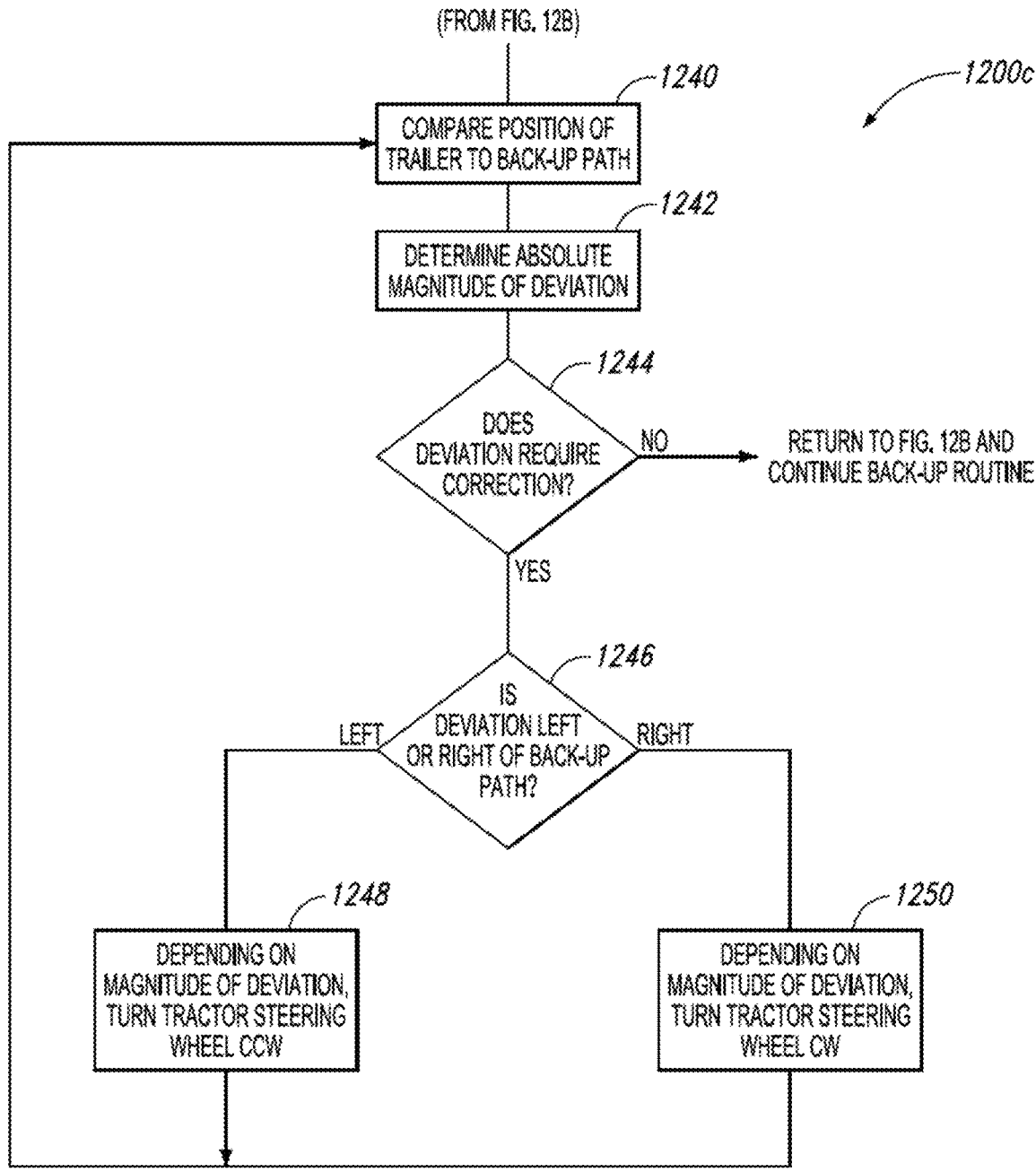

FIGS. 12A-12C are a series of flow diagrams illustrating representative routines 1200a-1200c, respectively, that can be executed by the tractor controller 220 (and/or other processing device, such as the central processing center 132) to control the tractor 112 as it backs along the tractor path 1102 described above with reference to FIG. 11, in accordance with embodiments of the present technology. Referring first to FIG. 12A, the routine 1200a can begin when the tractor 112 is at the start position 1101 (FIG. 11). In block 1202, the routine can perform a trailer alignment check, such as an alignment check using the methods and systems described above with reference to FIG. 9. In decision block 1204, the routine determines if the trailer centerline 213 (FIG. 2C) is aligned with (or at least approximately aligned with, such as within 1-3 degrees) the tractor centerline 214 (FIG. 2A). If not, the routine proceeds to block 1206 and the tractor controller 220 commands the tractor 112 to pull straight forward a pre-set distance, such as 20 feet, and the routine returns to block 1202 to again check the trailer alignment. If the trailer 111 is in acceptable alignment with the tractor 112, the routine proceeds from decision block 1204 to decision block 1208 to determine if the tractor 112 is at the start position 1201. If not, the routine proceeds to block 1210 and the tractor controller 220 moves the tractor/trailer combination 110 backward until the tractor 112 arrives at the start position 1101. From block 1210, the routine returns to block 1202 and again checks the trailer alignment.

If at decision block 1208 the tractor 112 is at the start position 1101 and the trailer 111 is in proper alignment, then the routine proceeds to decision block 1212 to check that the tractor wheels (or more specifically, the steering tires 202; FIG. 2A) are at or very near a zero-degree angular position. That is, the steering tires 202 are parallel to the longitudinal axis or centerline 214 of the tractor 112. If not, the routine proceeds to block 1214 and the tractor controller 220 commands the steering control 240 (FIG. 2A) to turn the steering tires 202 to the zero-degree angular position. When the tractor steering tires 202 are at the zero-degree angular position, the routine 1200a proceeds to the routine 1200b shown in FIG. 12B.

Referring next to FIG. 12B, the routine 1200b starts when the tractor 112 is at the start position 1101 with the steering tires 202 at the zero-degree angular position as described above with reference to FIG. 12A. In block 1220, the tractor controller initiates the backup routine by backing the tractor 112 along the path 1102. In block 1222, in some embodiments, at predetermined intervals (e.g., predetermined intervals of time, e.g., once every second, 0.1 second, etc.; and/or predetermined intervals of distance traveled, e.g., once every 5 feet, 3 feet, 1 foot, etc.) the tractor controller 220 can perform a trailer alignment check as described above to determine the angular relationship of the trailer 111 to the tractor 112 to confirm that the trailer 111 is following the trailer back-up path 1105 shown in FIG. 11. In decision block 1224, the routine determines if the trailer 111 is aligned with the trailer back-up path 1105. If not, the routine proceeds to block 1226 and corrects the trailer position as needed, as described below with reference to FIG. 12C. Conversely, if the trailer is sufficiently aligned with the trailer back-up path 1105, then the routine proceeds to block 1228 and continues to back the tractor 112 along the tractor path 1102. In decision block 1230, the routine determines if the tractor 112 has backed the trailer 111 far enough along the path 1105 and close enough to the specified dock station 131 so that the dock sensors 320a, b (FIG. 3) can detect the targets 209a, b on the trailing edge 208 of the trailer 111 (FIG. 2C). If not, the routine returns to block 1222 and repeats. Conversely, if the trailer 111 is close enough to the dock station 131 that the dock sensors 320a, b can detect the trailer targets 209a, b, then the routine ends and, in some embodiments, further alignment of the trailer 111 relative to the dock station 131 can be performed in accordance with the methods and systems described in detail below with reference to FIGS. 13A-13C.

FIG. 12C is a flow diagram of a routine 1200c for correcting the position of the trailer 111 as called for in block 1226 of FIG. 12B described above, in accordance with some embodiments of the present technology. In block 1240, the routine compares the position (e.g., the angular and/or lateral displacement) of the trailer 111 relative to the trailer back-up path 1105, and in block 1242 the routine determines the absolute magnitude of the deviation between the trailer position and the trailer back-up path 1105. In decision block 1244, the routine determines if the deviation requires correction. For example, the absolute magnitude of the deviation may be within a preset range of distance and/or angle (e.g., less than 1 foot and/or 5 degrees) that does not require correction. If no correction is required, the routine 1200c returns to the routine 1200b of FIG. 12B to continue the back-up routine. Conversely, if the deviation is significant enough to require correction, the routine proceeds to decision block 1246 and determines if the deviation from the desired back-up path 1105 is to the right or left of the path. If the deviation is to the left, the routine proceeds to block 1248 and, depending on the magnitude of the deviation, the tractor controller 220 commands the steering control 240 to turn the tractor steering wheel counterclockwise as the tractor 112 continues backing up. Conversely, if the deviation is to the right of the back-up path 1105, the routine proceeds to block 1250 and, depending on the magnitude of the deviation, the tractor controller 220 commands the steering control 240 to turn the tractor steering wheel in the clockwise direction as the tractor 112 continues backing up. After either block 1248 or block 1250, the routine returns to block 1240 and repeats.

Figure 13A:
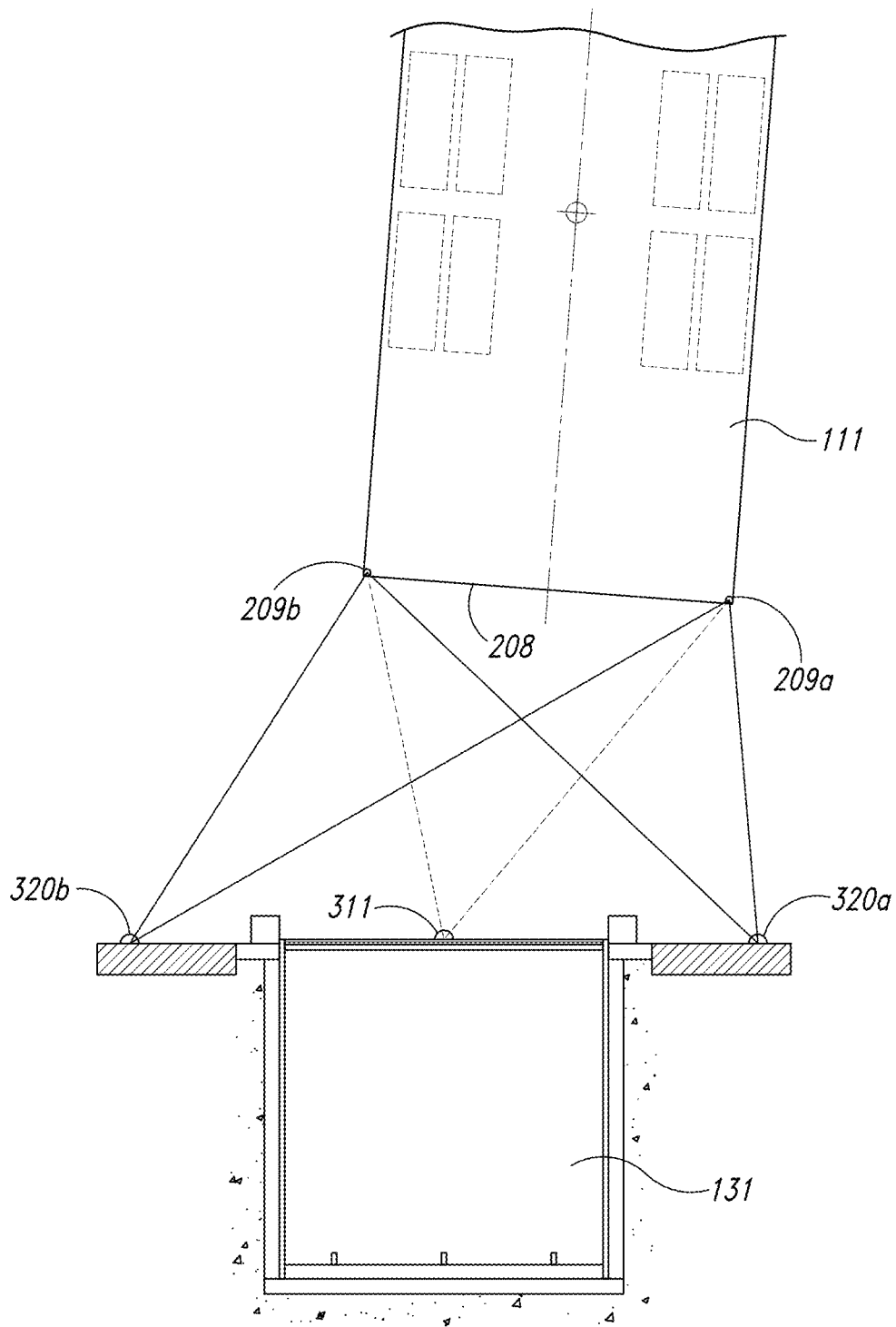
FIG. 13A is a partially schematic plan view of a rear portion of a trailer backing into a loading dock station in accordance with embodiments of the present technology.
Figure 13B:
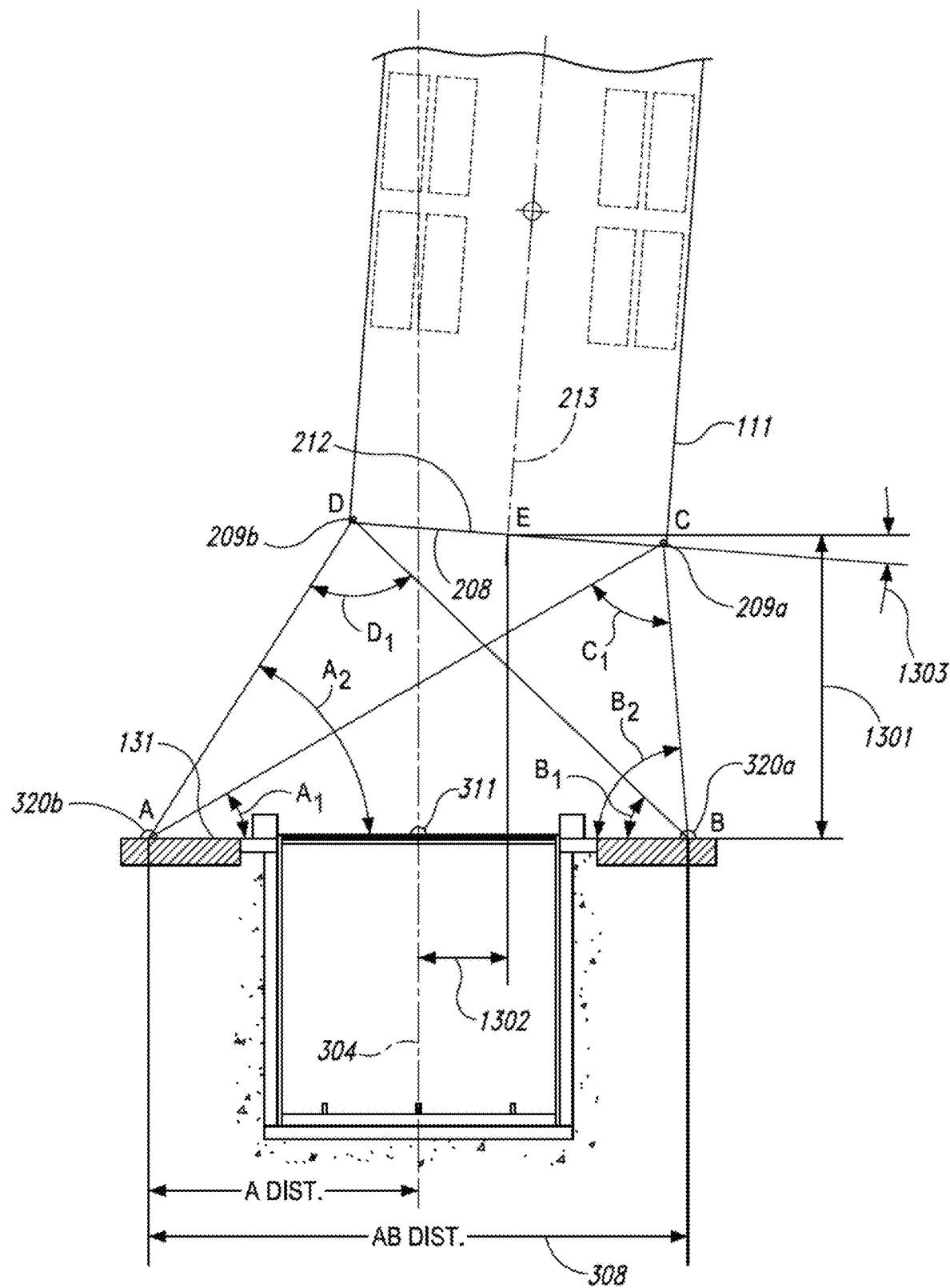
FIGS. 13B and 13C are similar plan views illustrating sensor geometry data that can be used to determine the alignment of the trailer as it approaches the dock station in accordance with embodiments of the present technology.
Figure 13C:
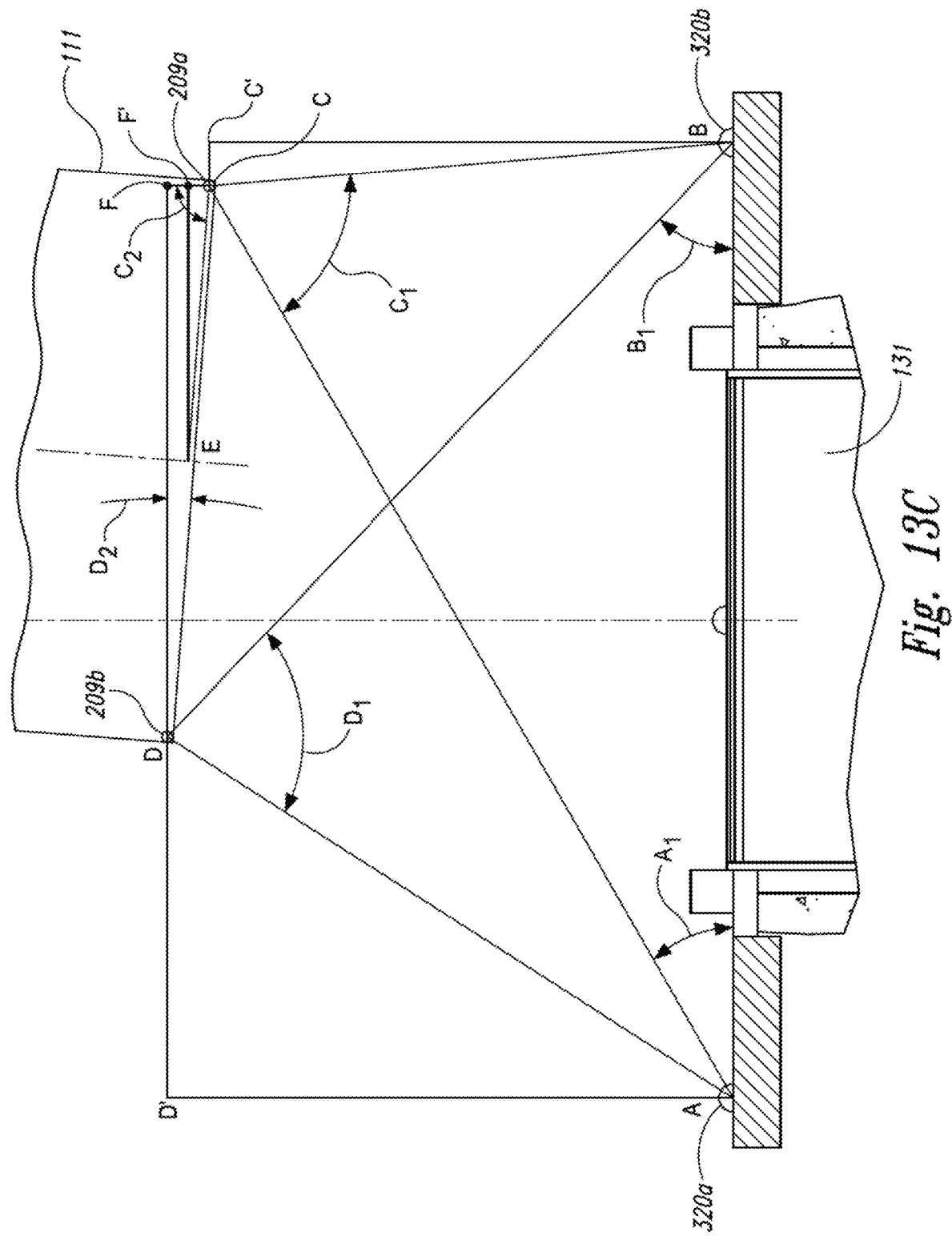

FIG. 13A is a partially schematic plan view of a rear portion of the trailer 111 backing into the dock station 131 in accordance with embodiments of the present technology. FIGS. 13B and 13C are similar views illustrating sensor geometry data that can be used to determine the alignment of the trailer 111 as it approaches the dock station 131 in accordance with embodiments of the present technology. Referring first to FIG. 13A, when the sensor targets 209*a, b* on the trailing edge 208 of the trailer 111 enter the operational range of the dock sensors 320*a, b*, the sensors 320*a, b* detect the targets 209*a, b*. For example, in those embodiments in which the dock station 131 includes a radar-transmitting antenna 311 and the sensors 320*a, b* are corresponding radar-receiving antennas, the dock sensors 320*a, b* detect and determine the AoA of the radar signals reflected from the targets 209*a, b* as described above. In some embodiments, the dock station control panel 340 communicates this target positional data to the central processing center 132. Alternatively, the central processing center 132 may receive the trailer target positional data directly from the dock sensors 320*a, b*. As shown in FIG. 13A, this positional data provides the angles between the dock face and the lines of sight from both sensors 320*a, b* to both targets 209*a, b*. In other embodiments, the positional data can include the distances between both sensors 320*a, b* and both targets 209*a, b* in addition to, or instead of, this angular data. The central processing center 132 transmits the positional data to the tractor controller 220, and the tractor controller can use this data to enhance positional accuracy as the tractor 112 backs the trailer 111 into the dock station 131, as described in more detail below with reference to FIGS. 13B and 13C.

As the trailer 111 approaches the dock station 131 as shown in FIG. 13A, the tractor controller 220 will have the following information:
 a. The position and attitude of the tractor 112 in 2D space relative to the dock station 131 based on information from the tractor navigation system 231.
 b. The position and attitude of the rear edge 208 of the trailer 111 relative to the tractor 112 as a result of the positional data received from the sensor targets 209*a* and 209*b* via the sensors 210*a* and 210*b* on the tractor 112. Combined with the data from a above, this yields the location and attitude of the trailer 111 in 2D space relative to the dock station 131. This information helps enable the tractor controller 220 to follow the trailer back-up path 1105 (FIG. 11) and avoid obstacles.
 c. As described in greater detail below with reference to FIGS. 13B and 13C, the position and attitude of the rear surface or trailing edge 208 of the trailer 111 relative to the dock station 131 can be determined by the central processing unit 132 using data derived from the trailer sensor targets 209*a, b* and the dock sensors 320*a* and 320*b*. This in turn yields the position and attitude of the trailer 111 itself in relation to the dock station 131 in 2D space. This information can then be provided to the tractor controller 220 to serve as a check or an enhancement to the positional data in item b above. It should be noted that, in other embodiments, the central processing unit 132 may communicate the sensor data from sensors 320*a, b* to the tractor controller 220 for processing and determination of trailer position by the controller 220.

Referring to FIG. 13B, the distance 212 ("CD") between the sensor targets 209*a* and 209*b* on the trailer 111 is known, and the distance 308 ("AB") between the sensors 320*a* and 320*b* on the dock station 131 is also known. Additionally, angles A1 and B1 are known from detection of the first target 209*a* by the second sensor 320*b*, and by detection of the second target 209*b* by the first sensor 320*a*, respectively. Similarly, angles A2 and B2 are also known from detection of the second target 209*b* by the second sensor 320*b*, and by detection of the first target 209*a* by the first sensor 320*a*, respectively. Once these angles are known, angles C1 and D1 are also known. However, in the illustrated embodiment the trailer 111 is off-center and at an angle relative to the dock station 131. Accordingly, it would be advantageous to determine:
 a. The perpendicular distance 1301 from the dock station 131 to point E at the intersection of the trailer centerline 213 with the trailer trailing edge 208;
 b. The lateral or side-to-side distance 1302 from E to the centerline 304 of the dock station 131; and/or
 c. The angle 1303 of the trailer 111 relative to the dock station 131.

Once this information is known by the central processing center 132, it can provide this information to the tractor controller 220, which in turn provides corresponding guidance commands to the tractor drive systems 410 so that the tractor 112 can back the trailer 111 up to the dock station 131 in proper alignment for efficient unloading/loading of cargo.

Referring next to FIG. 13C, a method of determining the position of the aft edge 208 of the trailer 111 relative to the dock station 131 in accordance with an embodiment of the present technology is as follows. The following method and suitable variations thereof can be executed by, for example, the central processing center processor 501 (FIG. 5A) or other processing device in accordance with computer-executable instructions stored in memory. Using quadrilateral ABCD, it is possible to construct two triangles, ADD' and BCC', to be used in determining the perpendicular distances AD' and BC' of the trailer sensor targets 209*a, b* from the dock face as follows:
 a. Determine distance AD using triangle ABD:
  AD=(AB(SIN(B1))/SIN(D1)
 b. Determine distance BC using triangle ABC:
  BC=(AB(SIN(A1))/SIN(C1)
 c. Determine distance AD' using triangle ADD':
  AD'=AD(SIN(A2)) where angle A2 is determined by triangle ABD
 d. Determine distance BC' using triangle BCC':
  BC'=BD(SIN(B2)) where angle B2 is determined by triangle ABC It is now possible to determine the angle 1303 (FIG. 13B) of the trailer 111 relative to the dock wall by using the absolute difference in distance of AD' and BC' and the known width CD of the trailer 111:

e. Angle D2 of triangle CDF=$SIN^{-1}$(AD'−BC')/CD) where AD' is greater than BC'
f. Angle C2 of triangle CDF=$SIN^{-1}$(BC'−AD')/CD) where BC' is greater than AD'

With the angle of the trailer relative to the dock known, it is now possible to determine distance CF' as well as distance EF' as follows:

g. EF'=(CD/2)SIN(C2) where angle C2 is determined by triangle CDF
h. CF'=SQRT(EC^2−EF^2)

It is now possible to determine the position of the trailer 111 in relation to the dock interface as follows:

i. Distance 1301 (FIG. 13B) to aft end of trailer at centerline
=BC'+CF' or AD'−CF'
j. Distance 1302 from dock centerline 304 to aft end of trailer 111 at centerline
=AB/2−(CC'+EF')

Once the position of the aft end of the trailer 111 relative to the dock interface is known, the tractor controller 220 can determine the back-up path to correctly position the trailer 111 at the dock station 131, and command the tractor drive systems 410 accordingly. In other embodiments, all or a portion of the routine described above can be executed by the central processing center 132, which subsequently determines the back-up path and sends it to the tractor controller 112. The back-up path may be continuous or a series of steps including pull-forward movements to enable a higher degree of positional accuracy of the tractor/trailer combination 110 about the centerline 304 of dock station 131. During the back-up process, the routine described above (or other suitable methods) can be repeated by the tractor controller 220 and/or the central processing center 132 to get real-time feedback of the 2D position of the trailer 111 relative to the dock 131 during the back-up process to confirm that the trailer is on the correct path and to make corrections as needed.

Upon receiving a signal from the dock station control panel 340 indicating that the trailer 111 is in position at the dock station 131 or a signal from the tractor controller 220 indicating an increase in motor torque, and/or positional information from the tractor navigation system 231, the tractor sensors 210, the building sensors 320, or some combination thereof, the tractor 112 will cease backing and set the tractor brakes 246. The tractor controller 220 will then engage the tractor boom system 635 to lower the boom 216 from the trailer 111 until the boom system is in its stored position. As a result of boom disengagement or as a separately commanded task by the tractor controller 220, the air supply and electrical lines will be automatically (or, in some embodiments, manually) disconnected between the tractor 112 and the trailer 111. The tractor controller 220 will then communicate to the central processing center 132 that the trailer 111 is positioned at the dock station 131 and is ready for loading/unloading. Additionally, the tractor controller 220 can communicate to the central processing center 132 that the tractor 112 is available for another trailer move. In some embodiments, the central processing center 132 responds to this information by communicating with the dock station control panel 340 to initiate engagement of the trailer 111 following a workflow process that can include:

a. Activating the vehicle restraint 303;
b. Opening the loading dock door 305;
c. Activating the dock leveler 301; and
d. Signaling an inside workforce that the dock station 131 is ready for loading/unloading operations.

In some embodiments, the method described above for positioning the trailer 111 relative to the dock station 131 can also be used to position the tractor 112 relative to the trailer 111. For example, in some embodiments this method can be used in conjunction with the tractor sensors 210*a, b* and the trailer sensor targets 209*a, b* to determine relative angles and distances between the tractor 112 and the trailer 111 for, e.g., engaging the tractor 112 with the trailer 111 as described above with reference to FIGS. 8-10.

As noted above with reference to FIG. 2A, in some embodiments the tractor 112 can include an angular position sensor 217 to determine, for example, the angular orientation of the trailer kingpin 204 (and hence the trailer centerline 213) relative to the tractor centerline 214. In some embodiments, this angular information can be used as a check or to supplement the trailer angular position information received from the tractor sensors 210*a, b*. As can be seen from the examples described above, however, a benefit of using the tractor sensors 210*a, b* and the dock sensors 320*a, b* in accordance with the present technology is the ability to get more accurate trailer 2D position information in real-time during the entire back-up process. Relying on the positional data from, for example, a trailer angle sensor alone in the absence of such real-time feedback would fail to address issues such as trailer carriage alignment or other issues that would prevent the trailer from tracking precisely to a prescribed path. In contrast, the embodiments described above can provide real-time positional feedback that may be used by the back-up routine to correct the tracking model and keep the trailer 111 on the desired back-up path 1105.

Figure 14:
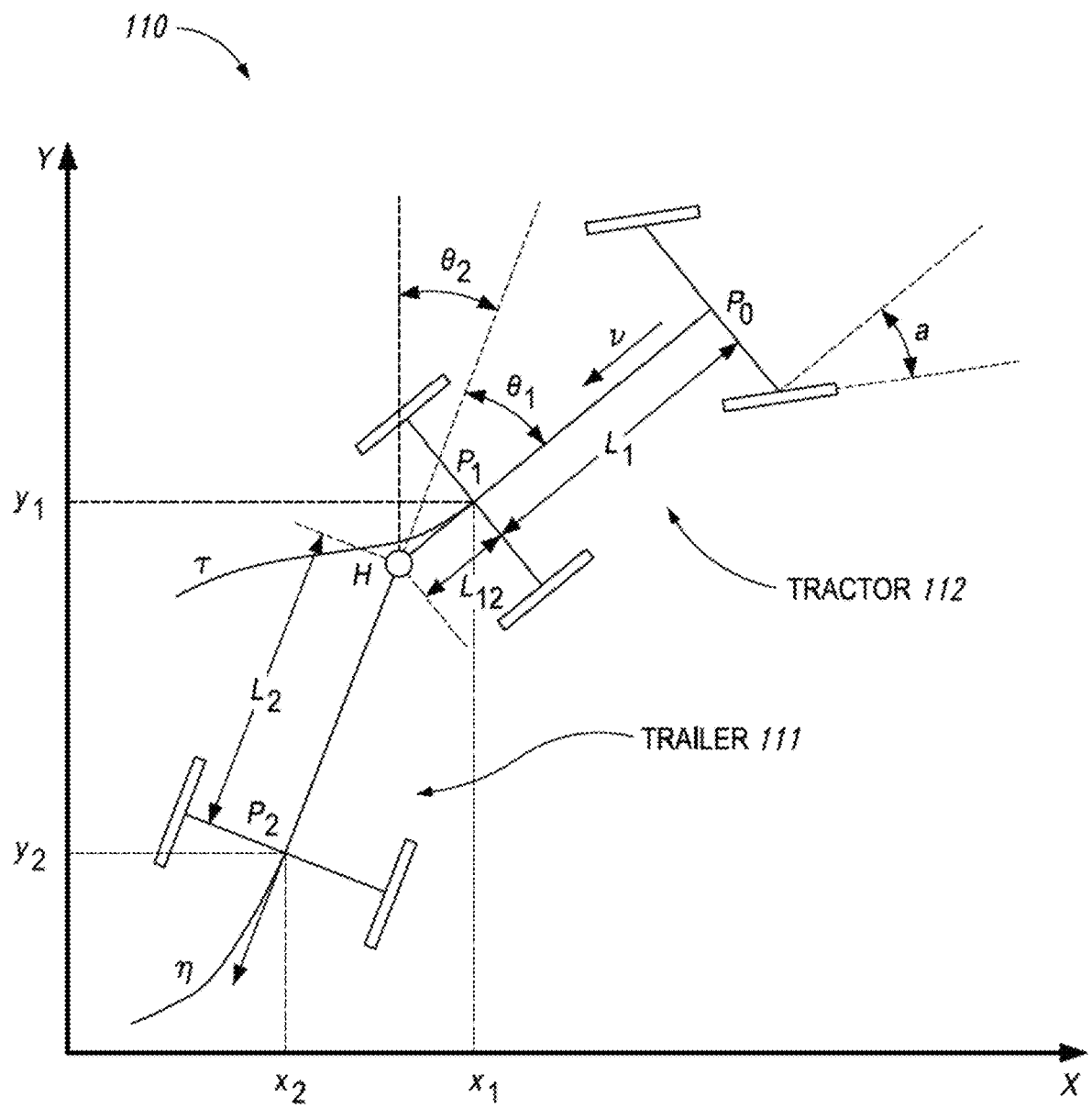
FIG. 14 is a schematic diagram that illustrates vehicle and trailer variables that can be used to determine a kinematic relationship between a vehicle and a trailer for use in a representative trailer backup routine in accordance with embodiments of the present technology.

As noted above, in some embodiments the tractor controller 220 is configured to command vehicle movement based on a stored workflow procedure. At least a portion of this function can be performed using methods and systems as described in: "Constrained Model Predictive Control for Backing-up Tractor-Trailer System" by Yang Bin and Taehyun Shim, published in the proceedings of the 10th World Congress on Intelligent Control and Automation—Beijing, China, Jul. 6-8, 2012, which is incorporated herein by reference in its entirety, and/or methods and systems as described in U.S. Pat. No. 9,623,859, titled "TRAILER CURVATURE CONTROL AND MODE MANAGEMENT WITH POWERTRAIN AND BRAKE SUPPORT," which is also incorporated herein by reference in its entirety. An example would be a series of movements required to back the tractor/trailer combination 110 into range of the dock sensors 320*a, b* at a dock station 131. By way of example, FIG. 14 is a schematic diagram that illustrates the geometry of the tractor 112 and the trailer 111 overlaid with a 2D X-Y coordinate system, and identifies variables that can be used to determine a kinematic relationship between the tractor 112 and the trailer 111 for use in a representative trailer backup routine in accordance with embodiments of the present technology.

The representative flow diagrams described above depict processes used in some embodiments. These flow diagrams do not show all functions or exchanges of data, but instead provide an understanding of commands and data exchanged under the system. Those skilled in the relevant art will recognize that some functions or exchange of commands and data may be repeated, varied, omitted, or supplemented, and other (less important) aspects not shown may be readily implemented. Each step depicted in the flowcharts can itself include a sequence of operations that need not be described herein. Those or ordinary skill in the art can create source code, microcode, program logic arrays or otherwise implement the invention based on the flowcharts and the detailed description provided herein. The disclosed routines are preferably stored in non-volatile memory that forms part of the relevant processors, or can be stored on removable media, such as disks, or hardwired or preprogrammed in chips, such as EEPROM semiconductor chips.

Camera System

As shown in FIG. 3, some embodiments of the present technology can include one or more cameras 310 at each dock station 131 mounted to provide images from a field of view that includes the dock approach. In some embodiments, the central processing center 132 can be operably connected to the camera 310 and can control the camera 310 to obtain images. Additionally, the central processing center 132 (or other processing device) can include an image processor that manipulates the images to produce a pattern-recognized output, which can be used to identify a trailer 111 in the field of view and determine the position of the trailer 111 relative with the dock centerline 304 and the dock interface. This positional information can then be relayed to, for example, the tractor controller 220 to facilitate alignment and parking of the trailer 111 at the dock station 131. This pattern recognition could be the rectangular rear aspect (e.g., the rear end) of the trailer 111, the trapezoidal aspect of the roof of the trailer 111, or a combination of the two. Possible algorithms for accomplishing this task can include but are not limited to, for example, 2D feature tracking, generalized Hough transforms using a cascade classifier (similar to Haar-like features) as developed by Viola and Jones for face detection, and correlation filters as well as other suitable pattern-recognition algorithms known in the art. Facility lighting to facilitate camera imaging may or may not be required.

Figure 15:
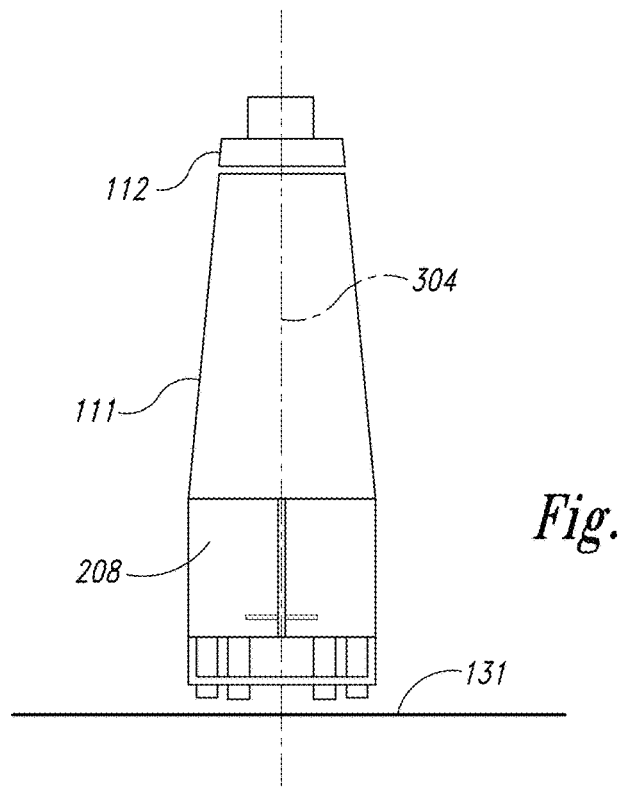
FIG. 15 is a partially schematic perspective view of a tractor/trailer combination backing into a loading dock station in accordance with other embodiments of the present technology.
Figure 16A:
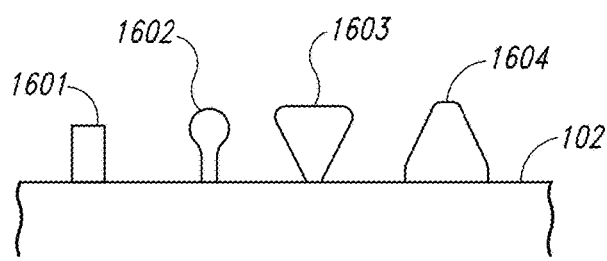
FIGS. 16A-16D are partially schematic end views of various guidance rails configured in accordance with embodiments of the present technology.
Figure 16C:
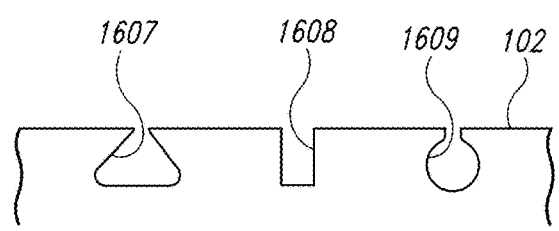
Figure 16B:
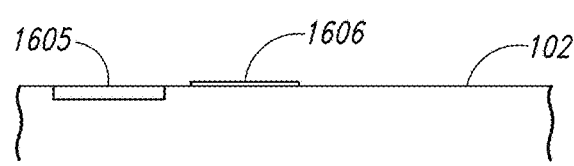
Figure 16D:
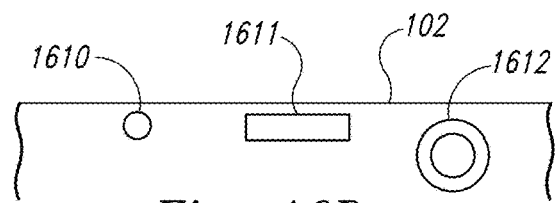

In addition to autonomous guiding, the camera images could also be used by dock workers or management to determine dock status and trailer position. The images could also be transmitted wirelessly from, for example, the central processing center 132 and/or the dock control panel 340 to a manned tractor 112 for viewing by the driver to facilitate manual parking at the dock station 131. For example, the images could be displayed for the driver via a mobile device (e.g., using a smartphone mobile app) or via a display screen associated with the tractor display system 222. As shown in FIG. 15, in some embodiments the tractor display system 222 can display a screen shot of a live camera view (e.g., a perspective view) of the trailer 111 with the dock centerline 304 superimposed to facilitate the driver's understanding of the trailer's relationship to the dock. In some embodiments, the camera 310 can be a video camera that provides a number or a sequence of images per second. For example, a digital camera with a CCD (charged couple device) or CMOS (complementary metal-oxide semiconductor) image sensors can be used.

Active Building Sensor

As also shown in FIG. 3, in yet other embodiments of the present technology, the dock station 131 can include a single signal source located, for example, on or proximate the dock centerline 304 and above the trailer height in the place of the radar-transmitting antenna 311. The single signal source can be configured to operate in a manner similar to a very high frequency (VHF) omnidirectional range (VOR) beacon system used by the aviation industry, and can provide azimuth angle and range to a given receiver. For example, in some embodiments, one or more VOR beacons can be positioned at or near the docking stations 131 and/or in other locations at the center 100 (FIG. 1), and one or more receivers can be located on the transport vehicle (e.g., the tractor 112 or the trailer 111). The receiver can transmit VOR signal information received from the beacons to a control station (e.g., the central processing center 132) that can then determine the trailer distance from the dock wall, trailer distance from the dock centerline 304, and trailer attitude relative to the dock wall and the dock centerline 304. In some embodiments, the control station can be located on the transport vehicle, at the central processing center 132, and/or at one or more other locations, as well as at an Internet location (IOT).

Rail Guidance System

In some embodiments, the present technology can include track or rail guidance systems that can guide or otherwise facilitate movement of autonomous or manned vehicles to their assigned places in a distribution center vehicle yard, such as the yard 102 of FIG. 1. In general, the term "rail" may be used herein to refer to any of a number of structures, apparatuses, and/or systems that provide a guided path for a tractor in a logistics yard or other setting. For example, embodiments of rails described herein can include elongate structures that extend above the surface of the yard to physically engage a corresponding structure on a lower portion of, for example, a yard tractor, trailer, OTR vehicle, etc. Such rails can also include electronic devices embedded in or below the surface of the yard that wirelessly communicate with a corresponding receiver on the transport vehicle. Additionally, the term rail is not limited to continuous members or systems. In some embodiments, the guided path is achieved by means of embedded guide rails or other devices that wirelessly interact with a sensor system 205 mounted to, for example, a lower portion of the tractor 112 (FIG. 2A). The tractor sensor system 205 may be advantageously placed at the same tractor station line as the rear drive tires 203, or at the centerline of the fifth wheel attachment 211. In some embodiments, the sensor system 205 can be a magnetic field sensor, such as an FLC 100 magnetic field sensor from Stefan Mayer Instruments, Wallstr. 7, D-46535 Dinslaken, Germany. In some embodiments, the sensor system 205 is configured to detect the location of the embedded guide rails relative to the tractor 112 and transmit this information to the tractor controller 220. The controller 220 can, in turn, use this information as described above for autonomous movement of the tractor/trailer combination 110 to and from specific locations in the yard 102. Although rail-guided systems are known in the railroad, conveyor, and amusement industries, to the knowledge of the inventors, they have not been applied to the transport vehicle industry as described above due to the limitations and complexity of the associated systems.

In some embodiments, the rail guidance system can be placed at locations within the logistics yard 102 to facilitate autonomous movement of the transport vehicles in accordance with a work flow procedure. The rails may be located along access ways, drives, parking locations, dock locations, or anywhere an OTR or terminal tractor may be expected to operate. They may be composed of both straight and curved sections and may be interconnected or composed of discrete sections for specific use. Referring to FIG. 11 by way of example, in the illustrated embodiment, the yard 102 can include a rail system 1104 for the dock position 131 that, in some embodiments, can be continuous from the tractor start position 1101 to a tractor end position 1103. As noted above, in this embodiment, the tractor start position 1101 is where the tractor 112 is initially located with the tractor/trailer combination 110 oriented at 90 degrees from the orthogonal projection of the dock centerline 304. From this point, the rail system 1104 curves outwardly before becoming straight in alignment with the dock centerline 304. The rail system 1104 ends at the end point 1103, which is where the tractor 112 will finish its backing movement with the tractor/trailer combination 110 aligned with the dock centerline 304.

In other embodiments, the tractor/trailer combination 110 can be oriented at 90 degrees to the dock centerline 304 and positioned approximately 80 feet into the drive and away from the dock station 131, and the rail system 1104 can include only the straight section of rail aligned with the dock centerline 304. In this embodiment, the tractor 112 would begin its backing movement using a predetermined set of instructions commanded by the tractor controller 220, and the tractor/trailer 110 would back up until the tractor sensor system 205 senses the rail system 1104. At that point, the tractor controller 220 would command the tractor 112 to pull forward away from the dock along the rail system 1104 approximately 20 feet to align the tractor/trailer combination 110 with the dock centerline 304. Then, the controller 220 would command the tractor 112 to back into the dock position 131 along the rail system 1104 and the dock centerline 304. This action could be repeated as desired to ensure proper trailer alignment with the dock station 131.

In some embodiments, the rail system 1104 can include a series of electromagnetic sections that could be independently powered to provide unique pathways for the tractors 112 in the yard 102 to enable fully controlled yard movement tailored to individual units. The segments would be visible to the individual tractor sensor systems 205 only when energized. Although an electromagnetic system can be used in some embodiments, in other embodiments, a powered rail system 1104 could incorporate any number of other known wireless communication/signal systems, such as electro-optical systems, RF systems, etc. to communicate with the tractor sensor system 205. In some embodiments, the tractor sensor system 205 can include an antenna or the like to facilitate one- or two-way communication between the rail system 1104 and the tractor 112. This communication could include movement instructions for the tractor 112, unique identifiers to identify a particular tractor 112 to the rail system 1104 or a particular rail section to the tractor 112, and the like. A further aspect of these embodiments of the rail system 1104 is that it can include a combination of linear sections and/or discrete features or devices that communicate information to the tractor 112, either through the sensor system 205 or other means. These discrete features may communicate actively or passively, and as an example might communicate a location to the tractor 112. For example, the rail system 1104 may include a plurality of discrete features (e.g., communication devices) that are embedded or otherwise positioned in or on the yard surface at specific locations, and each of the locations can correspond to a start point 1101 of a path 1102 for backing a tractor 112 up to a particular dock station 131. In operation, the tractor sensor system 205 locates and confirms the feature corresponding to a specific dock station 131 to set the start point 1101 for backing up to the dock station 131.

FIGS. 16A-16D are partially schematic end views of various guide rails configured in accordance with embodiments of the present technology. In some embodiments, the rail system 1104 and variations thereof can be composed of many different types of suitable materials having a variety of suitable shapes and sizes for guiding OTR and terminal tractors as described above. For example, suitable rails may have a profile that protrudes above the roadway (e.g., the yard surface), is flush with the roadway, is internally grooved, is hollow, and/or is composed of discrete active or passive features for, e.g., wirelessly communicating information. Some examples of suitable rails can include, but are not limited to:

Protruding rail examples (see FIG. 16A)
1. Simple rectangular profile—1601
2. Rounded head profile—1602
3. V shape or the like—1603
4. Inverted V shape or the like—1604
5. Any of the foregoing can include visible light or electromagnetic (EM) emissive features or the like.

As noted above, the tractor 112 can include one or more receivers or coupling devices (e.g., pins, blades, rollers, bumpers and/or other structural features) on an underside thereof configured to receive and engage protruding rails in a manner that may limit lateral movement but allow forward/aft movement along the rail in a conventional manner.

Flush surface rail examples (see FIG. 16B)
1. Flat steel bar stock—1605
2. Reflective adhesive tape or the like (e.g., solid, striped or patterned metallic tape)—1606
3. Paint (e.g., magnetic paint, strip or another visual feature)
4. A material different from the surrounding drive material
5. Any of the foregoing can include visible light or electromagnetic emissive features or the like.

Internally grooved examples (see FIG. 16C)
1. V shape or the like—1607
2. Simple rectangular groove—1608
3. Rounded groove —1609

Embedded feature examples (See FIG. 16D)
1. Conductive wire or the like—1610
2. Magnetic feature and/or device—1611
3. Hollow feature such as pipe or tubing or the like, which can be empty or filled with media such as water—1512

Figure 17A:
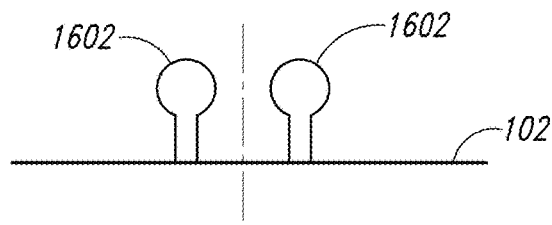
FIGS. 17A and 17B are partially schematic end views of various guidance rails configured in accordance with other embodiments of the present technology.
Figure 17B:
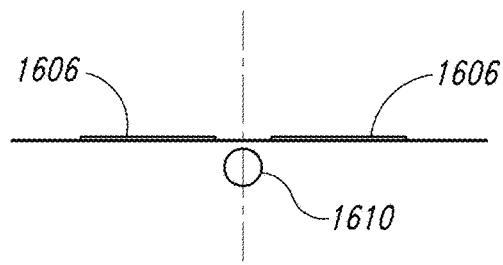

Discrete Feature Examples
1. Reflective discs, pads or the like
2. Metal discs, pads or the like
3. Magnetic discs, pads or the like
4. Active emitters such as RF, laser or the like FIGS. 17A and 17B are partially schematic end views of various guide rails configured in accordance with other embodiments of the present technology. In some embodiments, the rail features and/or sections may be composed of one or more members. For example, as shown in FIG. 17A, a protruding rail may have two members 1602 that trap the tractor coupling device (e.g., a pin, blade, or other member extending downwardly from an underside of the tractor 112) between them and restrict lateral movement while enabling fore and aft movement. Also, as shown in FIG. 17B, in some embodiments the rail can include a combination of different features, such as a combination of surface features and embedded features, such as one or more paint strips 1606 and a buried conductive wire 1610.

Figure 18A:
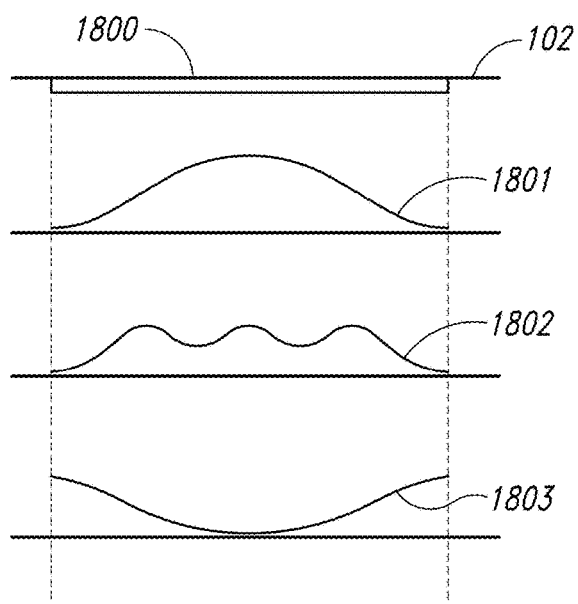
FIGS. 18A and 18B are a series of partially schematic views illustrating aspects of embedded guidance rails configured in accordance with further embodiments of the present technology.
Figure 18B:
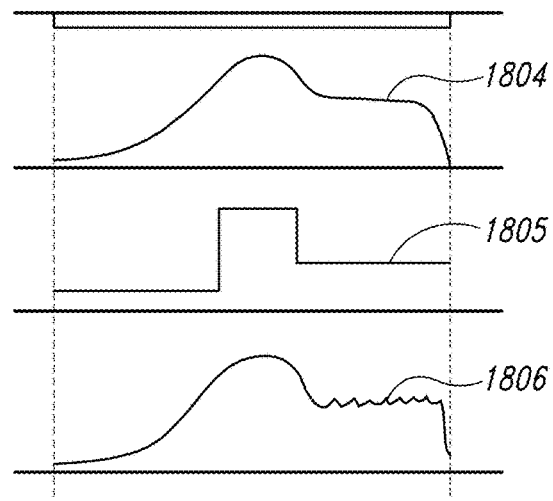

FIGS. 18A and 18B are a series of partially schematic views illustrating aspects of an embedded guide rail 1800 configured in accordance with further embodiments of the present technology. Referring first to FIG. 18A, the embedded rail 1800 is shown in end view, and in some embodiments, the rail 1800 can exhibit graduated electrical capacitance or the like across the width of its surface (as illustrated by the graphs 1801, 1802, and 1803) that can enable the tractor sensor(s) to center the tractor 112 on the guide rail by detection of the capacitance and prevent the tractor 112 from uncoupling from the rail and/or deviating from the rail path prematurely. Although a capacitance system is described, many other types of suitable systems can be used for such centering, such as optical systems, magnetic systems, or the like. For example, as shown in FIG. 18B, in other embodiments a graduated capacitance feature could exhibit a graduated signal that varies across the width of rail as shown by graphs 1804, 1805, and 1806, which can distinguish one side of the rail (e.g., a strip) from the other, thereby enabling the tractor sensor system to distinguish right from left.

Guide Lights

Figure 19A:
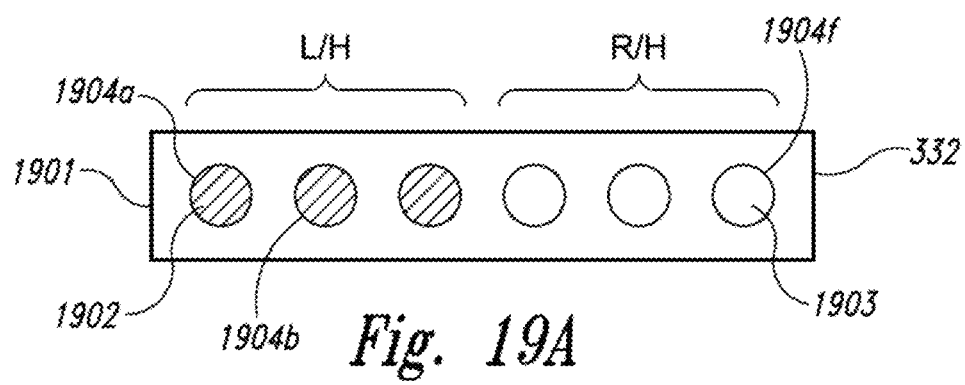
FIGS. 19A-19D are a series of partially schematic front views of loading dock station guide lights configured in accordance with embodiments of the present technology.

FIGS. 19A-19D are a series of partially schematic front views of the guide lights 332 of FIG. 3, configured in accordance with embodiments of the present technology. FIG. 19A illustrates an embodiment of the guide lights 332 designed to work with the systems and methods described above. This embodiment can include a guide light package or housing 1901 having a row of lights 1904a-1904f in which two colors are present on either side of the housing 1901. The left-hand guide lights 1904a-c could display one color 1902 (e.g., green) when a trailer 111 backing in is too far to the right of center, and the right-hand lights 1904d-f can display a different color 1903 (e.g. red) when the trailer 111 is too far to the left. Both colors would be illuminated when the trailer is centered on approach. In another embodiment, all of the guide lights 1904a-f can be lit when the trailer is farthest from the dock, but when it enters a zone closer to the dock, the outside lights (e.g., lights 1904a and 1904f) cease working and finally when the trailer is in a zone closest to the dock, only the innermost two lights 1904c and 1904d function. The lights that are illuminated may be illuminated continuously, blink, or some combination of the two. For instance, the lights 1904a-f might be illuminated continuously when the trailer is biased to one side or the other but might flash when the trailer proceeds too far from centerline to signal the driver to stop. The guide lights 1904a-f might also be configured to function only when a trailer is detected on approach and be dark when there is not a trailer present. The guide lights may be further configured to go dark when the trailer is against the dock. In some embodiments, the central processing center 132 (or other processing device) can provide control commands to the guide lights 332 based on trailer positional input received from the dock sensors 320a, b, and/or from the camera 310 as described above.

Figure 19B:
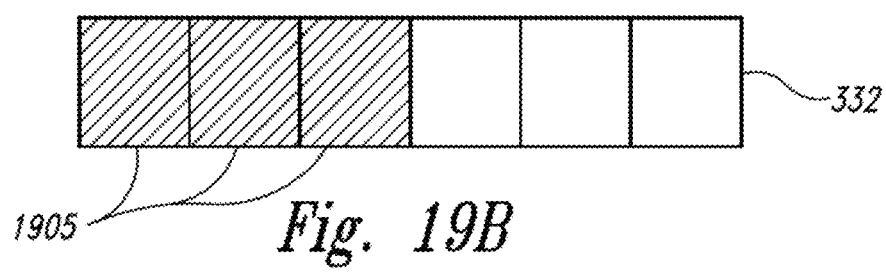
Figure 19C:
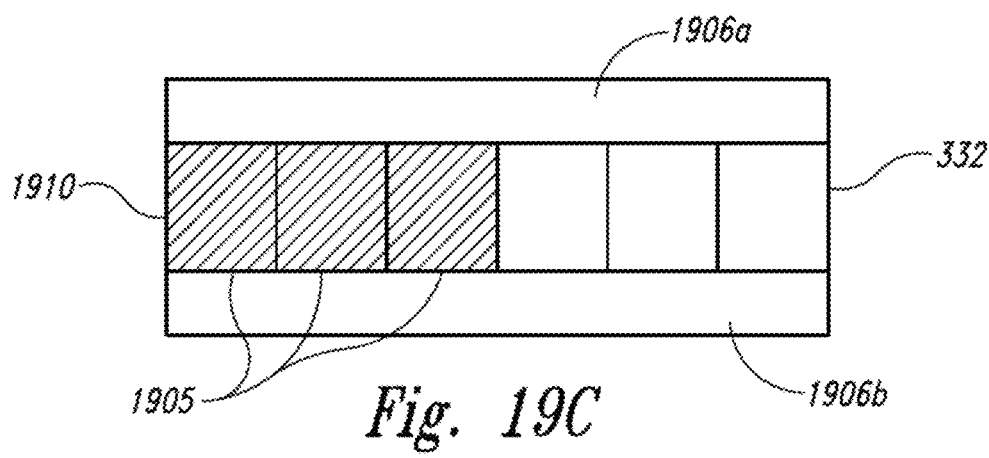
Figure 19D:
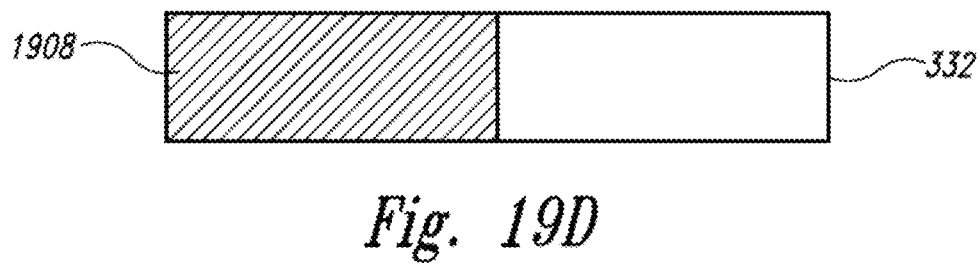

It should be understood that although a multi-light configuration is shown in FIG. 19A, other configurations can function with the same logic. For example, as shown in FIG. 19B other embodiments can have rectangular guide lights 1905 and/or other numbers of lights. The light system 1910 shown in FIG. 19C might also be integrated with a red light 1906a and a green light 1906b that indicate to a driver when it is safe to approach and leave the dock 131 (similar to, e.g., the signal lights 330; FIG. 3). Another embodiment can incorporate a strobing feature in which the colored indicator lights have a strobing effect. The outermost lights would light first followed by the middle pair, and then finally the inner pair, giving the vehicle driver a centering communication. When the trailer is offset to one side, only those lights would strobe communicating that the trailer needs to move back closer to centerline. Once on centerline, both colors of lights would strobe. Other embodiments can have a single light color but depend on the strobe pattern to communicate steering commands to the driver. FIG. 19D illustrates yet another embodiment having a single light bar 1908 that is internally illuminated and presents one or more of the light actions described above to visually communicate guidance information to the driver.

Vehicle Driver Guidance

Figure 20A:
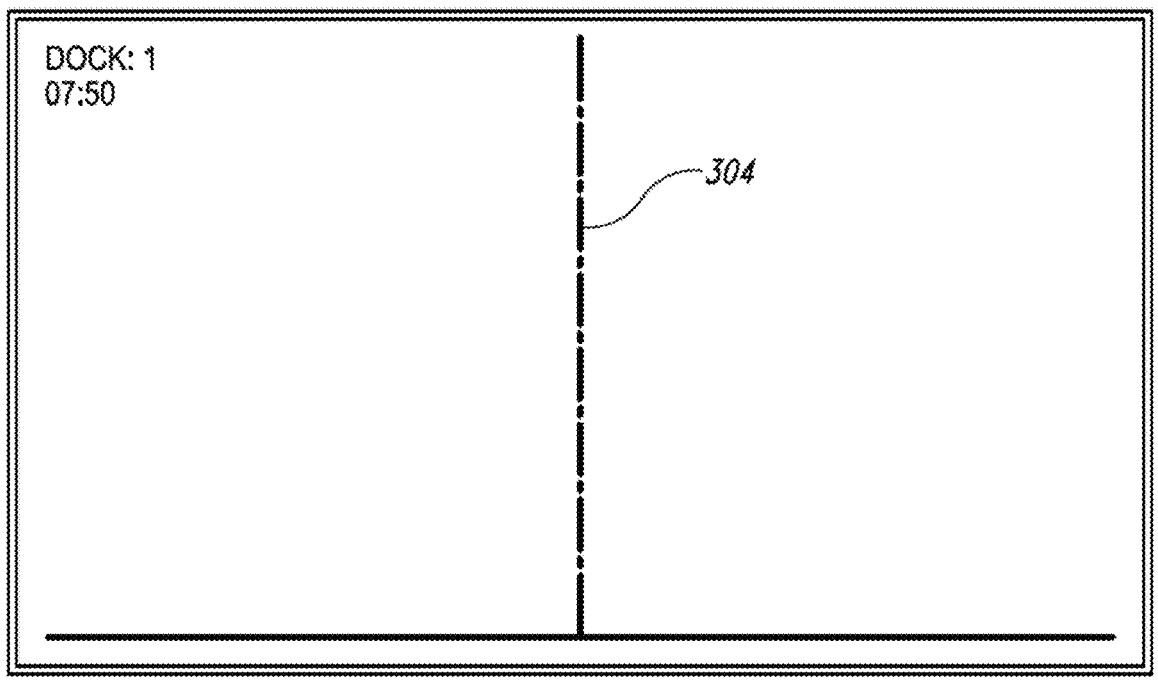
FIGS. 20A-20D are a series of partially schematic screen shots illustrating graphical information that can be displayed for a vehicle driver to facilitate trailer parking in accordance with embodiments of the present technology.
Figure 20B:
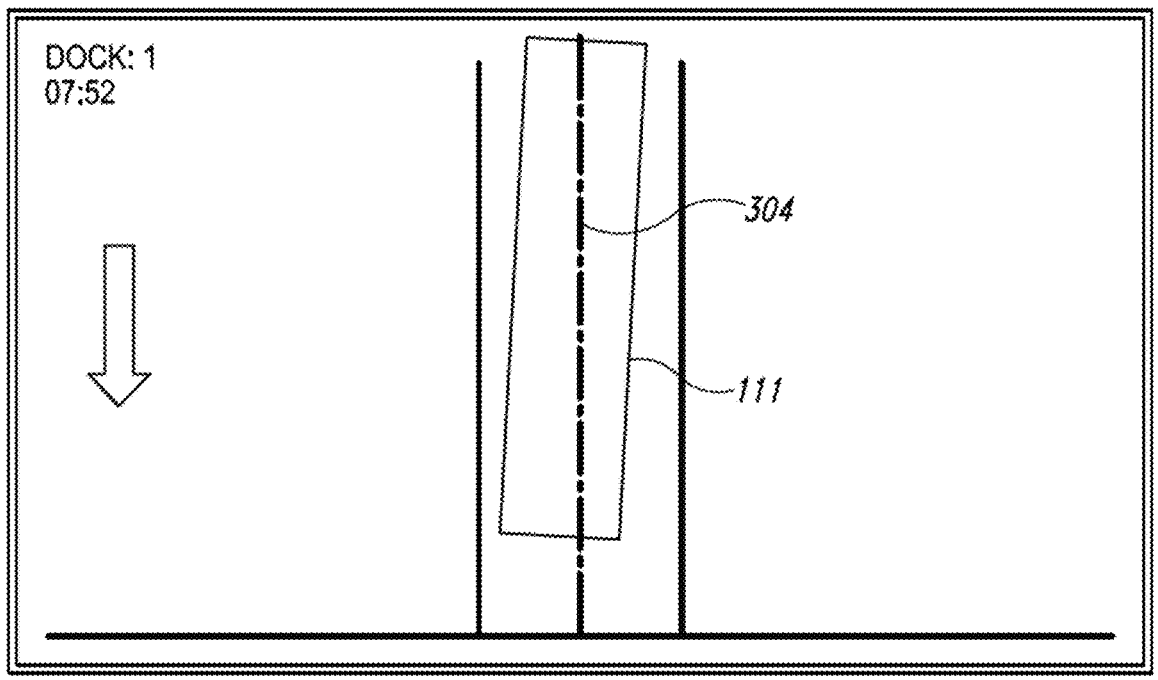
Figure 20C:
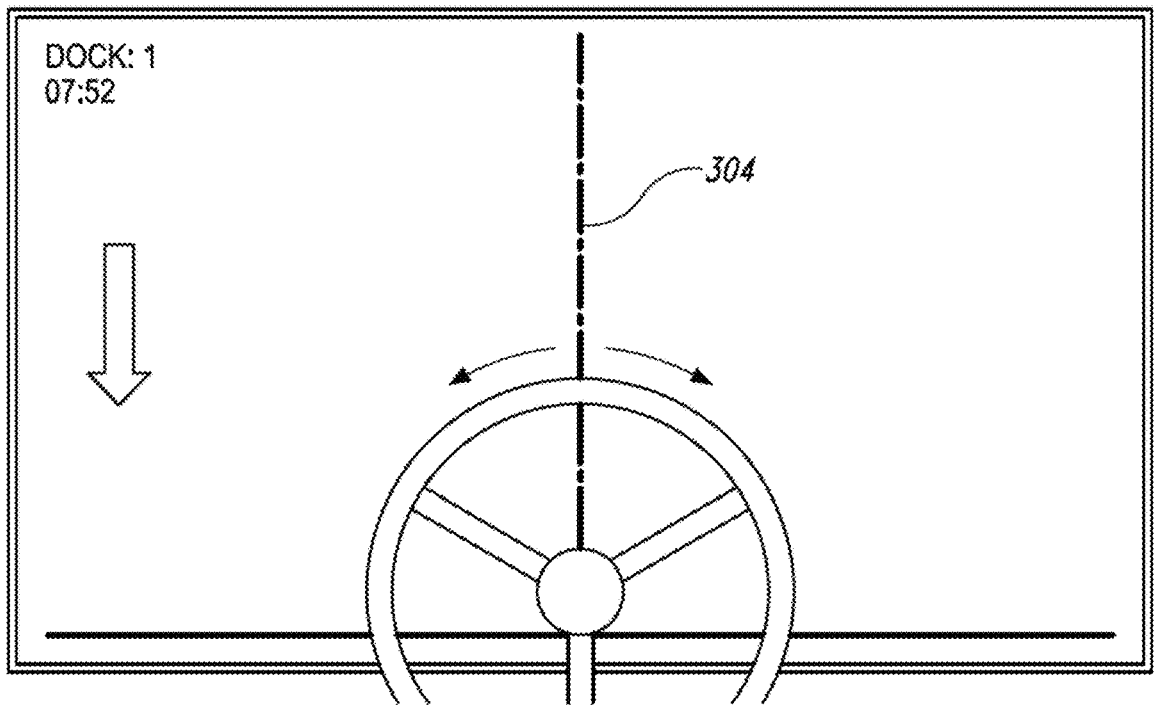
Figure 20D:
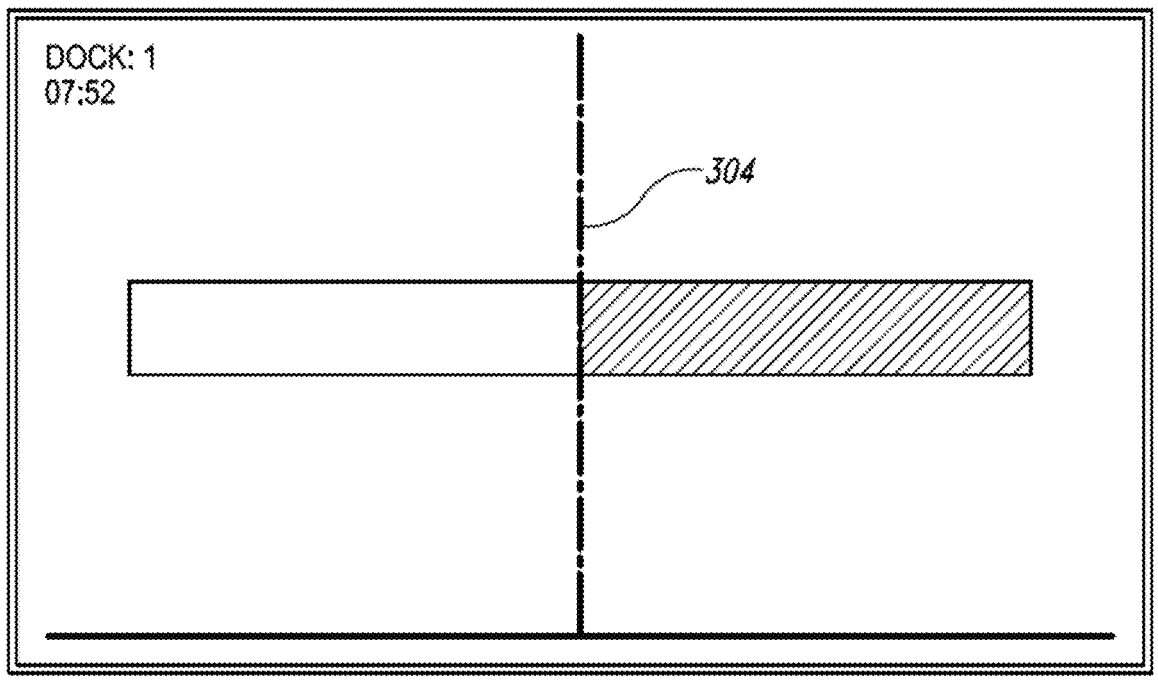

FIGS. 20A-20D are a series of screenshots 2000a-2000d, respectively, presenting graphical information that can be displayed for a vehicle driver to facilitate trailer parking, in accordance with embodiments of the present technology. The screen shots 2000a-2000d can be generated from images and/or other information received from loading dock camera 310, the tractor sensor system 210a, b, the dock sensors 320a, b, etc., in accordance with a guidance application executed by or in conjunction with the central control system 132. In some embodiments, the screenshots 2000a-2000d display steering features to enable the vehicle driver to more precisely position the transport trailer against a loading dock. These features can be presented on a dedicated graphics monitor, such as the display system 222 in the tractor 112, a smart phone screen, or a computer tablet or the like positioned in the vehicle cab or carried loose by the driver. The guidance features can communicate relative distance of the trailer from dock, relative trailer attitude to the dock, distance from centerline 304, and/or permissible distance from centerline as well as direction of travel. In addition, the screen shots could also display dock information, steering commands, or any other pertinent information that the driver might require or find helpful. As shown in FIG. 20A, for example, the screen shot 2000a can display the position of the dock centerline 304 relative to the trailer. Similarly, as shown in FIG. 20B, the screenshot 2000b can include a top view of the trailer 111 relative to the dock centerline 304. The screenshot 2000c of FIG. 20C can illustrate steering wheel inputs needed to keep the trailer on the centerline. The screen shot 2000d of FIG. 20D illustrates another example graphic that can provide left/right centering information to the driver.

Automated Trailer Air/Electrical Hook-Up

In some embodiments, the present technology relates to a tractor and trailer combination that includes a system for automatically coupling supply air and electrical supply from the tractor unit to the trailer unit. Conventional airbrake systems for motor trucks typically include two separate pressure air conduits and respective sets of couplers, one for the main or so-called service brake system and circuit, and the other for the so-called emergency brake circuit. Accordingly, typically there are two flexible air hoses or conductors associated with a tractor that must first be connected to separate couplers disposed on the trailer for moving the trailer, and then disconnected from the trailer when the tractor separates from the trailer. This task is not particularly vexing with conventional over-the-road trucking operations. However, in truck yard or so-called "terminal" operations, trailers are constantly being moved about between loading docks and storage positions by a terminal-type truck tractor. By way of example, as many as 150 to 200 trailer moving operations may be carried out in a typical 24-hour period, each operation requiring the tractor driver to leave the driver's cab, connect the airbrake hoses to the trailer prior to moving the trailer, and then leave the cab again to disconnect the air hoses from the trailer once it is properly parked. The hose disconnecting operation can increase the cycle time of moving and parking a trailer and could present challenges to the implementation of autonomous or semi-autonomous yard operations. Accordingly, it would be advantageous to provide an automatic brake and electrical supply coupler arrangement that would provide for automatic engagement and disengagement of these systems without human intervention. There also has been a need to provide a mechanism for control of and retrieval of the flexible brake lines or hoses connected to the brake couplers to prevent the couplers from falling to the ground when they are disconnected from the trailer or otherwise becoming entangled with the tractor undercarriage. With this in mind, some embodiments of the present technology include systems and methods of automatically engaging and dis-engaging trailer brake supply and emergency air systems, as well as the trailer electrical supply, automatically upon trailer engagement and disengagement from the tractor fifth wheel in semi-trailer applications.

The following publications are incorporated herein by reference in their entireties and form part of the present disclosure.

1) *Constrained Model Predictive Control for Backing-Up Tractor-Trailer System*, by Y. Bin and T. Shim, Proceedings of the 10th World Congress on Intelligent Control and Automation, Jul. 6-8, 2012, Beijing, China.
2) *A New Method for Directional Control of a Tractor Semi-Trailer*, by S. H. Tabatabaei Oreh, R. Kazemi, S. Azadi, and A. Zahedi, Australian Journal of Basic and Applied Sciences, 6(12): 396-409, 2012, ISSN 1991-8178.
3) *Path-Tracking for Tractor-Trailers with Hitching of Both the On Axle and the Off-Axle Kind*, by R. M. DeSantis, J. M. Bourgeot, J. N. Todeschi, and R. Hurteau, Ecole Polytechnique de Montreal, Montreal, Quebec, Canada, H3C 3A7, 2002.
4) *Turning an Articulated Truck on a Spreadsheet*, by J. McGovern, Dublin Institute of Technology, Nov. 1, 2003.

Some aspects of the invention are described above in the general context of computer-executable instructions, such as routines executed by a general-purpose data processing device, for example, a server computer, wireless device, or personal computer. Those skilled in the relevant art will appreciate that aspects of the invention can be practiced with other communications, data processing, or computer system configurations, including Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "processing center," "computer," "server," "host," "host system," and the like are generally used interchangeably herein, and refer to any of the above devices and systems, as well as any data processor.

Aspects of the invention can be embodied in a special-purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Wireless Personal Area Network (WPAN), Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as LANs, WANs, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

The processor 501 and other processing devices disclosed herein may be any logic processing unit, such as one or more central processing units (CPUs), digital signal processors (DSPs), application-specific integrated circuits (ASIC), programmable logic controllers (PLCs), etc. Although specific circuitry is described above, those of ordinary skill in the art will recognize that a microprocessor-based system could also be used where any logical decisions are configured in software. Unless described otherwise, the construction and operation of the various components shown in the Figures are of conventional design. As a result, such components need not be described in further detail herein, as they will be readily understood by those skilled in the relevant art.

Representative computer displays or web pages configured in accordance with the present technology may be implemented in any of various ways, such as in C++ or as web pages in XML (Extensible Markup Language), HTML (HyperText Markup Language) or any other scripts or methods of creating displayable data, such as the Wireless Access Protocol ("WAP"). The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page," "page," "and "display descriptions" are generally used interchangeably herein.

When aspects of the present technology are implemented as web or display pages, the screens are stored as display descriptions, graphical user interfaces, or other methods of depicting information on a computer screen (e.g., commands, links, fonts, colors, layout, sizes, relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character-/code-based formats, algorithm-based formats (e.g., vector generated), or matrix or bit-mapped formats. While aspects of the invention are described herein using a networked environment, some or all features may be implemented within a single-computer environment.

One skilled in the relevant art will appreciate that a display description may be in HTML, format, email format, or any other format suitable for displaying information (including character/code-based formats, algorithm-based formats (e.g., vector generated), and bitmapped formats). Also, various communication channels may be used, such as a LAN, WAN, or a point-to-point dial-up connection instead of the Internet. The server system may comprise any combination of hardware or software that can support these concepts. In particular, a web server may actually include multiple computers. A client system may comprise any combination of hardware and software that interacts with the server system. The client systems may include television-based systems, Internet appliances, and various other consumer products through which auctions may be conducted, such as wireless computers (mobile phones, etc.).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the present invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while process flows or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above Detailed Description describes various embodiments of the invention and the best mode contemplated, regardless of the level of detail of the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system for use in a yard of a distribution center, the yard containing at least one cargo trailer, the system comprising:
 an autonomous tractor configured to move from a first location in the yard spaced apart from the cargo trailer to a second location in the yard proximate the cargo trailer, wherein the autonomous tractor includes— a fifth wheel configured to couple the autonomous tractor to the cargo trailer for movement of the cargo trailer;
a first sensor configured to detect, relative to the first sensor, an angular position of a first sensor target positioned on the cargo trailer and an angular position of a second sensor target positioned on the cargo trailer and spaced apart from the first sensor target; and
a second sensor spaced apart from the first sensor and configured to detect, relative to the second sensor, an angular position of the first sensor target and an angular position of the second sensor target,
wherein the cargo trailer includes—
a body having a front end portion spaced apart from a rear end portion; and
a kingpin positioned beneath the body toward the front end portion,
wherein the first sensor target is positioned above the body proximate the rear end portion, and
wherein the second sensor target is positioned above the body proximate the rear end portion, wherein the first and second sensors are configured to detect the angular positions of the first and second sensor targets prior to engagement of the kingpin by the fifth wheel.

2. The system of claim 1 wherein the first and second sensors are configured to detect the angular positions of the first and second sensor targets when the autonomous tractor is in the second location.

3. The system of claim 1 wherein the autonomous tractor further includes a radar-transmitting antenna configured to transmit radar signals to the first and second sensor targets.

4. The system of claim 1 wherein the cargo trailer body further includes a rear edge portion, wherein the first sensor target is positioned proximate the rear edge portion.

5. The system of claim 1 wherein the distribution center further includes a building having a loading dock station, and wherein the autonomous tractor is further configured to engage the kingpin with the fifth wheel and move the cargo trailer across the yard to the loading dock station.

6. The system of claim 5 wherein moving the cargo trailer across the yard to the loading dock station includes backing the cargo trailer up against the loading dock station.

7. The system of claim 1 wherein the autonomous tractor further includes a controller, and wherein the system further comprises:
a processing device remote from the autonomous tractor, wherein the processing device is configured to wirelessly send computer-executable instructions to the controller, and wherein the controller is configured to execute the instructions to cause the autonomous tractor to move from the first location to the second location.

8. The system of claim 1 wherein the autonomous tractor further includes a controller, wherein the distribution center further includes a building having a loading dock station, and wherein the system further comprises:
a processing device remote from the autonomous tractor, wherein the processing device is configured to wirelessly send computer-executable instructions to the controller, and wherein the controller is configured to execute the instructions to cause the autonomous tractor to—
move from the first location to the second location, engage the kingpin with the fifth wheel, and move the cargo trailer across the yard to the loading dock station.

9. The system of claim 1 wherein the first sensor is mounted to the autonomous tractor at a first elevation, and wherein the first sensor target is mounted to the body at a second elevation that is at least approximately equal to the first elevation.

10. The system of claim 1 wherein:
the autonomous tractor is a yard tractor, and
the cargo trailer is an over-the-road cargo trailer.

11. The system of claim 3 wherein the radar-transmitting antenna is positioned on a centerline of the autonomous tractor.

12. The system of claim 5, wherein the loading dock station comprises:
a radar transmitter mounted to the building and configured to transmit radar signals that are reflected by the first and second sensor targets on the cargo trailer; and
at least one loading dock sensor mounted to the building and configured to receive the radar signals that are reflected by the first and second sensor targets on the cargo trailer to detect an angular position of at least one of the first and second sensor targets relative to the at least one loading dock sensor.

13. The system of claim 12, wherein the cargo trailer has a trailer centerline and the loading dock station has a dock station centerline, and wherein the system further comprises:
a processing device operably connected to the at least one loading dock sensor, wherein the processing device is configured to receive target position information from the at least one loading dock sensor, and wherein the processing device is further configured to determine an angular position of the trailer centerline relative to the dock station centerline based at least in part on the target position information.

14. The system of claim 12, wherein:
the at least one loading dock sensor is configured to receive information related to the identity of the first and second sensor targets,
the loading dock station comprises a controller having a processing device configured to wirelessly send the information related to the identity of the first and second targets to a central processing center of the distribution center, and
the controller is configured to wirelessly receive trailer target identification information from the central processing center to verify that the information related to the identity of the first and second sensor targets matches the trailer target identification information.

15. A method of operating an autonomous tractor at a distribution center, the distribution center having at least one loading dock station, a yard adjacent to the at least one loading dock station, and at least one cargo vehicle parked in the yard, the method comprising:
wirelessly transmitting instructions from a central processing device to the autonomous tractor, wherein the autonomous tractor includes steering tires, a first sensor, and a second sensor spaced apart from the first sensor,
wherein the first sensor is configured to detect, relative to the first sensor, an angular position of a first sensor target positioned on the cargo vehicle and an angular position of a second sensor target positioned on the cargo vehicle and spaced apart from the first sensor target, wherein the second sensor is configured to detect, relative to the second sensor, an angular position of the first sensor target and an angular position of the second sensor target, and wherein the cargo vehicle includes a body having a front end portion spaced apart from a rear end portion, wherein the first and second sensor targets are positioned above the body proximate the rear end portion; and in response to receiving the instructions from the central processing device, executing the instructions by the autonomous tractor, wherein executing the instructions causes the autonomous tractor to perform a method that includes:

moving from a first position spaced apart from the cargo vehicle toward a second position proximate the cargo vehicle;

detecting, via the first sensor, the angular positions of the first and second sensor targets relative to the first sensor;

detecting, via the second sensor, the angular positions of the first and second sensor targets relative to the second sensor; and based on the detected angular positions of the first and second sensor targets, changing an angular position of the steering tires to align a centerline of the autonomous tractor with a centerline of the cargo vehicle when the autonomous tractor is in the second position.

16. The method of claim 15 wherein executing the instructions causes the autonomous tractor to perform a method that further includes moving the cargo vehicle from the second position to a third position proximate the loading dock station.

17. The method of claim 15 wherein executing the instructions causes the autonomous tractor to perform a method that further includes engaging the cargo vehicle at the second position.

18. The method of claim 16 wherein moving the cargo vehicle from the second position to a third position proximate the loading dock station includes backing the cargo vehicle toward the loading dock station.

19. The method of claim 15 wherein wirelessly transmitting instructions from the central processing device to the autonomous tractor includes transmitting information identifying at least one of the cargo vehicle or the loading dock station.

20. The method of claim 15 wherein wirelessly transmitting instructions from the central processing device to the autonomous tractor includes transmitting information identifying the location of at least one of the cargo vehicle or the loading dock station.

21. The system of claim 3 wherein the first and second sensor targets are configured to reflect the radar signals, and wherein the first and second sensors include radar-receiving antennas configured to receive the radar signals reflected by the first and second sensor targets.

22. The system of claim 21 wherein:

the first and second sensors are configured to receive information related to the identity of the first and second sensor targets, the autonomous tractor further includes a controller having a processing device configured to wirelessly send the information related to the identity of the first and second sensor targets to a central processing center of the distribution center, and the controller is configured to wirelessly receive trailer target identification information from the central processing center to verify that the information related to the identity of the first and second sensor targets matches the trailer target identification information.

* * * * *